(12) United States Patent
Vasylyev

(10) Patent No.: US 12,680,670 B2
(45) Date of Patent: Jul. 14, 2026

(54) ILLUMINATION SYSTEMS EMPLOYING LAMINATED SHEET-FORM OPTICAL STRUCTURES WITH EMBEDDED TIR CHANNELS

(71) Applicant: Sergiy Vasylyev, Elk Grove, CA (US)

(72) Inventor: Sergiy Vasylyev, Elk Grove, CA (US)

(73) Assignee: S.V.V. TECHNOLOGY INNOVATIONS, INC., Sacramento, CA (US)

( * ) Notice: Subject to any disclaimer, the term of this patent is extended or adjusted under 35 U.S.C. 154(b) by 219 days.

(21) Appl. No.: 18/779,078

(22) Filed: Jul. 22, 2024

(65) Prior Publication Data

US 2025/0020296 A1 Jan. 16, 2025

Related U.S. Application Data

(63) Continuation of application No. 18/221,821, filed on Jul. 13, 2023, now Pat. No. 12,305,819, which is a (Continued)

(51) Int. Cl.

*F21V 7/24* (2018.01)
*E04D 13/03* (2006.01)

(Continued)

(52) U.S. Cl.

CPC .............. *F21V 7/24* (2018.02); *E04D 13/033* (2013.01); *E06B 9/24* (2013.01); *E06B 9/386* (2013.01);

(Continued)

(58) Field of Classification Search

CPC .. E04D 13/033; E06B 9/28; E06B 9/36; F21S 8/026; F21V 11/02

See application file for complete search history.

(56) References Cited

U.S. PATENT DOCUMENTS 596,883 A 1/1898 Jacobs
693,088 A * 2/1902 Wadsworth .............. E06B 9/24 362/342

(Continued)

FOREIGN PATENT DOCUMENTS

EP 2743568 6/2014
WO WO 9904195 1/1999

*Primary Examiner* — Evan P Dzierzynski

(57) ABSTRACT

An illumination system comprising a lighting module with a plurality of LEDs, a flexible optically transmissive sheet disposed in an energy-receiving relationship with the lighting module, and broad-area reflective surface configured to reflectively scatter light. The flexible optically transmissive sheet has a laminated structure with a generally rectangular shape and a thickness between 200 micrometers and 1 millimeter. The laminated structure comprises a first layer of an optically transmissive material, a second layer of an optically transmissive material, a first regular array of linear channels formed in the first layer extending parallel to one another between two edges of the flexible optically transmissive sheet, and a second regular array of linear channels formed in the second layer extending at an angle with respect to the first regular array of linear channels. The linear channels define side walls configured to reflect light using total internal reflection.

39 Claims, 32 Drawing Sheets

Related U.S. Application Data continuation of application No. 17/841,644, filed on Jun. 15, 2022, now Pat. No. 11,703,200, which is a continuation of application No. 17/233,472, filed on Apr. 17, 2021, now Pat. No. 11,365,857, which is a continuation of application No. 16/209,810, filed on Dec. 4, 2018, now Pat. No. 10,982,831, which is a continuation of application No. 15/175,952, filed on Jun. 7, 2016, now Pat. No. 10,184,623, which is a continuation of application No. 14/797,102, filed on Jul. 11, 2015, now abandoned.

(60) Provisional application No. 62/029,374, filed on Jul. 25, 2014.

(51) Int. Cl.

| | |
|---|---|
| ***E06B 9/24*** | (2006.01) |
| ***E06B 9/386*** | (2006.01) |
| ***F21V 7/00*** | (2006.01) |
| ***G02B 1/04*** | (2006.01) |
| ***G02B 5/02*** | (2006.01) |
| *E04F 10/00* | (2006.01) |
| *E06B 9/28* | (2006.01) |
| *E06B 9/30* | (2006.01) |
| *E06B 9/36* | (2006.01) |
| *F21S 8/02* | (2006.01) |
| *F21S 11/00* | (2006.01) |
| *F21V 8/00* | (2006.01) |
| *F21V 9/04* | (2018.01) |
| *F21V 11/02* | (2006.01) |
| *F21Y 101/00* | (2016.01) |

(52) U.S. Cl.

CPC .............. *F21V 7/0091* (2013.01); *G02B 1/04* (2013.01); *G02B 5/0278* (2013.01); *E04F 10/005* (2013.01); *E06B 2009/2417* (2013.01); *E06B 9/28* (2013.01); *E06B 9/30* (2013.01); *E06B 9/36* (2013.01); *F21S 8/026* (2013.01); *F21S 11/007* (2013.01); *F21V 9/04* (2013.01); *F21V 11/02* (2013.01); *F21Y 2101/00* (2013.01); *G02B 6/0096* (2013.01); *Y02A 40/25* (2018.01)

(56) References Cited

U.S. PATENT DOCUMENTS

| | | | | |
|---|---|---|---|---|
| 737,979 | A | 9/1903 | Wadsworth | |
| 2,689,387 | A | 9/1954 | Carr | |
| 3,940,896 | A | 3/1976 | Steel | |
| 4,509,825 | A * | 4/1985 | Otto | F21S 11/00 359/596 |
| 4,557,565 | A | 12/1985 | Ruck et al. | |
| 4,673,609 | A | 6/1987 | Hill | |
| 4,699,467 | A | 10/1987 | Bartenbach et al. | |
| 4,773,733 | A | 9/1988 | Murphy, Jr. et al. | |
| 4,989,952 | A | 2/1991 | Edmonds | |
| 5,009,484 | A | 4/1991 | Gerritsen | |
| 5,285,315 | A | 2/1994 | Stiles | |
| 5,295,051 | A | 3/1994 | Cowling | |
| 5,461,496 | A | 10/1995 | Kanada | |
| 5,481,385 | A | 1/1996 | Zimmerman et al. | |
| 5,493,824 | A | 2/1996 | Webster et al. | |
| 5,609,938 | A | 3/1997 | Shields | |
| 5,650,875 | A | 7/1997 | Kanada et al. | |
| 5,655,339 | A | 8/1997 | DeBlock et al. | |
| 5,802,784 | A | 9/1998 | Federmann | |
| 5,880,886 | A | 3/1999 | Milner | |
| 5,999,323 | A | 12/1999 | Wood | |
| 6,010,747 | A | 1/2000 | Beeson et al. | |
| 6,239,910 | B1 | 5/2001 | Digert | |
| 6,311,437 | B1 | 11/2001 | Lorenz | |
| 6,367,937 | B2 | 4/2002 | Koster | |
| 6,424,406 | B1 | 7/2002 | Mueller et al. | |
| 6,437,921 | B1 | 8/2002 | Whitehead | |
| 6,473,220 | B1 | 10/2002 | Clikeman et al. | |
| 6,538,813 | B1 | 3/2003 | Magno | |
| 6,542,303 | B1 | 4/2003 | Oyama | |
| 6,580,559 | B2 | 6/2003 | Doll et al. | |
| 6,616,285 | B2 | 9/2003 | Milner | |
| 6,700,716 | B2 | 3/2004 | Sejkora | |
| 6,714,352 | B2 | 3/2004 | Rogers et al. | |
| 6,980,728 | B2 | 12/2005 | Ladstatter et al. | |
| 6,997,595 | B2 | 2/2006 | Mi et al. | |
| 7,070,314 | B2 | 7/2006 | Edmonds | |
| 7,322,156 | B1 | 1/2008 | Rillie et al. | |
| 7,410,284 | B2 | 8/2008 | Edmonds | |
| 7,416,315 | B2 | 8/2008 | Blumel | |
| 7,546,709 | B2 | 6/2009 | Jaster et al. | |
| 7,703,969 | B2 | 4/2010 | Miyashita | |
| 7,872,801 | B2 | 1/2011 | Kojima et al. | |
| 8,107,164 | B2 | 1/2012 | Tsai | |
| 8,797,652 | B2 | 8/2014 | Mosher | |
| 8,824,050 | B2 | 9/2014 | Vasylyev | |
| 8,825,050 | B2 | 9/2014 | Vujcic | |
| 8,837,048 | B2 | 9/2014 | Jaster | |
| 8,934,173 | B2 | 1/2015 | Vasylyev | |
| 9,007,688 | B2 | 4/2015 | Vasylyev | |
| 9,429,288 | B2 | 8/2016 | Ueki | |
| 9,885,453 | B2 | 2/2018 | Tsujimoto | |
| 10,577,859 | B2 | 3/2020 | Vasylyev | |
| 11,365,857 | B2 | 6/2022 | Vasylyev | |
| 2004/0201977 | A1* | 10/2004 | Edmonds | E06B 9/24 362/602 |
| 2005/0037205 | A1 | 2/2005 | Dalzatto | |
| 2008/0202703 | A1 | 8/2008 | Edmonds | |
| 2010/0039821 | A1* | 2/2010 | Oh | F21V 3/02 362/257 |
| 2010/0278480 | A1* | 11/2010 | Vasylyev | G02B 6/0055 385/36 |
| 2012/0033302 | A1 | 2/2012 | Suzuki et al. | |
| 2012/0327507 | A1 | 12/2012 | Padiyath et al. | |
| 2013/0038928 | A1 | 2/2013 | Padiyath et al. | |
| 2013/0107502 | A1 | 5/2013 | Leadford | |
| 2014/0160570 | A1 | 6/2014 | Jaster | |
| 2015/0285454 | A1 | 10/2015 | Aizenberg | |
| 2016/0097502 | A1 | 4/2016 | Padiyath et al. | |

* cited by examiner

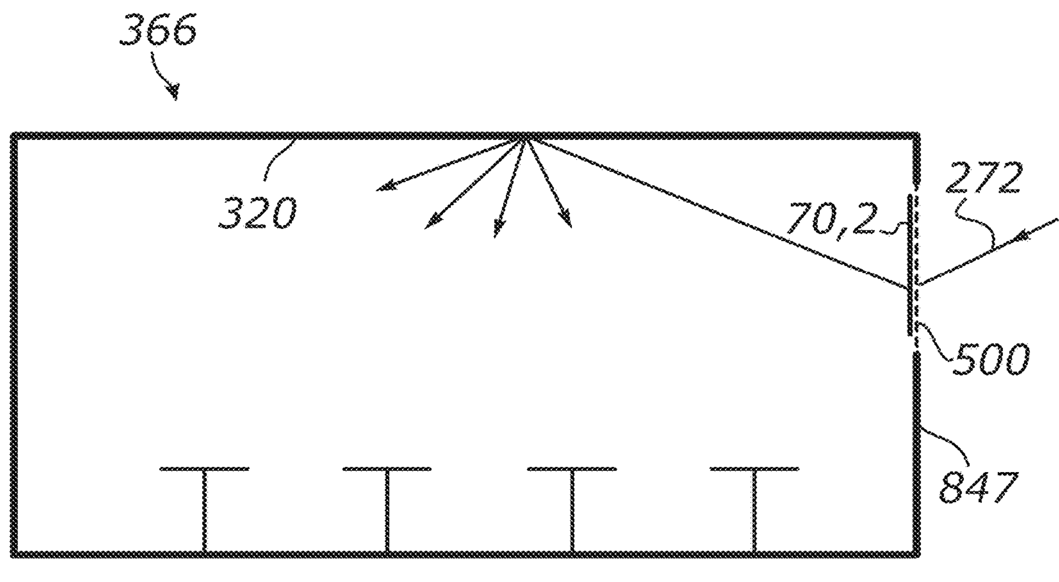
FIG. 15
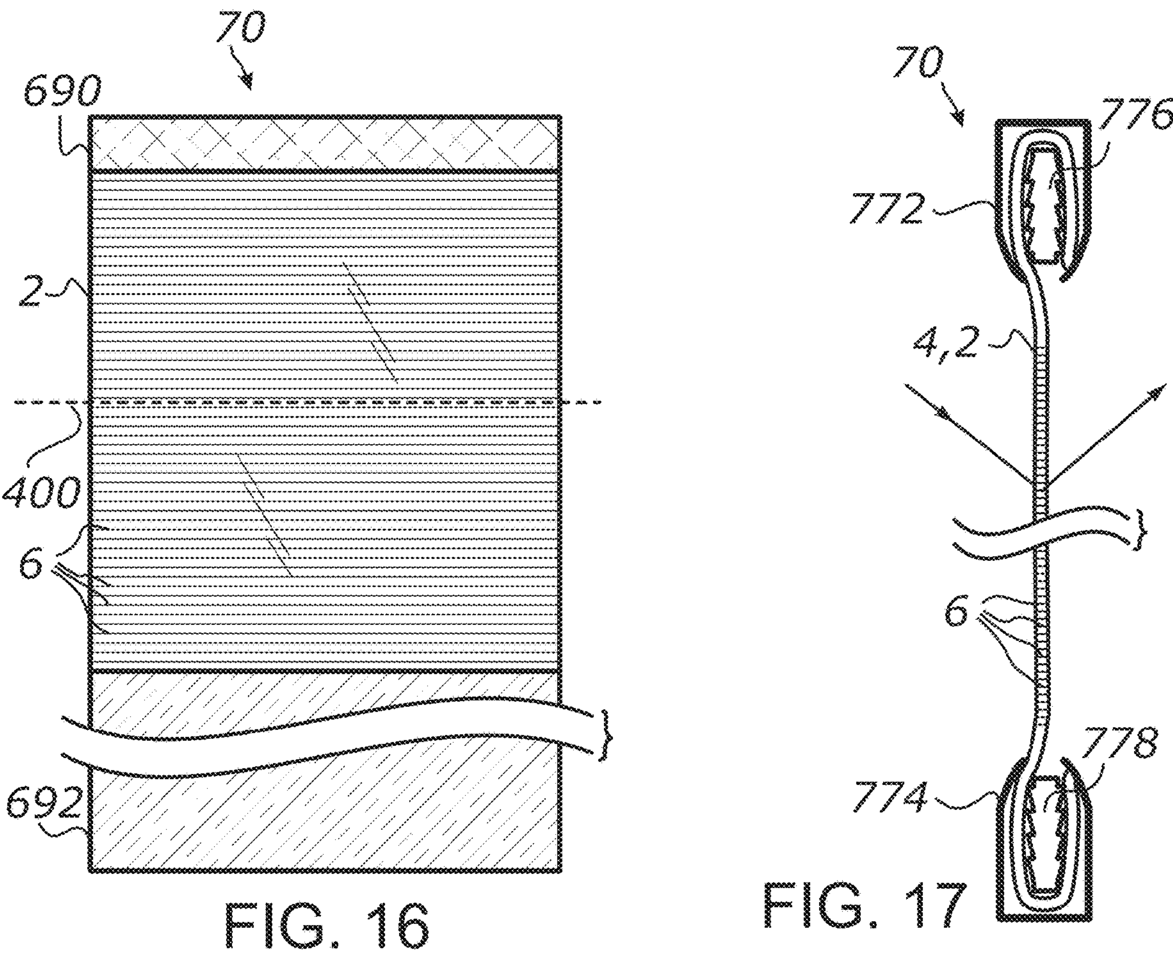
FIG. 16
FIG. 17

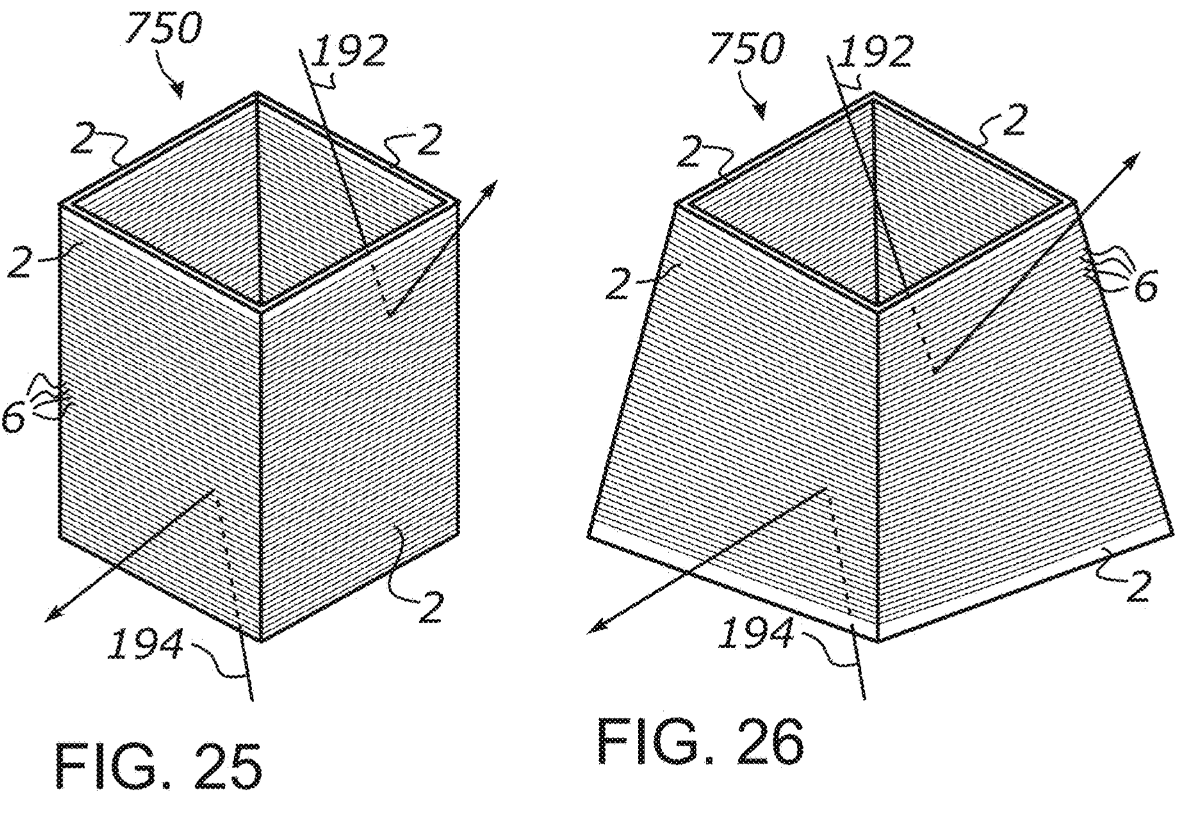
FIG. 25
FIG. 26
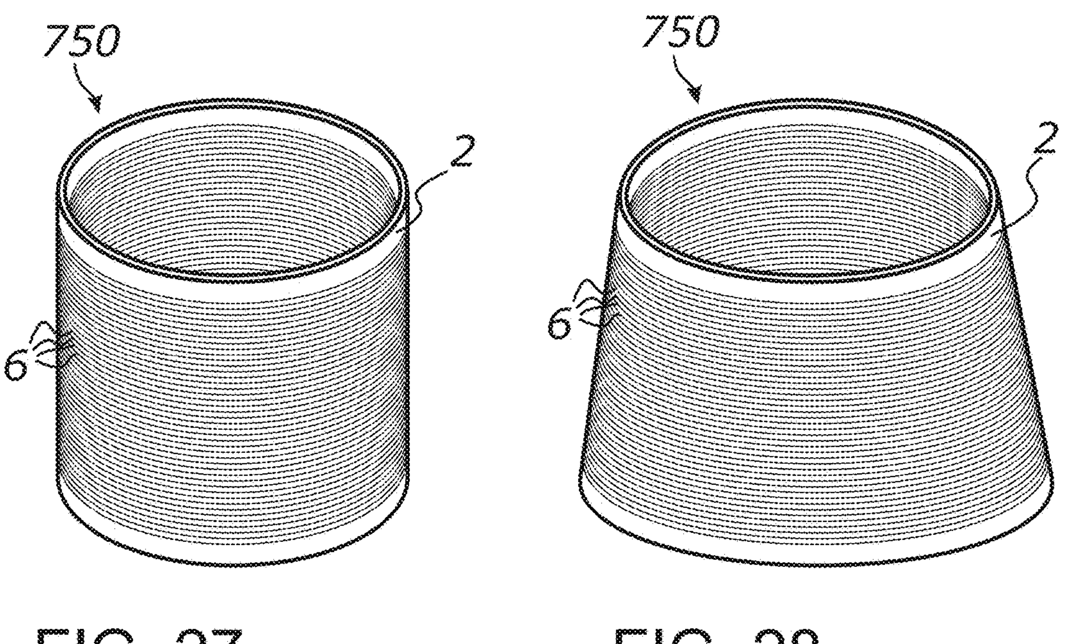
FIG. 27
FIG. 28

ILLUMINATION SYSTEMS EMPLOYING LAMINATED SHEET-FORM OPTICAL STRUCTURES WITH EMBEDDED TIR CHANNELS

CROSS-REFERENCE TO RELATED APPLICATIONS

This application is a continuation of application Ser. No. 18/221,821, filed Jul. 13, 2023, which is a continuation of application Ser. No. 17/841,644, filed Jun. 15, 2022, which is a continuation of application Ser. No. 17/233,472, filed Apr. 17, 2021, which is a continuation of application Ser. No. 16/209,810, filed Dec. 4, 2018, which is a continuation of application Ser. No. 15/175,952, filed Jun. 7, 2016, which is a continuation of application Ser. No. 14/797,102 filed Jul. 11, 2015. This application also claims priority from U.S. provisional application Ser. No. 62/029,374 filed on Jul. 25, 2014, incorporated herein by reference in its entirety.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The present invention relates to light directing sheeting, films, panels and light control devices incorporating same. More particularly, this invention relates to light directing sheets, panels and films capable of redirecting off-normal light rays at relatively high bend angles, including bend angles exceeding 90 degrees. This invention further relates to light directing sheet-form materials for the use in daylight-harvesting glazing for enhanced natural illumination of building interiors or other types of enclosed structures. It also further relates to window coverings, skylights, artificial light control devices and daylight control devices.

2. Description of Background Art

Various optical films and panels used to redirect light often incorporate prismatic surface microstructures such as linear prism arrays and the like. Such prismatic microstructures typically include surfaces that are not parallel to the prevailing plane of the film or panel and can thus redirect light by a prescribed angle by means of refraction or total internal reflection (TIR).

However, the bend angles that can be achieved using prismatic microstructures are limited and typically are below 60 degrees in practice. Additionally, the exposed microprismatic surfaces are prone to soiling and damage. Lamination of such surfaces onto other surfaces without impairing the optical performance of the device is problematic due to the unavoidable air gaps between surface microstructures. Furthermore, micro-prismatic surfaces redirect not only the off-normal rays but also rays that have normal incidence thus impeding the view of objects behind such surfaces.

Accordingly, practical light directing sheet materials are needed that could be implemented with smooth external surfaces and that can be configured to bend light by larger angles. Furthermore, practical light harvesting and light control devices and systems that employ such light directing sheet materials are also needed. These needs and others are met within the present invention, which provides an improved sheet-form structure for redirecting off-normal light rays at high bend angles without the need of outer surface texturing and also provides a method of making the same. The improved sheet-form structure employs internal TIR surfaces to efficiently redirect light and can also be made thin and flexible, finding utility in various light control devices and systems.

BRIEF SUMMARY OF THE INVENTION

The present invention solves a number of light redirecting problems within a sheet-form optically transmissive material having a layered structure with a soft and elastic polymeric core material sandwiched between outer sheets of a rigid plastic or glass material. Apparatuses and methods are described for directing and redistributing light using such sheet-form material. The light redirecting functionality is provided by an array of thin reflectors embedded into the body of the core material and configured to reflect at least a portion of light incident onto the sheet surface from an off-normal direction. In at least one embodiment, the reflectors comprise deep and narrow channels formed in a surface of the core material and configured to reflect light by means of a total internal reflection (TIR). Off-normal light rays intercepted by the reflectors can be redirected at high deflection angles with respect to the incident direction.

In at least one embodiment, the invention features a light directing sheet having optically transmissive layers including a layer of an elastic material attached a layer of a rigid material and having one or more arrays of parallel channels formed in its surface and configured to reflect light by means of TIR. In at least one implementation, the light directing sheet includes another layer of a rigid material attached to an opposite surface of the elastic layer. In at least one implementation, the layer(s) of a rigid material are permanently bonded or welded to the layer of an elastic material. In at least one implementation, the light directing sheet features smooth outer surfaces and configured to have a transparent or substantially transparent appearance along at least normal viewing angles. In different implementations, the light directing sheet can have various features that alter its optical properties, including but not limited to surface texture, light diffusing features, color tint or filtering features. In different implementations, the elastic material of the light directing sheet can include optically clear or translucent plasticized polyvinyl chloride (PVC-P), thermoplastic polyurethane (TPU), various thermoplastic elastomers or silicones.

According to an aspect of the invention, the TIR channels can be arranged in two parallel arrays crossed at an angle with respect to each other. In at least one implementation, such channel arrays are perpendicular to each other. In different implementations, the channel arrays are formed in the same layer or in different layers of the same or different optically transmissive clear materials.

In at least one implementation, the rigid material is selected from the group of optically transmissive materials consisting of glass, poly(methyl methacrylate), polycarbonate, polystyrene, rigid polyvinyl chloride, polyester, and cyclic olefin copolymer.

In different implementations, the light directing sheet has a rectangular shape and each of the plurality of channels is aligned parallel to either a longer or a shorter dimension of the rectangular shape.

According to an aspect of the invention, the TIR channels have substantially smooth surfaces characterized by a root mean square surface profile roughness parameter of at most about 60 nanometers at a sampling length of between 20 and 100 micrometers. According to another aspect, a root mean square surface profile roughness parameter of at least a substantial portion of the surface of each channel is at least about 10 nanometers at a sampling length of between 20 and 100 micrometers In at least one implementation, the thickness of the layer of an elastic material is between 200 micrometers and 2 millimeters.

In at least one implementation, at least one edge of the light directing sheet material is made impermeable to moisture and/or air.

In various implementations, the light directing sheet can be attached to surfaces of various glazing materials. In one implementation, the light directing sheet is attached to a window of a building façade. In one implementation, the light directing sheet is attached to a light transmitting surface of a skylight structure. In one implementation, the light directing sheet is attached to the surface of glazing of a greenhouse structure.

In at least one embodiment, the invention features a method for making an optically transmissive light directing sheeting. According to one aspect, the sheeting includes an inner sheet of a soft and flexible material sandwiched between a first and a second outer sheets of rigid material, where the inner sheet including a plurality of narrow channels configured to reflect light by means of a total internal reflection. In at least implementation, the method includes a step of forming at least one array of substantially parallel slits in the inner sheet, a step of stretching the inner sheet in a direction perpendicular to the slits, and a step of bonding a major surface of the inner sheet to a major surface of the first outer sheet. In at least implementation, the step of forming at least one array of substantially parallel slits includes a process of slitting the surface of the inner sheet with one or more razors or rotary blades. In at least implementation, the method further includes a step of bonding an outer surface of the inner sheet to the second outer sheet.

In various embodiments the invention also features different devices for redistributing the light beam emitted by various sources.

In at least one embodiment, the invention features a lighting fixture including a light source, a sheet of optically clear plastic material having a plurality of linear reflectors embedded into the material, where each of the linear reflectors has at least one surface configured to intercept at least a portion of light emanated by the light source and reflect such portion of light by means of a total internal reflection.

In at least one embodiment, the invention features a window covering including a multi-layer sheet of an optically transmissive material having a first and a second outer layers of a rigid material and a core layer of a soft material. The core layer includes a plurality of linear reflectors aligned parallel to a reference line and configured to deflect light propagating through the sheet by means of a total internal reflection.

In at least one embodiment, the invention features a slat of a window or door blinds system. Such slat includes a strip of an optically clear plastic material having a plurality of linear reflectors embedded into the material where each of the linear reflectors has at least one surface configured to reflect light by means of a total internal reflection. In different implementations, each of the linear reflectors is aligned either parallel or perpendicular to a longitudinal dimension of the strip.

In at least one embodiment, the invention features a light redirecting awning including a sheet of an optically clear and flexible material stretched over a frame and having a plurality of parallel linear reflectors embedded into the flexible material, where each of the reflectors has at least one surface configured to reflect light by means of a total internal reflection.

In at least one embodiment, the invention features a light redirecting skylight structure including a plurality of optically transmissive vanes incorporated into a planar horizontal array, where each of the vanes is positioned at an angle with respect to a horizontal plane and comprises the light directing sheet material having a plurality of internal reflectors extending perpendicular to a vane surface. In various implementations, the optically transmissive vanes are arranged into one or more asymmetric or symmetric arrays. In at least one implementation, the optically transmissive vanes make an angle of less than 45 degrees with respect to a horizontal plane. In at least one implementation, the angle is less than 30 degrees.

In at least one embodiment, the invention features a light redirecting skylight insert, including the light directing sheet having a thickness of less than 1.5 millimeters. In different implementation, the shape is a truncated pyramid, a truncated cone, a combination thereon or a nested array of such shapes.

Further embodiments and elements of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 15 is a schematic view showing the operation of a window covering employing a light directing sheet, according to at least one embodiment of the present invention.

FIG. 16 is a schematic view showing an embodiment of a window covering including a light redirecting area and an opaque area, according to at least one embodiment of the present invention.

FIG. 17 is a schematic view showing an embodiment of a window covering including a flexible sheet of a light redirecting materials and a pair of material-holding bars, according to at least one embodiment of the present invention.

FIG. 25 is a schematic perspective view and raytracing of a lighting diffuser lens employing a light directing sheet and having a rectangular cross section, according to at least one embodiment of the present invention.

FIG. 26 is a schematic perspective view and raytracing of a lighting diffuser lens employing a light directing sheet and having a truncated pyramid shape, according to at least one embodiment of the present invention.

FIG. 27 is a schematic perspective view and raytracing of a lighting diffuser lens employing a light directing sheet and having a cylindrical shape, according to at least one embodiment of the present invention.

FIG. 28 is a schematic perspective view and raytracing of a lighting diffuser lens employing a light directing sheet and having a truncated conical shape, according to at least one embodiment of the present invention.

DETAILED DESCRIPTION OF THE INVENTION

Referring more specifically to the drawings, for illustrative purposes the present invention is embodied in the apparatus and method generally shown in the preceding figures. It will be appreciated that the apparatus and method may vary as to configuration and as to details of the parts without departing from the basic concepts as disclosed herein. Furthermore, elements represented in one embodiment as taught herein are applicable without limitation to other embodiments taught herein, and in combination with those embodiments and what is known in the art.

The present invention particularly seeks to provide a sheet-form light control material capable of angularly selective redirection of off-normal rays and to further provide illumination components employing such material. The material can be configured to transmit a portion of the incident light and redirect a portion of the incident light with the proportions between the transmitted and redirected light depending on the angle of incidence and controlled by the material structure. The material can also be configured to deflect light at variable bend angles depending on the angle of incidence and particularly provide higher bend angles for relatively high angles of incidence.

The following embodiments of the present invention are generally directed to a sheet-form optical article or system which may be configurable for light redirecting operation in response to light incident onto such optical article or system from directions other than normal and may be further configurable for a generally unimpeded passage of light incident from a normal direction.

Figure 1:
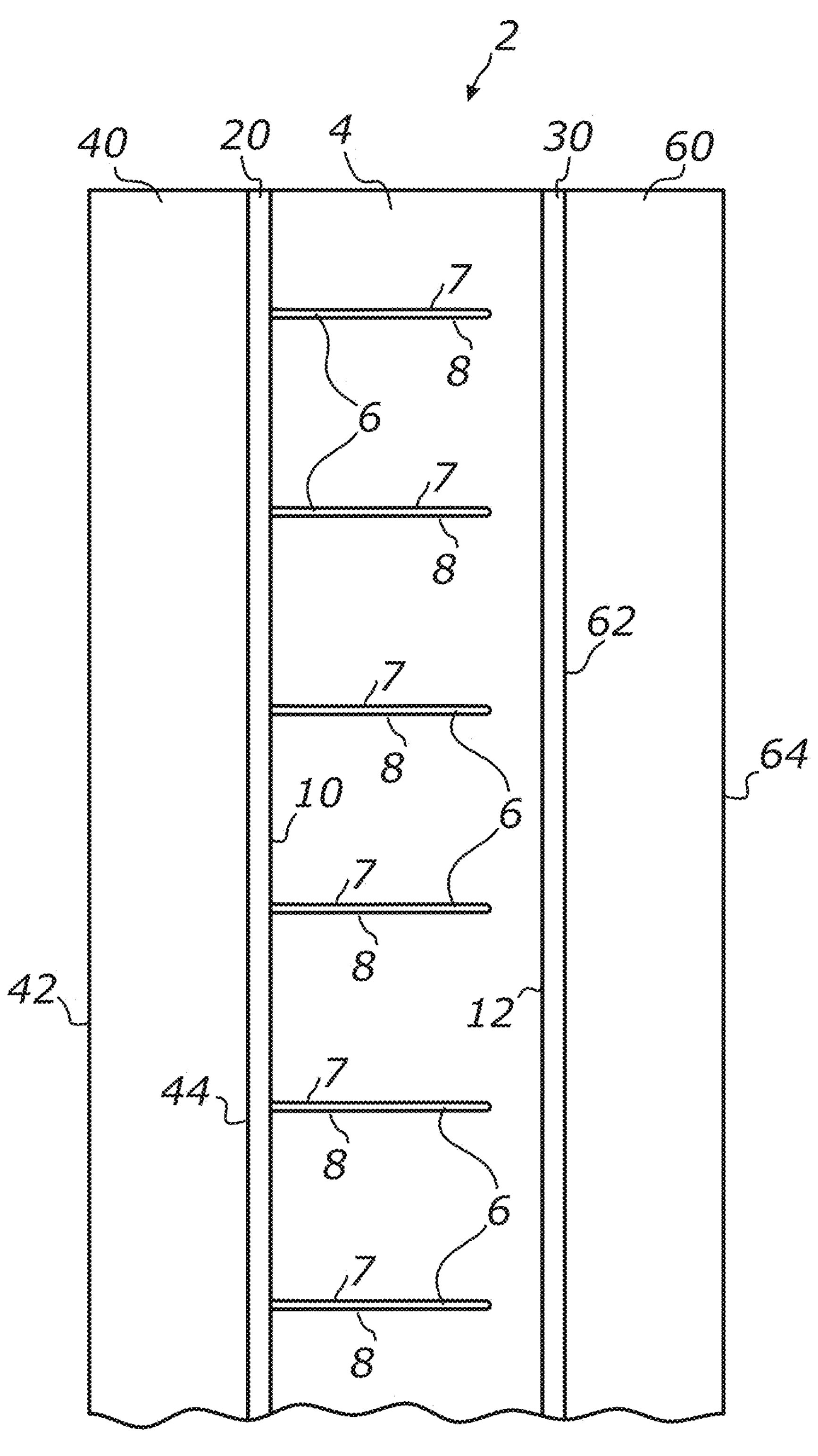
FIG. 1 is a schematic cross section view of a layered light directing sheet material, according to at least one embodiment of the present invention.

FIG. 1 illustrates a first embodiment of a light directing sheeting of the invention. In this embodiment, a light directing sheet 2 has a multi-layer structure and is formed by a first outer sheet 40, a second outer sheet 60, and an intermediate third sheet 4 sandwiched between sheets 40 and 60. The inner sheet 4 is defined by a first major surface 10 and an opposing second major surface 12. The first outer sheet 40 is defined by a major surface 42 facing away from sheet 4 and an opposing major surface 44 facing sheet 4. The second outer sheet 60 is defined by a major surface 62 facing sheet 4 and an opposing major surface 64 facing away from sheet 4. Accordingly, major surfaces 42 and 64 of the respective sheets 40 and 60 define opposing outer boundaries of light directing sheet 2.

Sheets 4, 40, and 60 should be made from optically transmissive materials. Such materials should preferably be optically clear or at least translucent with relatively high light transmissivity so that sheet 2 can effectively transmit at least a substantial portion of light that enters onto either one of the outer surfaces 42 and 64.

The outer sheets 40 and 60 are made from rigid materials. Preferred materials for layers 40 and 60 include but are not limited to glass, poly(methyl methacrylate) (PMMA, acrylic), polycarbonate, polystyrene, rigid polyvinyl chloride, polyester, and cyclic olefin copolymer.

Sheet 4 is made from a relatively soft, flexible and highly elastic material. Such material can be exemplified by plasticized polyvinyl chloride (also frequently referred to as PVC-P, plasticized PVC, flexible PVC or simply vinyl), thermoplastic polyurethane (TPU), and silicone rubber. More broadly, suitable materials for layer 4 may include various Thermoplastic Elastomers (TPEs) that can be repeatedly stretched to a considerable relative elongation with an ability to return to their approximate original length when stress is released. The material selected for layer 4 should preferably be optically clear but may also have some tint or haze that do not substantially impair its light transmissive properties.

The thickness of sheet 4 may be selected from a range of thicknesses that is typical to films or thin sheets of plastic materials. According to a preferred embodiment, the thickness of sheet 4 is between 200 micrometers and 2 millimeters.

Sheets 40 and 60 may be bonded to the respective surfaces of sheet 4 using optically transmissive adhesives. For example, referring to FIG. 1, sheet 40 may be bonded to surface 10 of sheet 4 with an optically clear adhesive layer 20 and sheet 60 may be bonded to the opposing surface 12 of sheet 4 with an optically clear adhesive layer 30.

The major surfaces of sheet 4 may have a smooth finish and may also be calendered for high gloss and optical transmissivity. Alternatively, either one or both major surfaces of sheet 4 may have some roughness to promote adhesion. However, such roughness should normally be kept to a minimum in order to maintain high overall transmissivity of sheet 2. The outer surfaces 42 and 64 may also be made smooth with a gloss finish or can be provided with a functional or decorative texture.

The rigidity of the outer sheets 40 and 60 should be sufficient to provide at least some minimum flexural rigidity and dimensional stability to sheet 2. Other structural functions of sheets 40 and 60 may include but are not limited to maintaining a planar or other pre-defined three-dimensional shape of sheet 2 as well as preventing wrinkling, elongation or excessive flexing of the panel which may otherwise result from employing soft and flexible materials, such as for example, TPU or plasticized PVC, for the inner sheet 4. It will be appreciated that the layered sandwich structure of sheet 2 may result in such panel having a considerably greater flexural rigidity compared to the individual sheets 40 and 60 and may even exceed the combined flexural rigidity of such sheets when used individually. In most applications, the flexural stiffness of common rigid plastic materials such as polycarbonate, rigid PVC, polyester or acrylic of comparable thickness should be deemed sufficient for finished sheet 2.

Since the thickness of a rigid sheet significantly impacts its flexural rigidity, the thickness of sheets 40 and 60 should be appropriately selected based on the desired application and the overall dimensional parameters of panel 4. In one embodiment, at least one of sheets 40 and 60 may have the thickness of at least one fifth of the thickness of sheet 4. For example, when the thickness of layer 4 is around 1 millimeter, the thickness of layer 40 may be 200 micrometers or greater. However, it should be understood that various applications may require such minimum thickness of sheet 40 and/or 60 to be different, e.g., 0.5 mm, 1 mm, 1.5 mm, 2 mm, etc.

In some cases, flexing of panel 4 may need to be even further minimized or almost eliminated. For example, when sheet 40 is made from glass, even limited bending may result in breakage of the sheet. In another example, sheet 2 may be required to maintain strictly planar shape even at some loads. In such cases, the thickness of sheet 40 can be made 3-4 millimeters or more. Substantially greater thicknesses (e.g., 6 mm or more) may be needed when sheet 2 form a panel that is several meters across.

Referring yet further to FIG. 1, sheet 4 includes a plurality of substantially parallel, narrow channels 6 extending into the material of the sheet perpendicularly to surface 10 (and thus perpendicularly to the prevailing plane of sheet 2). Each channel 6 has parallel or near-parallel opposing walls 7 and 8 spaced apart by a relatively small distance.

The distance between walls 7 and 8 should be substantially less than the depth of the channel. According to an embodiment of the present invention, the depth of each channel 6 may be at least approximately ten times the average width of the channel. By way of example and not limitation, the average width of each channel 6 may be approximately 20 micrometers or less and the depth of the channel may be at least 200 micrometers. In at least some embodiments, the ratio between the depth and width of channels 6 may be advantageously selected to exceed 15 or 20 times. It may be appreciated that, since sheet 4 is sandwiched between rigid sheets 40 and 60, channels 6 disposed between surfaces 10 and 12 can be protected from the environment and resist soiling and moisture ingress. Furthermore, the rigid sheets 40 and 60 can ensure that the opposing walls 7 and 8 of channels 6 do not close upon each other when sheet 2 is subjected to stresses or deformations during use.

Each of the walls 7 and 8 should have a substantially smooth surface capable of reflecting light by means of a total internal reflection in a specular or near-specular regime while minimizing scattered light. It should be understood that the surfaces of walls 7 and 8 do not have to be absolutely smooth to provide such operation. It can be shown that walls 7 and 8 may provide good reflectivity even with some non-negligible surface roughness as long as such roughness is significantly less than the wavelength. According to one embodiment, a root-mean-square (RMS) roughness parameter of the surface of walls 7 and 8 may be within the range between 0.01 micrometers (10 nanometers) and 0.06 micrometers (60 nanometers), and more preferably between 0.01 micrometers (10 nanometers) and 0.03 micrometers (30 nanometers). The preferred sampling length for measuring such RMS roughness parameter should be between 20 and 100 micrometers and should not generally exceed the depth of channels 6.

By way of example, the inner sheet 4 may have a general structure, operation and/or manufacturing method described in U.S. Pat. No. 9,007,688 to Vasylyev (issued Apr. 14, 2015), herein incorporated by reference in its entirety. It is noted that, where a definition or use of a term in a reference, which is incorporated by reference herein is inconsistent or contrary to the definition of that term provided herein, the definition of that term provided herein applies and the definition of that term in the reference does not apply.

Figure 2:
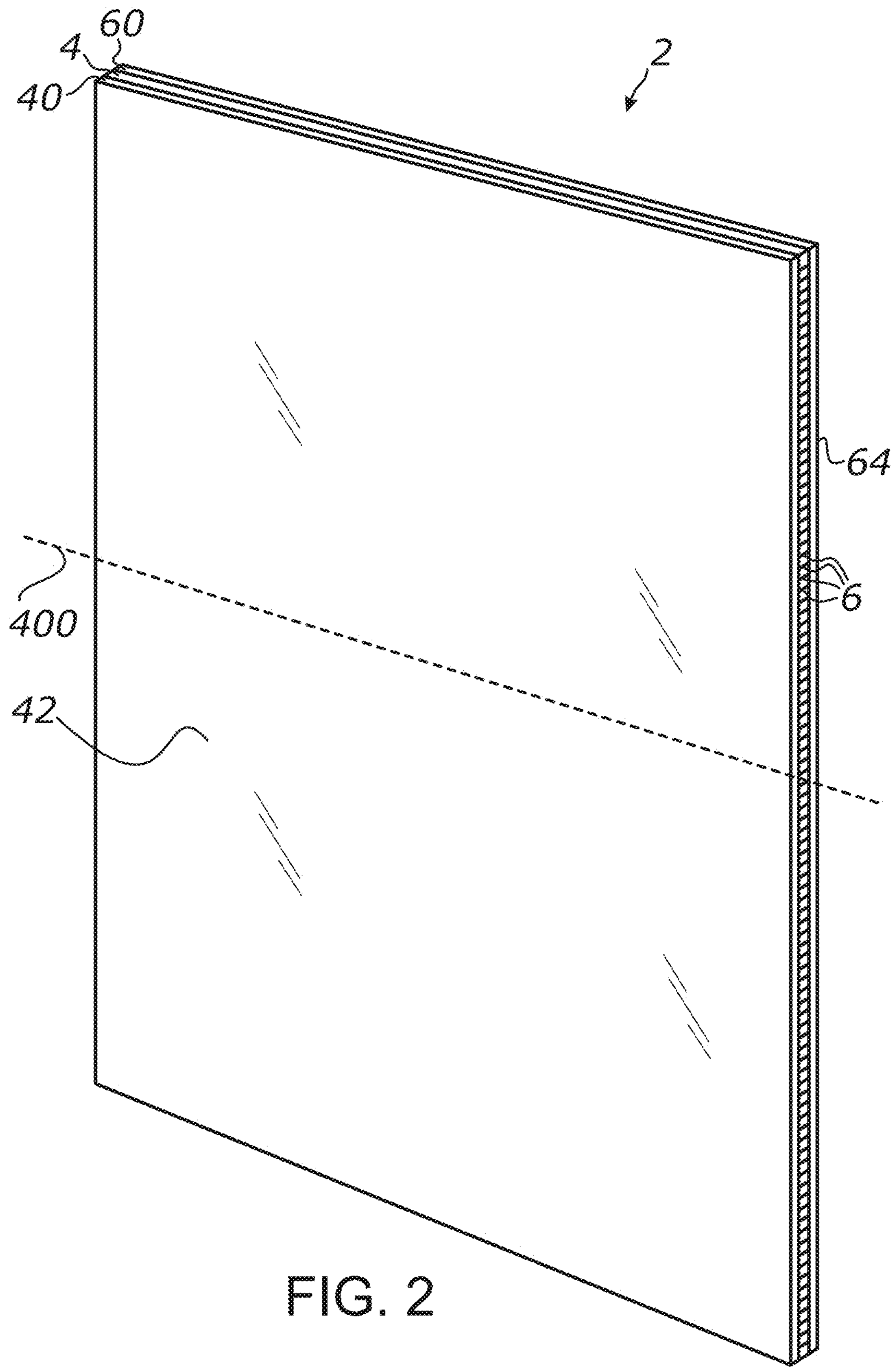
FIG. 2 is a schematic perspective view of a light directing sheet having a rectangular shape, according to at least one embodiment of the present invention.

Referring to FIG. 2, sheet 2 may have a generally planar appearance and a rectangular shape. One or more edges of sheet 2 may be sealed using an air and/or moisture impermeable encapsulating resin or tape. In one embodiment, the entire perimeter of sheet 2 may be sealed which could prevent layers delamination, moisture ingress and/or contamination of channels 6 with dirt or dust.

While sheets 4, 40 and 60 are shown having identical dimensions in FIG. 2, it should be understood that such sheets may have different dimensions as well. For instance, according to at least one embodiment, one of the sheets may have greater or smaller width and/or length with respect to the other two sheets. In a more specific non-limiting instance, one or both major dimensions of sheets 4 and 40 may be smaller than the respective dimensions of sheet 60. This may be useful, for example, for providing light directing properties to only a portion of sheet 2. The free portion of sheet 60 may be used for purposes other than light redirection, e.g., for attaching sheet 2 to other structures.

According to one embodiment, sheet 60 may represent a planar glass window pane in a building façade and may be a part of optically transmissive glazing such as a wall window, a clerestory window, a door window, a roof window, a skylight, and the like. In such a case, sheets 4 and 40 may have identical dimensions with an area smaller than the area of the glass pane (sheet 60) and thus cover only a certain portion of the pane. Sheets 4 may be first bonded to sheet 40 using optically clear adhesive layer 20 and the resulting sandwich of sheets 4 and 40 may subsequently be laminated onto the surface of the window pane using optically clear adhesive 30. In an exemplary case of the material of sheet 4 having a sufficiently high surface energy, surfaces 12 and 62 may be attached to each other by means of intermolecular attraction (often referred to as "static cling" mechanism) and without the use of adhesive layers.

Surface 12 may be specially configured to make sheet 4 attachable to a smooth glass surface by means of lamination. For this purpose, surface 12 may be optionally calendered using is a series of hard pressure rollers to enhance its smoothness. In order to further enhance the lamination efficiency and/or adhesion to glass, surface 12 may be specially treated for high surface energy or static cling properties, e.g., by using plasma, corona process or chemical treatment.

A predefined reference line 400 in FIG. 2 indicates the orientation of channels 6 in the finished sheet 2. Reference line 400 may have any suitable orientation with respect to the edges of the sheet. It is generally preferred, however, that reference line 400 is parallel to one of the edges of sheet 2.

Figure 3:
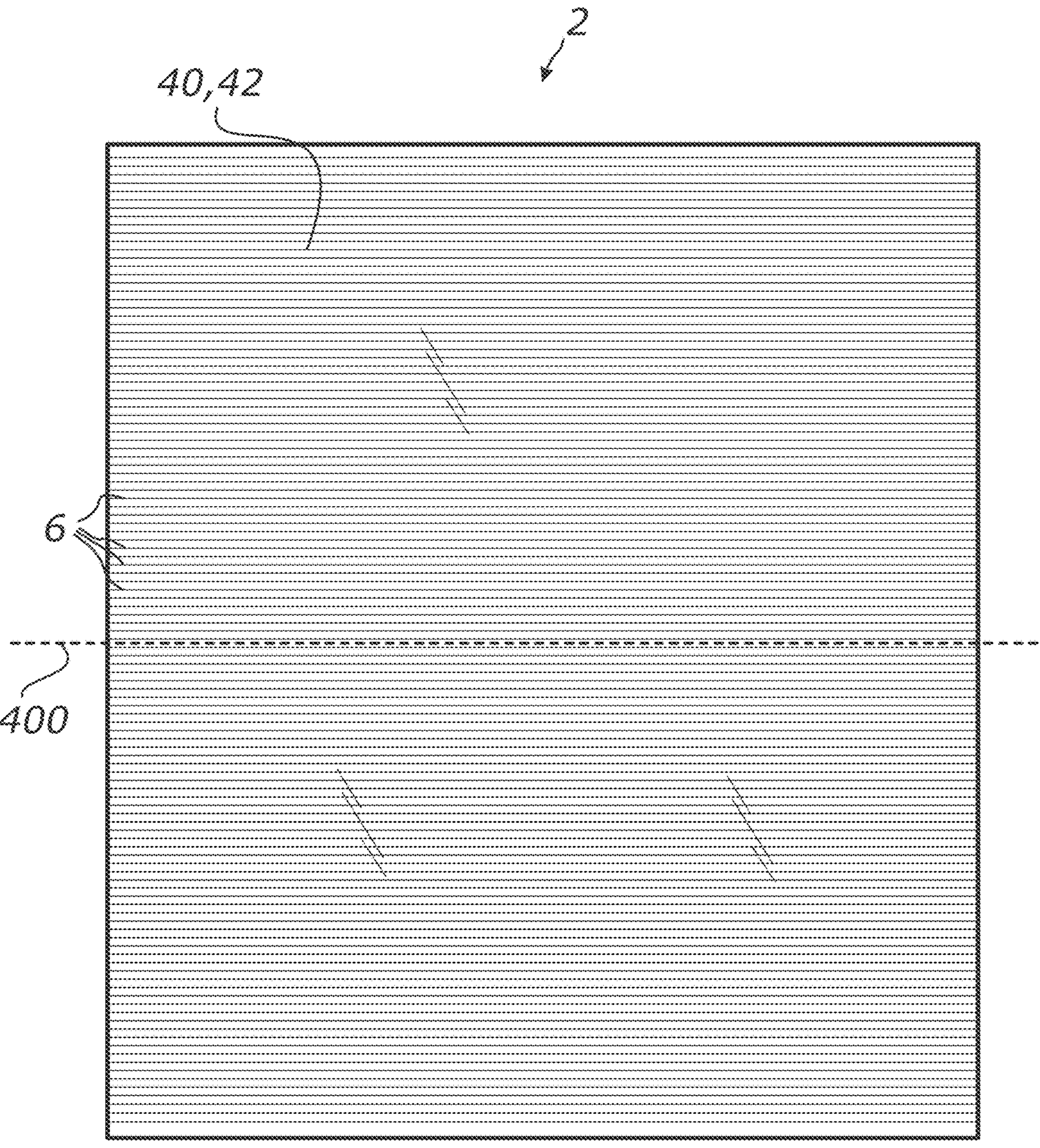
FIG. 3 is a schematic top view of a light directing sheet, showing a plurality of substantially parallel channels aligned along a common reference line, according to at least one embodiment of the present invention.

In FIG. 3 illustrating an embodiment of rectangular sheet 2, reference line 400 extends parallel to a shorted major dimension of sheet 2. According to an alternative embodiment, reference line 400 is parallel to a longer major dimension of the rectangular sheet 2.

Figures 4, 5:
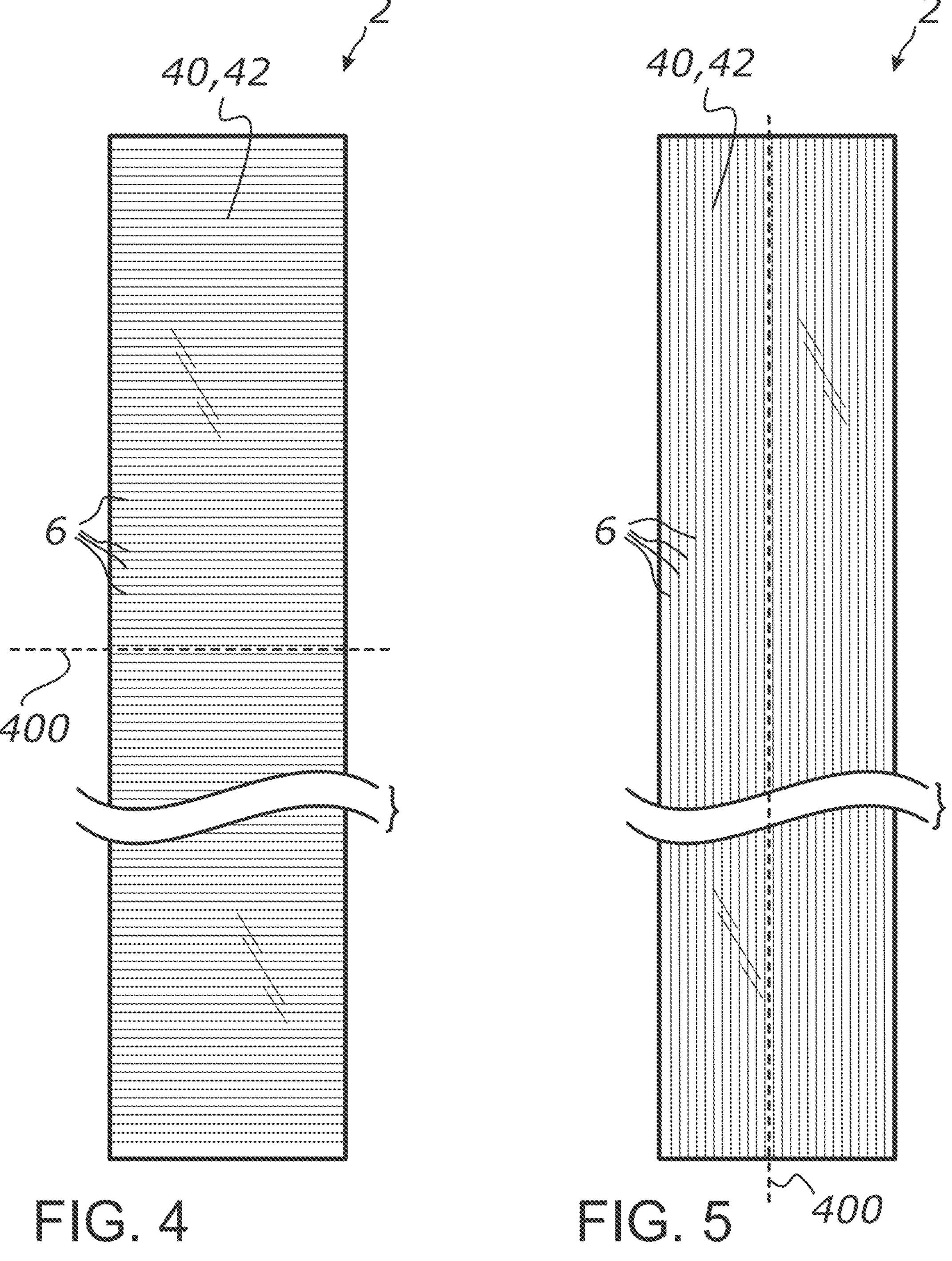
FIG. 4 is a schematic view of a strip of a light directing sheet material, showing light directing channels extending parallel to a shorter dimension of the strip, according to at least one embodiment of the present invention.
FIG. 5 is a schematic view of a strip of a light directing sheet material, showing light directing channels extending parallel to a longer dimension of the strip, according to at least one embodiment of the present invention.

The dimensions of light directing sheet 2 may vary in a broad range. Particularly, referring to FIG. 4, sheet 2 may be implemented in the form of a rectangular strip where the parallel channels 6 extend perpendicular to the longitudinal axis of the strip. In an alternative configuration shown in FIG. 5, channels 6 extend parallel to the longitudinal axis of the strip.

Figure 6:
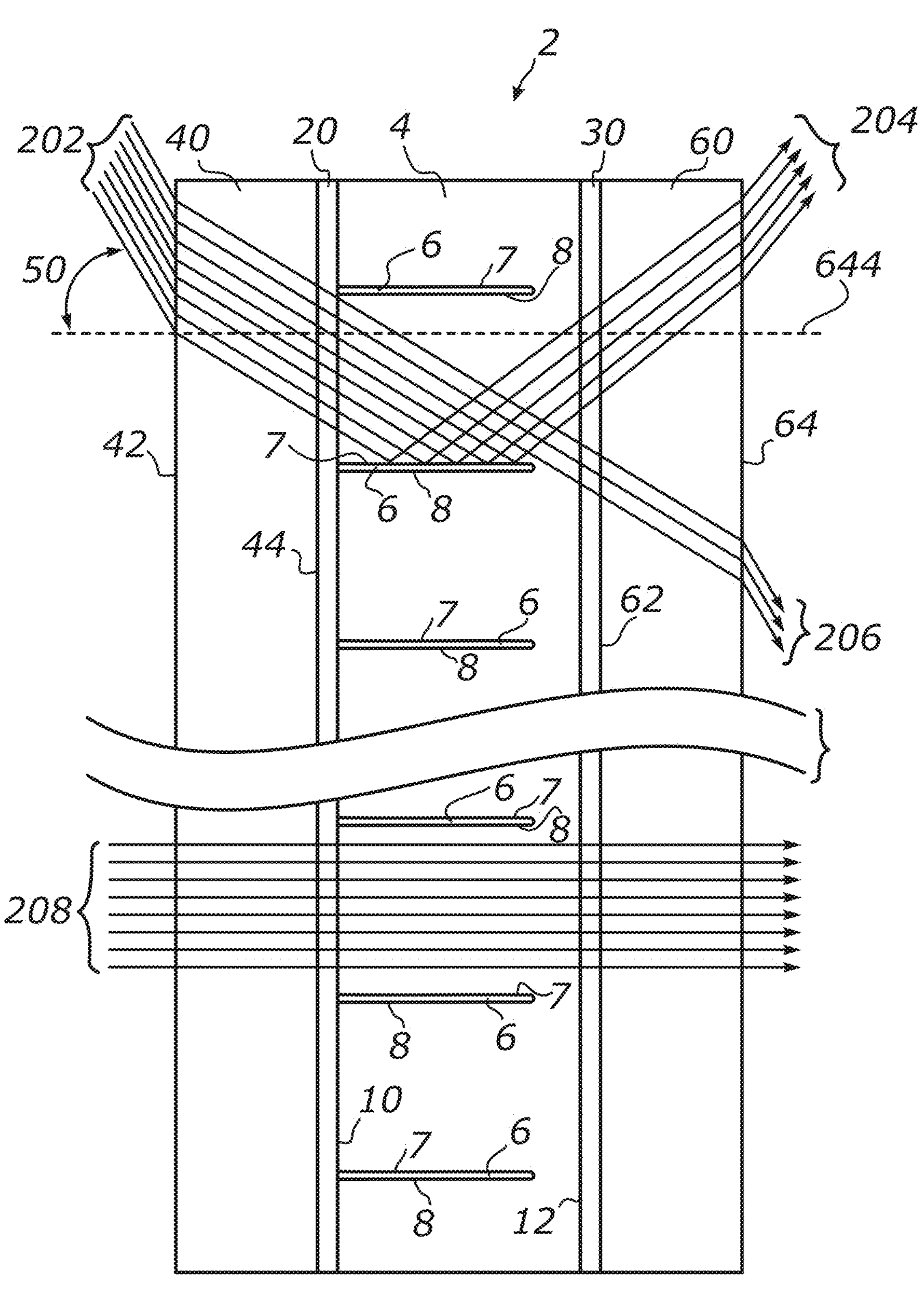
FIG. 6 is a schematic cross section view and raytracing of a light directing sheet material, according to at least one embodiment of the present invention.

FIG. 6 illustrates the operation of sheet 2 in response to incident light, where a ray bundle 202 represents an off-normal parallel beam of light entering surface 42 at an incidence angle 50 with respect to a surface normal 644. In the context of the present invention, the term "off-normal" is meant to characterize light rays having substantially non-zero incidence angles with respect to a surface normal, in contrast to "normal" rays having incidence angles equal to or substantially close to zero with respect to the surface normal. It is noted that, in the case of parallelism of all major surfaces of sheet 2, surface normal 644 will also be a normal to the prevailing plane of the panel and to each of its layers.

A portion of ray bundle 202 is intercepted by one of channels 6 and redirected by means of TIR from wall 7 of the channel. It will appreciated that, when walls 7 and 8 are properly separated from each other by an air gap, the condition of TIR will generally be met for a wide range of incidence angle 50, which can take values of up to 90°. Accordingly, such portion of ray bundle 202 may losslessly reflect from the respective wall 7 and exit from the opposing surface 64, as indicated by a ray bundle 204. It will be appreciated that, due to the parallelism of surfaces 42 and 64 and the perpendicularity of channel 6 to such surfaces, ray bundle 204 will have an emergence angle (with respect to normal 644) equal to the incidence angle 50 and will mirror the propagation path of ray bundle 202 in relation to the prevailing plane of sheet 2. Accordingly, the bend angle provided by sheet 2 is simply a function of the incidence angle 50. More particularly, the bend angle is generally twice the angle of incidence 50.

A ray bundle 206 represents a portion of ray bundle 202 that is not intercepted by the respective channel 6 and can thus be transmitted through sheet 2 without redirection, resulting in ray bundle 206 maintaining the original propagation direction of ray bundle 202 upon the exit from surface 64. Accordingly, the depicted configuration of sheet 4 may be used to split an off-normal light beam into two beams propagating away from each other at an angle equal to twice the incidence angle 50. It is noted that the relative distribution of energy between redirected and transmitted light will mainly depend on the geometry of channels 6 and the incidence angle 50. At a given incidence angle, the proportions between the redirected and transmitted light will depend on the ratio between the depth of channels 6 and their spacing. Accordingly, light redirecting properties of sheet 2 may be controlled by selecting the appropriate density at a given depth of channels 6 or, conversely, by selecting the appropriate depth of channels 6 at a given spacing between individual channels.

A ray bundle 208 exemplifies light propagating along a normal direction with respect to a surface of sheet 2. Since ray bundle 208 propagates generally parallel to the plane of channels 6, each ray is transmitted by sheet 2 without any redirection. This illustrates the operation of sheet 2 in which it provides for a generally unimpeded normal-incidence light passage and can therefore have a substantially transparent appearance along the normal viewing direction. When a particularly good view through sheet 2 is required, the width of each channel 6 may be advantageously minimized to make such channels barely visible or even invisible by a naked eye. Obviously, minimizing the width of channels 6 may also increase the useful light throughput of sheet 2 due to minimizing light interception by the edges of channels 6. Accordingly, it may be generally preferred that the average width of channels 6 is below 50 micrometers and may further be preferred that the channel width is below 20 micrometers or even 10 micrometers.

Accordingly, sheet 2 represents an internally microstructured sheet-form structure in which an array of deep and narrow channels 6 embedded into the material of sheet 4 provides an angularly selective operation. The angularly selective operation of sheet 2 in response to the incidence of a light beam onto its major surface resulting in a portion of the incident light being either transmitted or redirected. The proportions between the redirected and transmitted light is defined by the angle of incidence and various parameters of channels 6.

Figure 7:
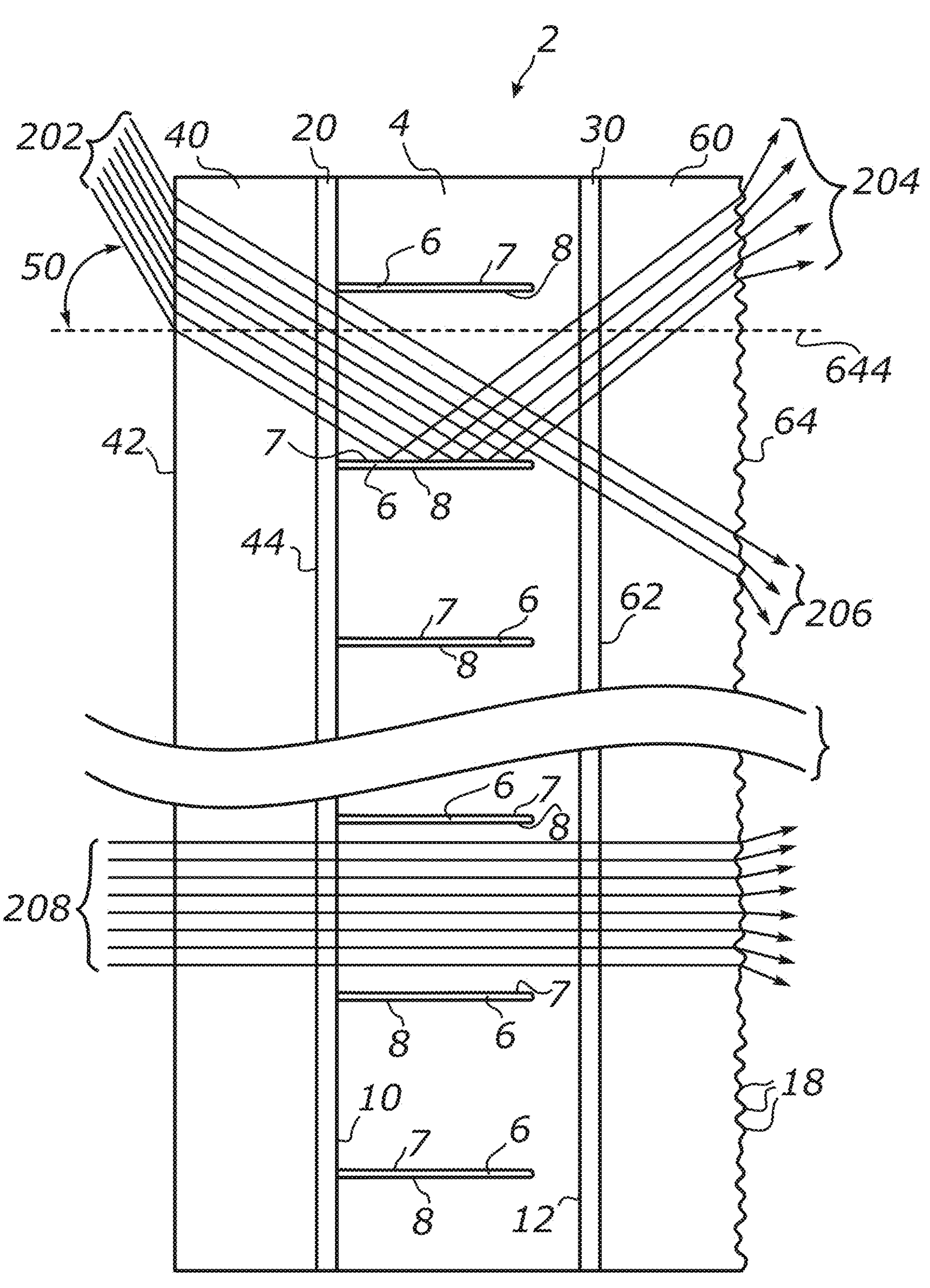
FIG. 7 is a schematic cross section view and raytracing of a light directing sheet material, showing a textured surface formed in an outer layer, according to at least one embodiment of the present invention.

FIG. 7 depicts an alternative configuration of sheet 2 in which surface 64 used for light output is provided with surface microstructures 18 configured for scattering light across a predefined angular range. Such microstructures may be formed by a variety of suitable means and methods, including but not limited to microreplication, embossing, molding or etching of surface 64. Alternatively, suitable microstructures 18 may be formed in an optically transmissive film which can be attached to otherwise smooth surface 64.

Microstructures 18 may be particularly configured to "soften", diffuse or otherwise redistribute light redirected and transmitted by sheet 2. Alternatively, or in addition to this, microstructures 18 may be configured to blur the view for privacy and/or provide decorative functions. Various finishes and patterns commonly used for decorative or light diffusing panels may be formed using microstructures 18, including but not limited to matte, microlens, prismatic, diamond, and "frosted glass". Such microstructures may also be arranged in strips, blocks or various other geometrical or ornamental patterns.

Channels 6 may be formed in sheet 4 by any suitable technique that can produce walls 7 and 8 with sufficiently smooth surface for TIR operation. According to one embodiment, a preferred method of making sheet 2 may include the steps of slitting one of the surfaces of sheet 4 so that a plurality of parallel linear slits is formed that surface, stretching the sheet along a direction perpendicular to the linear slits so that the opposing walls of each slit can be separated from each other, and bonding such surface to a rigid sheet so that the opposing walls separated apart in the previous steps can be permanently fixed in that state and can form stable, yet narrow channels 6. Such method is illustrated in FIG. 8*a-d*.

Figure 8:
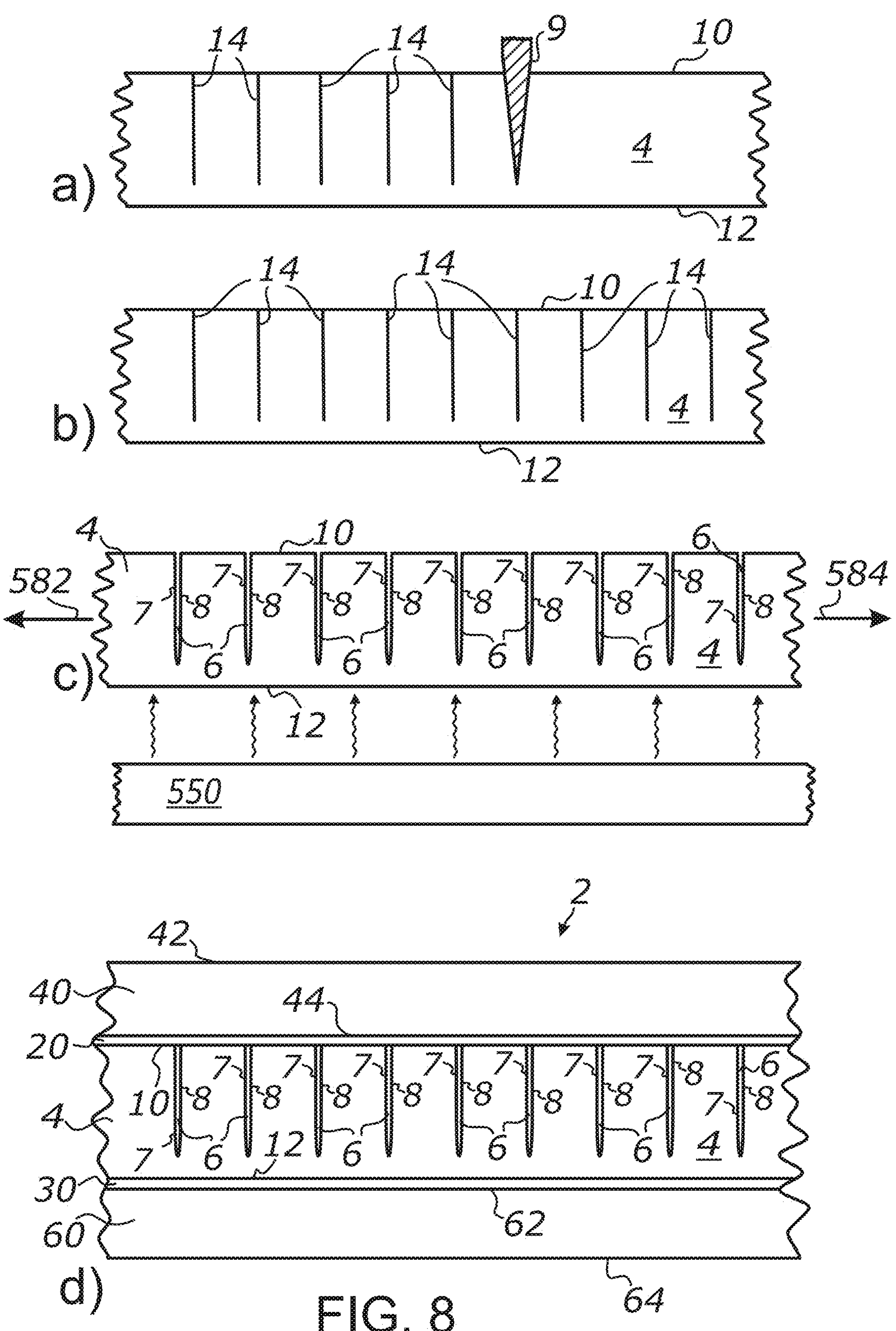
FIG. 8 is a schematic view illustrating a method of making a light directing sheet material, showing steps of slitting a sheet of soft and elastic material using a blade or razor, stretching the sheet in a direction perpendicular to the slits, and laminating the processed sheet between two outer sheets of a rigid material, according to at least one embodiment of the present invention.

Referring to FIG. 8*a*, a rotary blade 9 is used to slit surface 10 and form a plurality of parallel linear slits 14 that extend deep into the material of sheet 4.

Blade 9 penetrates relatively deep into the material of sheet 4 and makes the cut by wedging the material out to the sides on its way. The elasticity and easy deformability of the material is essential since it permits for a relatively easy cut formation. The material deforms elastically and relatively easily yields under the cutting pressure, leaving a clean cut without chipping, crazing or irregular tearing. The elastic-type of the deformation on the cutting pressure of blade 9 also ensures that the material returns to its original shape after slitting in the respective area and that channels 6 are formed with straight and parallel walls.

Accordingly, it is preferred that the material selected for sheet 6 has a sufficiently high elastic range. The elastic range can be defined as the maximum deformation (or strain) at which a material reaches its yield strength (or the so-called proportional limit). In other words, the elastic range represents the maximum deformation (e.g., elongation along a length direction) of the material at which the material is still capable to return to its approximate original dimensions using its elastic properties after the stress is removed.

The elastic range can be expressed in terms of a relative elongation of the material with respect to its original length. According to one embodiment, the material of sheet 4 is configured to have an elastic range of at least 10% of its original length, more preferably at least 30%, even more preferably at least 50%, and even more preferably, at least 100%.

On the other hand, it is preferred that the material of sheet 2 is relatively soft to allow for deep blade penetration without breakage or premature dulling. The hardness typical to most grades of TPU or plasticized PVC at room temperatures can be deemed appropriate for the formation of TIR-quality slits. More generally, the material of sheet 4 should preferably have hardness that is below a durometer hardness value of 95 Shore A (as measured in accordance with ASTM D2240 type A scale) at the time of slitting or at least does not significantly exceed such value. If the plastic material is not sufficiently soft at room temperature, it should be heated and softened before the slitting process begins.

Referring further to FIG. 8*a-d*, the slitting process is repeated until slits 14 cover all of the designated area of surface 10 (FIG. 8*b*). Sheet 4 or its select areas may be pre-heated before slitting in order to further soften the material of the sheet and enhance blade 9 penetration into the material. In order to facilitate the slitting process, sheet 4 can also be stretched along a direction perpendicular to the slitting direction before or during the slitting process.

Blade 9 should be sufficiently sharp with a sub-micrometer curvature radius of the tip, burr-free and made from a hard material. The surface of blade 9 at least near the cutting edge should be highly polished to a very low level of surface roughness. In one embodiment, the average RMS surface roughness parameter of the surface of blade 9 near the cutting edge should preferably be below 100 nanometers and, even more preferably, below 50 nanometers. The average radius of curvature and the peak to valley RMS surface roughness of the tip of the cutting edge should also be preferably less than 50 nanometers, more preferably, less than 20 nanometers, and even more preferably, less than 10 nanometers.

The penetration depth of blade 9 into sheet 4 is primarily defined by the desired depth of the slits 6 to be formed in the sheet. According to one embodiment, the slitting depth should be greater than 25% of the thickness of the sheet material, and more preferably, greater than 50%. On the other hand, the slitting depth should not generally exceed 95% of the overall thickness of the material so that sheet 4 could retain its structural integrity.

Referring to FIG. 8*c*, sheet 4 is stretched along directions 582 and 584 which are generally perpendicular to linear slits 14. A heat source 550 may be used to soften the material of sheet 4 and facilitate its stretching and reduce the load needed to obtain the required elongation. The elongation of sheet 4 in response to such stretching results in the separation of walls 7 and 8 of each slit 14 thus forming narrow channels 6. Such elongation may occur in an elastic deformation mode, a plastic deformation mode, or a combination thereof.

It will be appreciated that, since the effective thickness of the material in the areas below each slit is considerably smaller than the total thickness of sheet 4, the elongation will generally be greater in such areas compared to the adjacent "full thickness" areas. Accordingly, such disproportional elongation of sheet 4 along directions 582 and 584 will favor forming channels 6 and will require applying considerably lower stress compared to the case of stretching sheet 4 when it is intact.

Referring to FIG. 8*d*, rigid sheet 40 is bonded to surface 10 of sheet 4 using optical adhesive layer 20 while sheet 4 is in the elongated or stretched state. The stiffness of sheet 20 should be sufficient to prevent the relaxation of sheet 4 into its original length along the stretch direction. Accordingly, walls 7 and 8 of channels 6 can be permanently separated from each other even if sheet 4 was stretched in an elastic deformation mode. This prevents closing the walls of each channel 6 upon each other and disrupting their TIR operation.

Referring to FIG. 8*d*, rigid sheet 60 is bonded to the opposing surface 12 of sheet 4 using optical adhesive layer 30, thus completing the formation of sheet 2. There are a number of suitable techniques that can be used for bonding rigid sheets 40 and 60 to the soft and flexible inner sheet 4, which may include but are not limited to roll lamination, press lamination, vacuum press lamination, encapsulation and the like. The bonding process may also include curing the adhesive layers 20 and/or 30 using heat, moisture, UV light or other techniques depending on the type of adhesive used.

The outer layers 40 and 60 may also be bonded to the inner sheet 4 using a suitable technique which does not involve any adhesives. Examples of such bonding include but are not limited to heat welding, ultrasonic welding, radio-frequency (RF) welding, solvent welding and the like.

It should be understood that the above-described sequence of steps in a method of making panel 4 is not prescriptive and may be modified on case by case basis. For example, in one embodiment, sheet 4 may be bonded or laminated to sheet 30 before bonding to sheet 40. Alternatively, sheet 4 may be encapsulated by a simultaneous bonding or lamination of layers 40 and 60 to respective surfaces 10 and 12. In one embodiment, the step of stretching sheet 4 along directions 582 and 584 (FIG. 8*c*) may precede the step of slitting surface 10 of such sheet (FIG. 8*a*). In this case, slitting of surface 10 using blade 9 may immediately result in the proper separation of walls 7 and 8 and the formation of channels 6 without the need of additional stretching of sheet 4.

In a further modification of the method of making sheet 2, heat source 550 can be adjusted to deliver temperatures to sheet 4 that are sufficient for annealing its material and permanently fixing the width of channels 6 that was formed during the material stretching. Sheet 4 can be exposed to such elevated temperature for a period of time sufficient to convert of at least a portion of the elastic deformation into the plastic one. Such annealing can be advantageous for removing the residual stresses in the finally formed sheet 2 and preventing its warping of the slippage of sheet 4 between sheets 40 and 60.

Referring back to FIG. 8*a*, if the material of sheet 4 has a glass transition temperature $T_g$, the working temperature for the slitting process should generally be considerably greater than $T_g$. At least some optically clear plastic materials, such as TPU or highly-plasticized PVC, often have $T_g$ which is significantly lower than the room temperature and may allow for proper slitting of sheet 4 without additional heating. However, even in this case, heating sheet 4 to above the room temperature may still be useful, for instance, for minimizing the wear of blade 9, reducing its friction with the materials being slit or for enhancing the quality of the slits. In a non-limiting example, when sheet 4 is made from a material with $T_g$ of around 5° C., the working temperature may be set to 30° C. or more.

It will be appreciated that, as the temperature gradually increases and reaches a certain temperature, at least some polymeric materials would lose their stiffness and becomes elastic like a rubber. Accordingly, the method illustrated in FIG. 8*a*-*d* may be extended to include processing of plastic materials that are rigid or semi-rigid at room temperature. By heating such materials during the steps of slitting and/or elongation of sheet 4 in the elastic or plastic-elastic mode, suitable arrays of parallel channels 6 may be produced. Accordingly, the inner sheet 4 including TIR reflectors may be formed from such rigid or semi-rigid materials without departing from the general scope of this invention.

Figure 9:
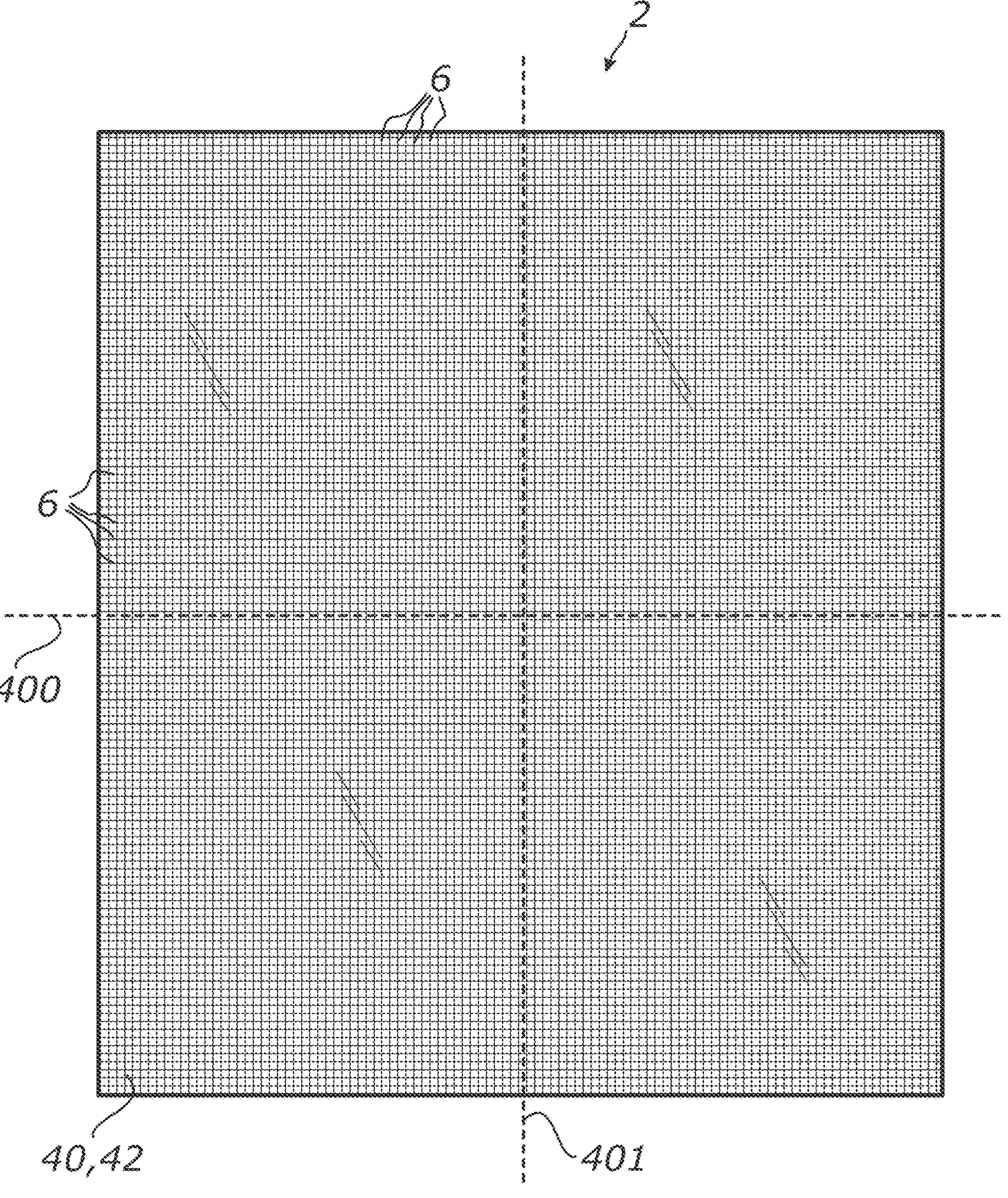
FIG. 9 is a schematic top view of a light directing sheet, showing two linear arrays of parallel slits crossed at a right angle with respect to each other, according to at least one embodiment of the present invention.

The arrangement of parallel channels 6 in sheet 4 is not limited to forming an array of such channels extending parallel to a particular reference line. Sheet 4 may also include other arrays of channels 6 crossed an angle to that array. Referring to FIG. 9, a first array of channels 6 extends parallel to reference line 400 and a second array of channels 6 extends parallel to a reference line 401, where reference lines 400 and 401 are perpendicular to each other. It will be appreciated that such configuration of sheet 4 with two perpendicular arrays of channels 6 may be used for redirecting light in two orthogonal directions.

Figure 10:
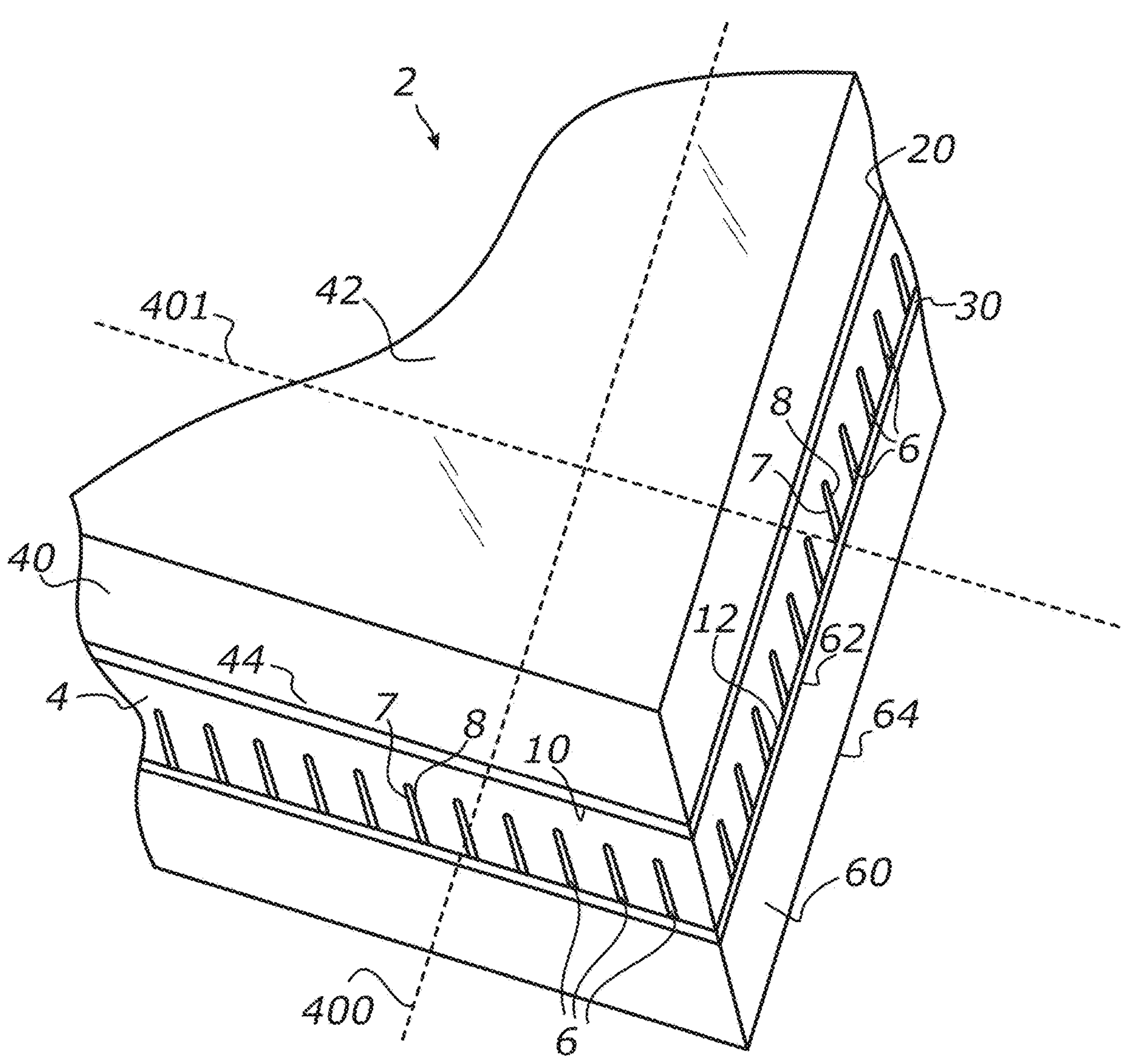
FIG. 10 is a schematic perspective view of a portion of a multi-layer light directing sheet material, showing perpendicular arrays of parallel channels formed in an inner layer of the material, according to at least one embodiment of the present invention.
Figure 11:
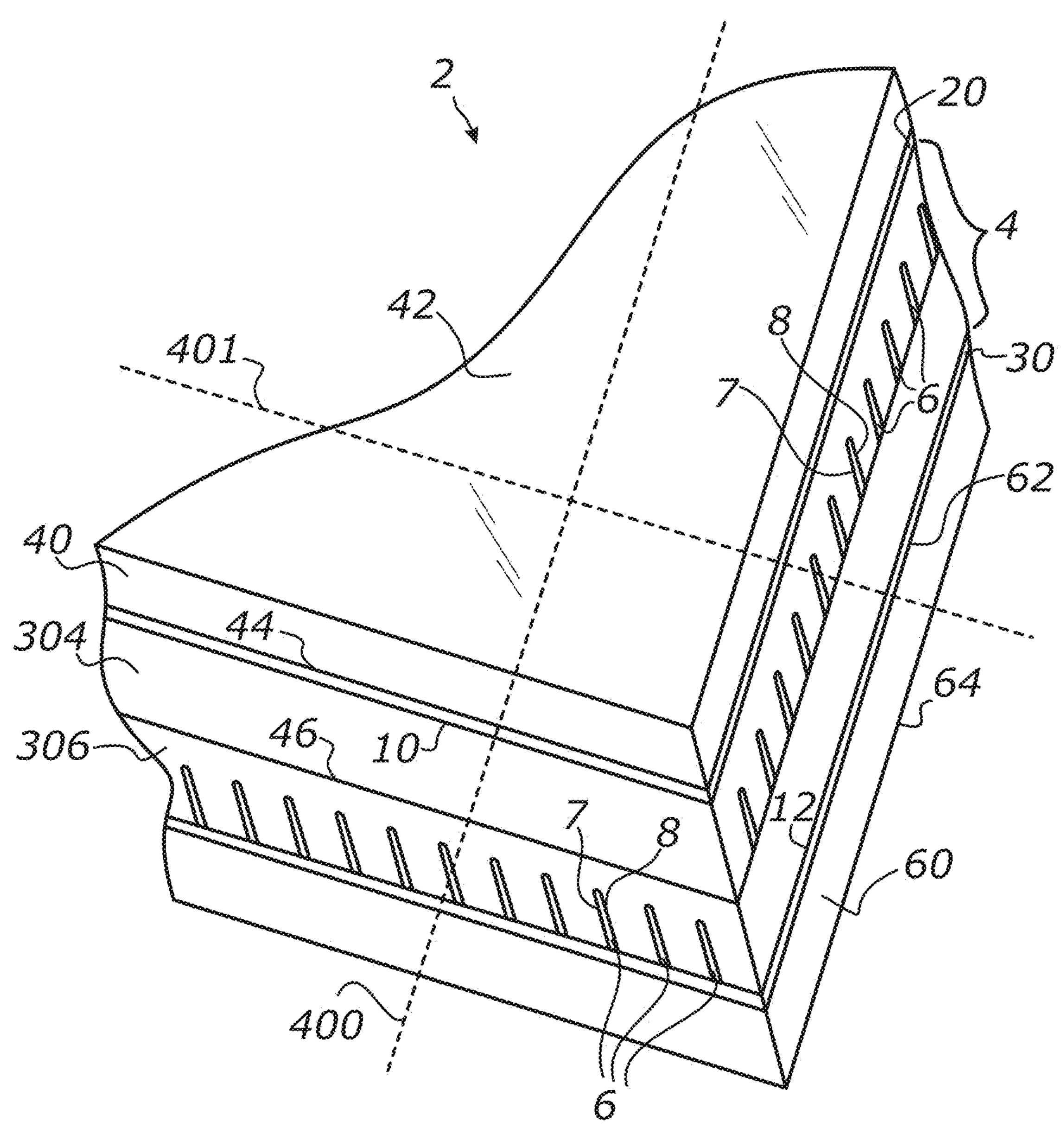
FIG. 11 is a schematic perspective view of a portion of a multi-layer light directing sheet material, showing perpendicular arrays of parallel channels formed in different inner layers of the material, according to at least one embodiment of the present invention.

Such perpendicular arrays of channels 6 may be formed in the same layer of sheet 4, as illustrated in FIG. 10. Alternatively, sheet 4 may be formed by two or more layers superimposed on one another and the respective arrays of channels 6 may be formed in those different layers. For example, referring to FIG. 11, sheet 4 may include a layer 304 where the first array of parallel channels 6 is formed and a layer 306 where the second array of parallel channels 6 is formed.

Figure 12:
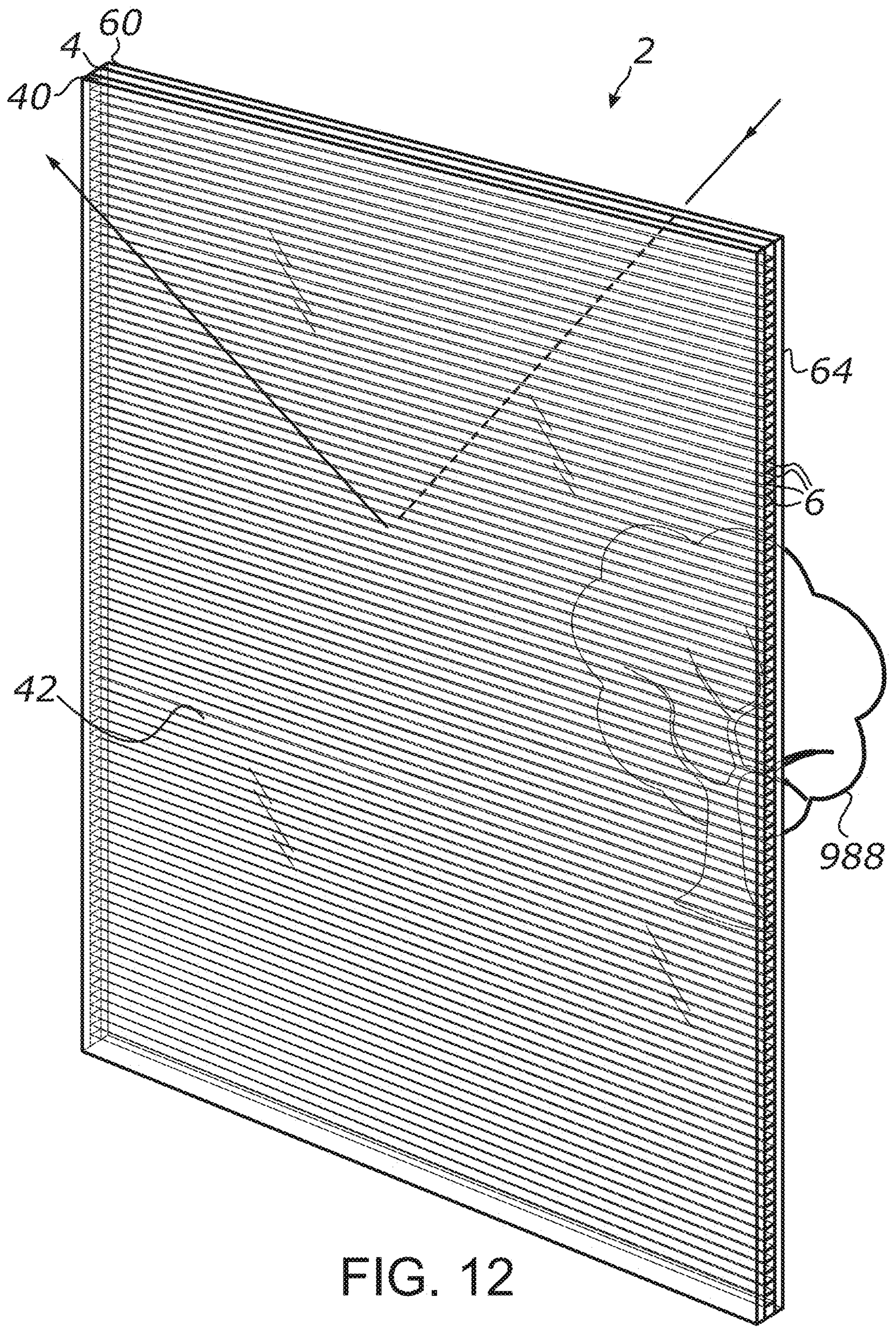
FIG. 12 is a schematic perspective view of sheet of a light directing material having a transparent appearance, according to at least one embodiment of the present invention.

It is noted that all of the layers of sheet 2 materials can be made of optically clear materials with smooth surfaces in which case sheet 2 can be made substantially transparent at least along normal or near-normal viewing directions. Since the proportions between transmitted and redirected light can be precisely controlled by the structure of sheet 4 (e.g., by varying the channel spacing at a constant channel width) sheet 2 can be configured to maintain at least some transparency even at off-normal viewing angles. This is illustrated in FIG. 12 which shown an object 988 that can be viewable through the light-redirecting sheet 2.

It is further noted that the appearance of sheet 2 may also be configured in a number of ways. For instance, a pigment may be added to its materials thus altering its color or transparency. Particularly, the optical clarity either sheet of sheet 2 may be purposefully reduced so that objects behind the sheet can be masked and/or blurred. In one embodiment, one or more layers of sheet 2 may be tinted or configured for suitable light filtering properties, such as blocking of the infra-red or ultra-violet rays, etc. Also, any suitable image or pattern may be printed on either surface of sheet 2 for decorative purposes. The print may be opaque or transparent/semitransparent and suitable printing techniques may include but are not limited to digital printing, screen printing, stencil-printing, selective dyeing and painting.

Figure 13:
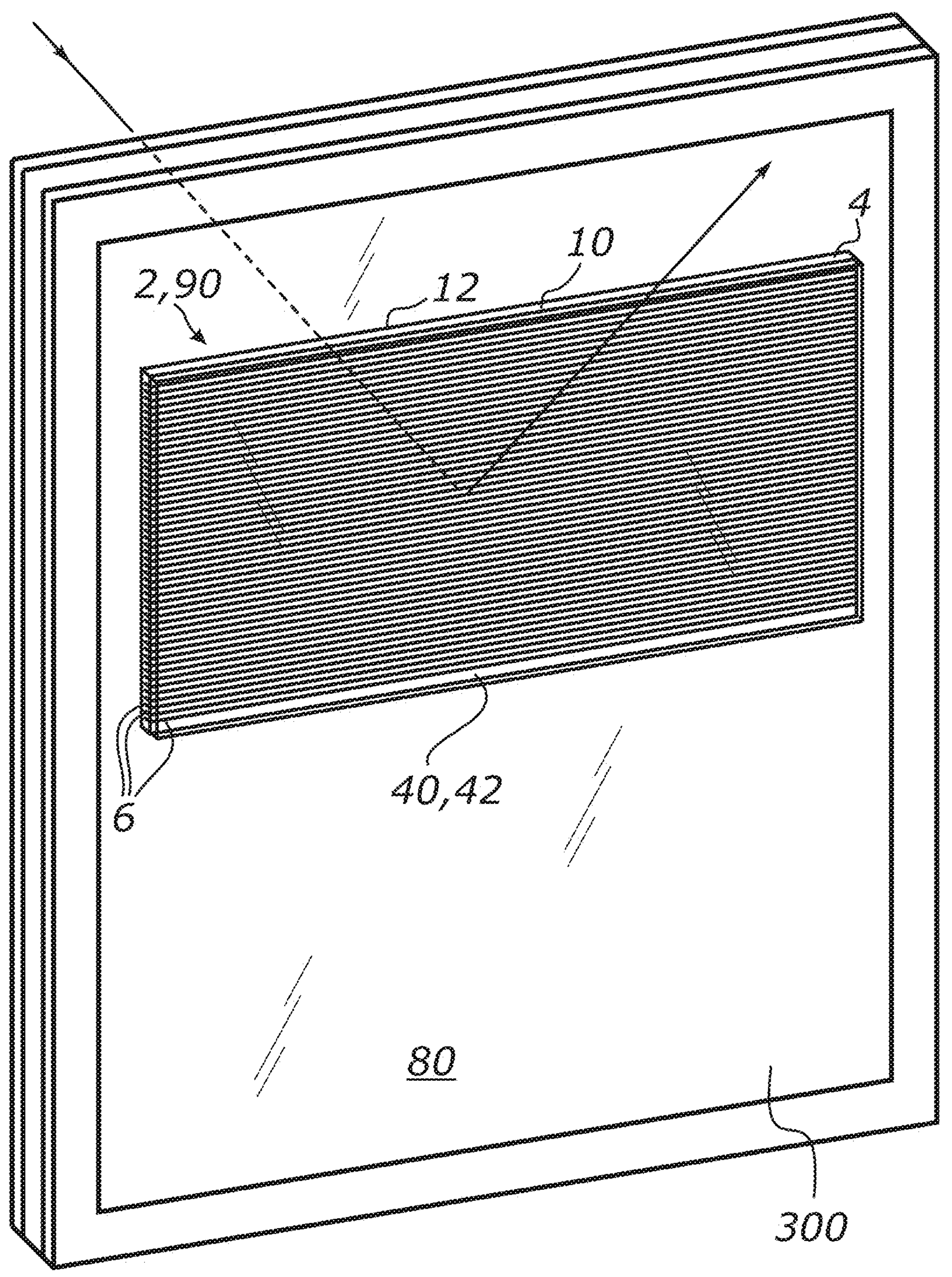
FIG. 13 is a schematic perspective view of a window pane having a light directing sheet attached to its surface, according to at least one embodiment of the present invention.

FIG. 13 schematically illustrates sheet 2 incorporated into a window film 90 attached to a surface 80 of a glass window pane 300. Window pane 300 exemplifies a window of a building façade exposed to the direct and/or diffuse daylight. Layer 4 of sheet 2 is sandwiched between top layer 40 of a rigid material and the glass pane 300.

Window film 90 incorporating sheet 2 can be attached to surface 80 using a removable or permanent adhesive or using the so-called static cling. Suitable techniques for attaching film 90 to surface 80 may include but are not limited to the dry or wet lamination often used for applying conventional window film products. A preferred mode of operation of such window film 90 can be intercepting at least a portion of daylight incident from off-normal and redirecting such daylight to the ceiling so as to provide improved natural illumination o the building interior while reducing the intensity of the transmitted solar beam and the associated effects that can be unpleasant to the building occupants (e.g., intense heat and glare).

Sheet 2 can be sized to cover a top portion of window pane 300 so that the bottom portion of the window can be used for an unimpeded view of the outside. In this case, sheet 2 may include a textured surface to diffuse the injected beam of sunlight and maximize the uniformity of light distribution within the illuminated space. Alternatively, sheet 2 may be sized to cover essentially the entire surface 80 of pane 300 in order to maximize solar beam filtering and redirection to the ceiling. In this case, sheet 2 may be configured for a maximum transparency so as to preserve the view. The thickness of sheet 2 can be selected from a useful range of film- and thin-sheet-thicknesses that would provide sufficient handling convenience of window film 90 and simplify its lamination onto surface 80. In one embodiment, the thickness of sheet 2 should not exceed 2 millimeters and more preferably should be below one millimeter. The edges of the laminated window film 90 may be optionally sealed to prevent its delamination from surface 80 or moisture ingress between the film and window pane 300.

Figure 14:
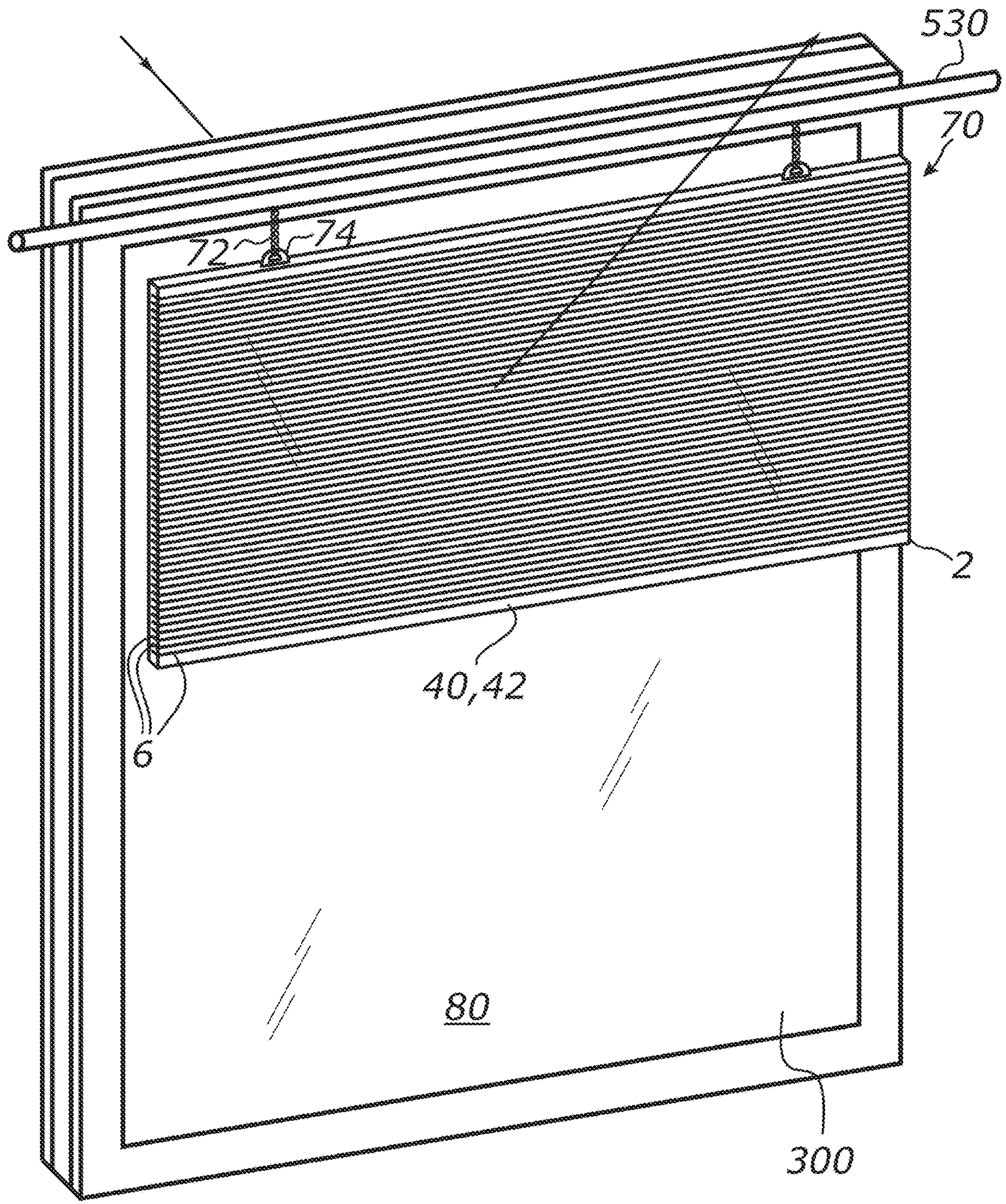
FIG. 14 is a schematic perspective view of a window pane and a window covering employing a light directing sheet, according to at least one embodiment of the present invention.

FIG. 14 schematically illustrates an embodiment of the present invention in which sheet 2 is incorporated into a hanging window covering 70 that is configured to provide daylight control and improve natural lighting of the building interior similarly to case where sheet 2 is attached to the window surface (as described in reference FIG. 13 above).

Referring to FIG. 14, window covering 70 includes a rectangular sheet 2, a bar 530, and a pair of brackets 74 with two cords 72. Sheet 2 can have the basic structure as shown in FIG. 1 and FIG. 2. Bar 530 can be shaped in the form of a rail or a tube extending above the window pane 300 parallel to the ground.

Sheet 2 can be conveniently attached to bar 530 using brackets 74 and a pair of cords 72. Bar 530 can be attached to the wall surrounding the window pane 300 or directly to such window pane and can be provided with the associated hardware.

In one embodiment, sheet 2 of FIG. 14 is provided with a sufficient stiffness to maintain its generally planar shape by appropriately configuring the rigid layers 40 and 60. In one embodiment, sheet 2 may be configured to have substantial flexibility so that it could maintain a planar shape under its own weight when it is hanging. An optional weight bar (not shown) can be provided at the bottom edge of sheet 2 to help straighten up the sheet.

It is noted that the illustrated method of hanging sheet 2 in a close proximity of window pane 300 is not prescriptive and can be replaced with any other suitable method known in the art. For example, window covering 70 can have a general design and structure of a track panel By way of example and not limitation, sheet 2 can replace the woven-type fabric or cloth in stationary or sliding window panels. A representative example of sliding panel window coverings can be the Skyline™ FR Gliding Window Panels commercially available from Hunter Douglas Corporation. A representative example of stationary panel window coverings can be the Freeform Fixed Shade commercially available from MechoSystems Corporation. Similarly to the shadecloth, sheet 2 can be configured as a loose, flexible sheet trimmed to the size and shape of the window opening or glazing and attached to a mounting bar using velcro strips along the edges or using any other suitable means.

In some implementations, window covering 70 may be arranged in multiple bands that are considerably narrower than the respective window pane. Such multiple bands can be hung alongside each other so as to cover the entire window area. Such multiple bands can also be incorporated into stationary or sliding window shade structure that can be operated manually using a chain, cord or wand or automatically using a gear motor and electronic control system.

Window covering 70 may also include various additional functional or decorative layers. Such layer can include but are not limited to light control films, shadecloth, mini- or micro-blinds, and the like. Such layers can be co-laminated together with sheet 2, attached to sheet 2 in multiple locations, or simply hung parallel to sheet 2 with or without touching the sheet.

In one embodiment, window covering 70 can be positioned in a sloped orientation so as to make a prescribed angle with respect to a vertical axis. The slope angle can be advantageously selected provide an improved light control operation, such as enhanced daylight harvesting or direct beam shading. In case of a sloped window, the slope angle of covering 70 can approximate the slope of the window pane. In one embodiment, the slope angle of window covering 70 is made adjustable with manual or automatic control.

FIG. 15 schematically illustrates the operation of window covering 70 when it is used for projecting daylight deep into the building interior and redistributing the injected daylight for improved indoor natural lighting while reducing glare caused by the direct solar beam. The building interior is exemplified by a room 366 having a rectangular configuration and a window opening 500 within an external wall 847.

The incident daylight is represented by a ray 272 passing through window opening 500 into the room. Ray 272 may particularly exemplify the direct sunlight or diffuse skylight which naturally propagates in a downward direction and therefore tends to directly illuminate only the floor area in a vicinity of the window or various objects nearby.

Window covering 70 incorporating a large-area sheet 2 is disposed in the path of ray 272. Sheet 2 deflects ray 272 from its natural downward propagation direction and redirects it onto a ceiling 320 of room 366.

There are numerous ways of how sheet 2 may be positioned within or in a close proximity to such opening 500. For instance, in addition to the arrangements discussed above in reference to FIG. 14, sheet 2 may be fixed in a suspended position by attaching its top edge to wall 847 above opening 500, laminated onto a window pane, stretched between two opposing rollers or bars, etc.

The ceiling 320 further scatters and redistributes the redirected ray 272 thus enhancing the illumination level and improving lighting distribution within room 366. Redirecting daylight onto the ceiling has a number of advantages. For instance, considering that the incidence direction of daylight changes in a very broad angular during the daytime and seasonally, the large area of the ceiling and its typically uniform light scattering characteristics across the surface ensures that ray 272 is intercepted and properly scattered. Furthermore, since the ceiling is often painted white or in relatively light colors, it may generally have a higher albedo (reflection coefficient) than the floor or various objects in the room interior. As a result, the light energy of ray 272 may be scattered by the ceiling with a relatively low loss compared to scattering from other surfaces in the room and thus ensure more complete sunlight harvesting and utilization for daylighting purposes.

Additionally, it may be appreciated that the surface of a ceiling typically has very good light diffusing properties. Therefore, the reflection of light rays from the ceiling will be primarily of a diffuse type which may result in a relatively homogeneous light distribution in the room and in a reduced glare.

A yet further advantage of redirecting daylight to the ceiling or upper portions of the room interior is that such redirection effectively creates a diffuse source of daylight within the room well above the eye height rather than allowing the direct daylight to reflect or scatter from the lower surfaces and produce blinding glare. A yet further advantage will be apparent when room 366 includes partitions or various tall objects which may partially or totally obstruct natural daylight penetration deep into the room interior. The elevated position of the ceiling, well above the obstruction objects can thus ensure natural illumination of the areas that are otherwise shaded and inadequately illuminated.

Accordingly, positioning sheet 2 in a close proximity or within opening 500 may provide at least partial shading of the room interior and its occupants from the direct sunlight while using the ceiling to convert a substantial portion of the direct beam into diffuse daylight emanated from an overhead location and thus enhancing the overall daylighting level and improving light distribution in the room interior.

In one embodiment, window covering 70 may include one or more areas that are free from channels 16 and are either opaque or configured to provide enhanced light filtering. For example, window covering 70 can be dimensioned to cover the entire window area with a top portion being optically transmissive and configured for light redirection to the ceiling and a bottom portion being opaque and configured for shading the direct solar beam and rejecting the associated excessive glare and/or heat.

In window covering 70, one or more sheets of different materials can be attached to one or more edges of sheet 2. Such additional sheets can serve different purposes. Referring to FIG. 16, a top sheet 690 is attached to a top edge of light directing sheet 2 and a sheet 692 is attached to a bottom edge of sheet 2. Sheet 692 is made from an opaque or translucent material which is configured for blocking or otherwise rejecting at least a portion of sunlight impinging onto its surface so as to reduce sunlight penetration into the building interior. It can conventionally be made from a fabric material or cloth used for window shades. Accordingly, the lower portion of window covering 70 can operate as a conventional window shade while an upper portion of the covering can be used for enhanced illumination by redirecting the daylight to the ceiling.

The top sheet 690 can also be made from a suitable fabric material but it can also have functions other than shading. In one example, it can have a decorative function or provide edge-strengthening hemming for the top edge of sheet 2. In another example, sheet 690 can be utilized for attaching sheet 2 to a headrail or other structure used to hang window covering 70 in front of a window.

FIG. 17 shows an embodiment of window covering 70 in which light directing sheet 2 is made sufficiently flexible so as to allow its wrapping around relatively small objects. In one embodiment, sheet 2 may incorporate just one layer formed by light-redirecting sheet 4 having channels 6 embedded into its body.

Window covering 70 of FIG. 17 further includes a top bar 772 having a U-shaped profile and provided with an insert 776 and a similarly-shaped bottom bar 774 provides with an insert 778. Such bars 772 and 774 are used to hold the opposing ends of sheet 2 so as to form a free-hanging window shade panel. Inserts 776 and 778 are used for wrapping the respective ends of sheet 2 around them in order to prevent material slippage from bars 772 and 774. The bottom bar should preferably have sufficient weight to slightly tension sheet 2 using gravity and prevent its excessive warping or wrinkling.

Figure 18:
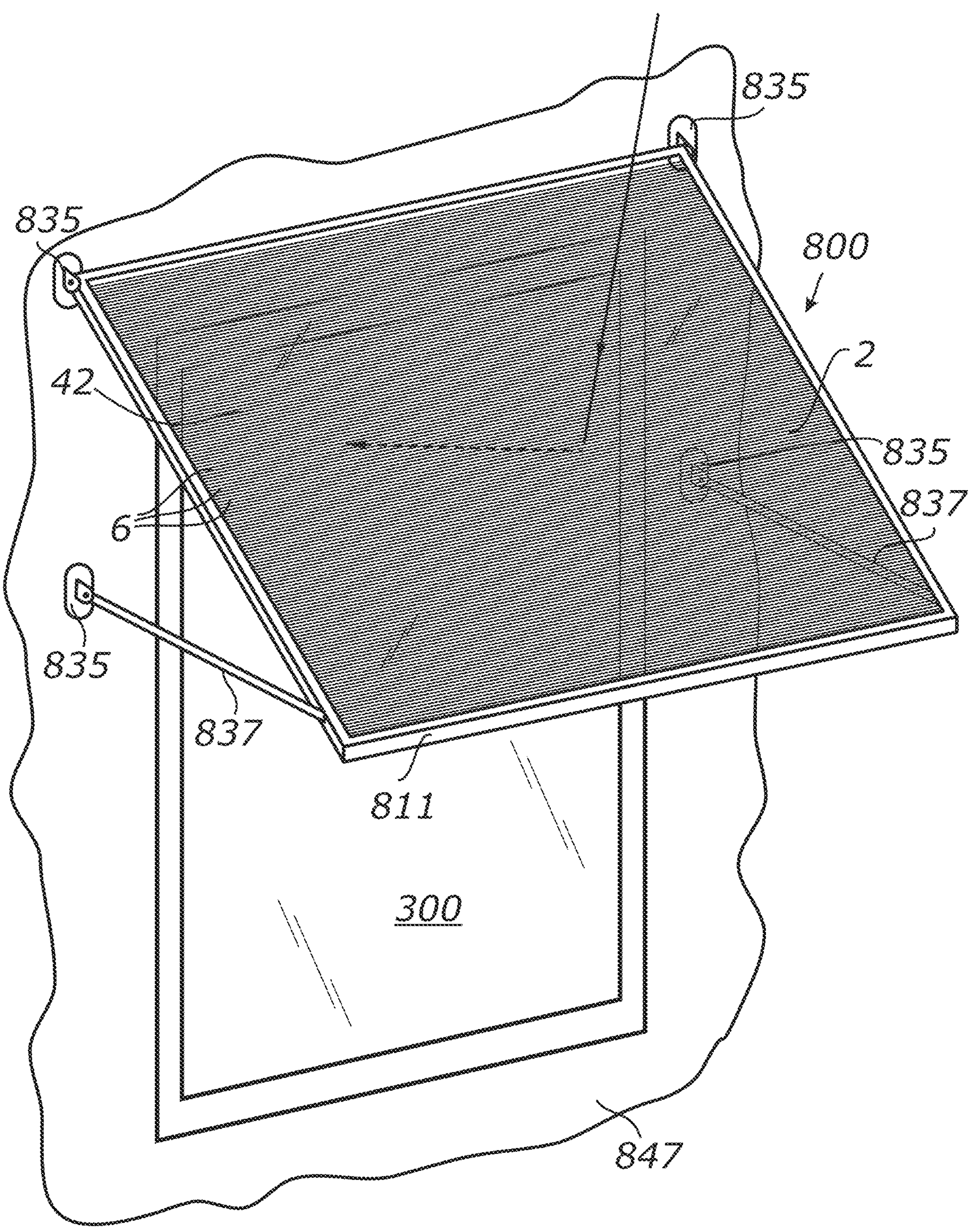
FIG. 18 is a schematic perspective view of a light-redirecting awning, showing a light directing sheet stretched over a frame of the awning, according to at least one embodiment of the present invention.

FIG. 18 shows another example of using light directing sheet 2 for illuminating building interior with daylight. Referring to FIG. 18, a canopy awning 800 is externally attached to a building façade above a wall window in a slanted orientation. Awning 800 includes light directing sheet 2 which is stretched over a rectangular frame 811 to form a relatively stiff panel. The panel is attached to wall 847 of the building just above window pane 300 using support members 837 and brackets 835 and is positioned at an angle to the horizon and to wall 847.

Sheet 2 is oriented in such a way in the awning panel that the longitudinal axis of the parallel array of channels 6 extends parallel to a horizontal plane. Each channel 6 is also formed perpendicular or nearly perpendicular to the surface of sheet 2.

By way of example and not limitation, the angle that the awning panel is making with respect to wall 847 can be around 45° which will position the individual planes of channels 6 at a 45° angle with respect to the vertical direction. Accordingly, when direct sunlight illuminates the stretched sheet 3 directly from the above (e.g., when the sun is near its zenith), awning 800 will bend such sunlight at a right angle and direct it towards window 300. Thus, awning 800 may be used for effectively collecting sunlight from high sun's elevations and directing it into the building interior.

Figure 19:
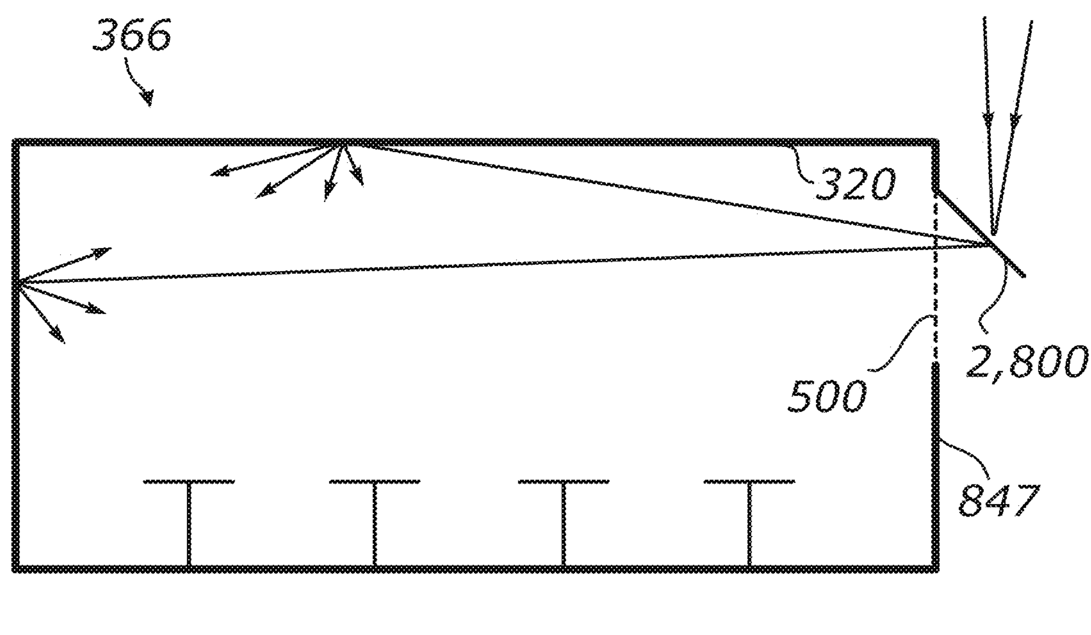
FIG. 19 is a schematic perspective view explaining the operation of a light-redirecting awning, according to at least one embodiment of the present invention.

Such operation is further illustrated in FIG. 19, in which awning 800 attached to wall 847 redirects light into the building interior through window opening 500. Daylight is illustrated coming from high elevations in which case the vertical window opening 500 generally cannot intercept most of it. Awning 800 intercepts such daylight and directs it deep into the room where the injected daylight is further scattered by walls and ceiling. Such configuration of awning 800 may be useful, for example, to improve the daylighting levels inside rooms which are obstructed from sunlight by the nearby structures, such as high-rise buildings, tall trees, etc.

According to some embodiments, light directing sheet 2 may be incorporated into a skylight in a roof or ceiling of a building. This is illustrated in reference to FIG. 20 in which a ray 280 represents a beam of direct sunlight passing through a horizontal opening 502 in the ceiling of a room 368 at an angle above 0° and less than 90° with respect to a vertical direction. Such opening 502 may represent the exit aperture of a skylight of a roof window configured to illuminate room 368 with daylight. Sheet 2 may have the structure of the above-described embodiments and can incorporate a single array of parallel channels 6 (not shown) or two or more parallel channel arrays crossed at an angle with respect to each other where each of the embedded channels 6 is configured to reflect light by means of TIR. In addition, sheet 2 may also have light diffusing texture on one of its surfaces to spread both the transmitted and redirected light.

Figure 20:
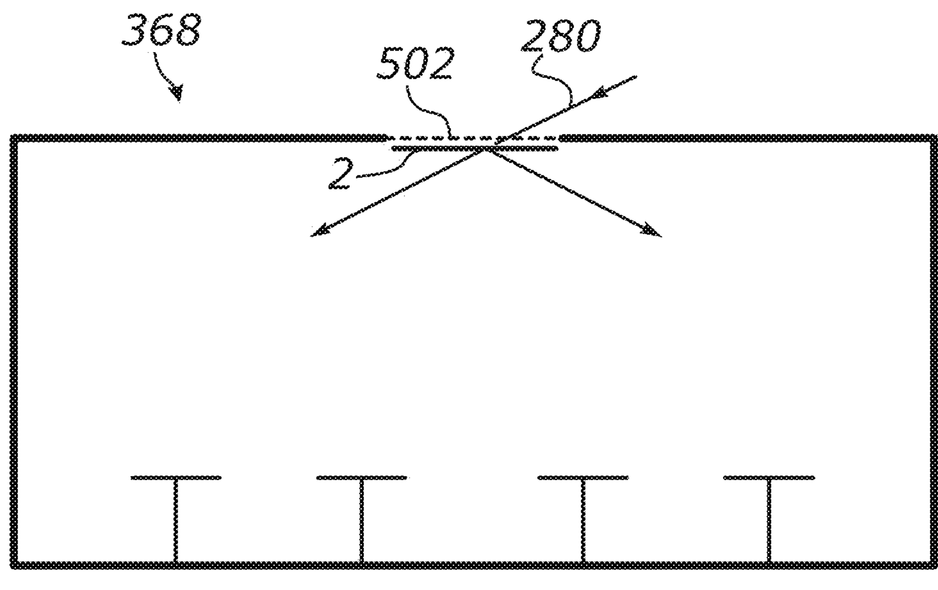
FIG. 20 is a schematic view and raytracing diagram showing a light directing sheet disposed at a light output opening of a skylight, according to at least one embodiment of the present invention.

In operation, by transmitting a first portion of the incident light beam and by redirecting a second portion of the light beam towards a sharply different direction, sheet 2 of FIG. 20 distributes the light energy of ray 280 over a broad angular range. Due to the added light diffusing features, sheet 2 can be configured to illuminate room 368 with a relatively uniform diffuse beam. In one embodiment, sheet 2 may be configured to produce a generally symmetric beam with respect to a normal to its surface at least at some off-normal incidence angles. In one embodiment, sheet 2 may also be configured so that the respective transmitted and redirected light portions will have the angular span of more than 90° for at least some solar elevation angles so that the opposing portions or corners of room 368 may be adequately illuminated.

Figure 21:
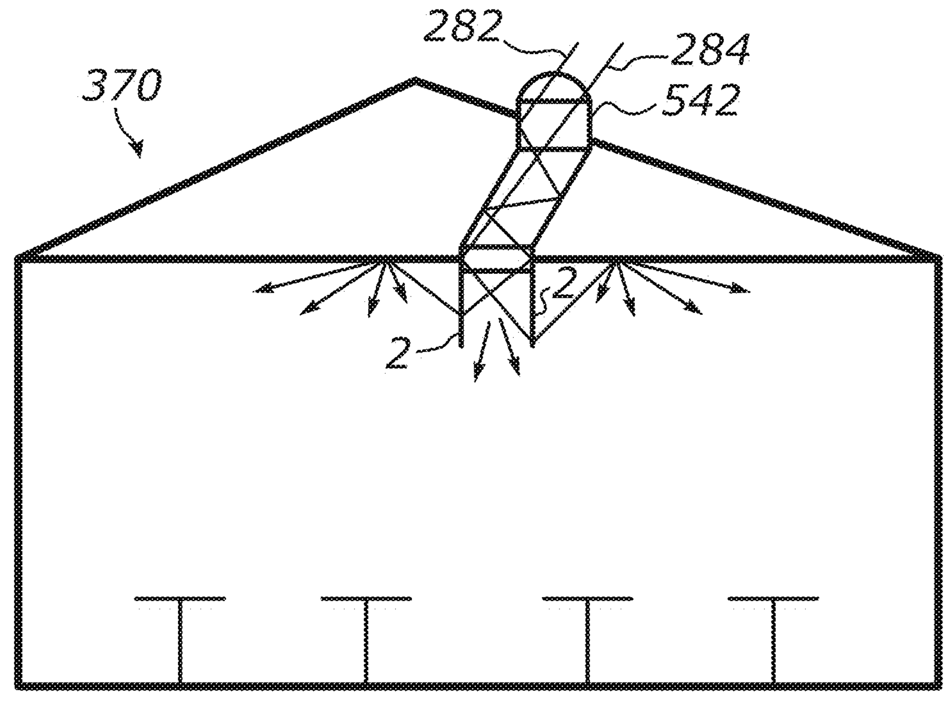
FIG. 21 is a schematic view and raytracing diagram showing a light directing sheet attached to a light emitting opening of a tubular skylight, according to at least one embodiment of the present invention.

FIG. 21 illustrates a yet further embodiment of the invention and another example of using the light directing sheeting of this invention. Referring to FIG. 21, one or more sheets 2 are attached to a light-emitting opening of a tubular skylight 542 in a vertical orientation. Skylight 542 exemplifies a conventional dome-shaped skylight in a building 370 with a tubular light guide that delivers the dome-captured daylight to the building interior. Channels 6 (not shown) should preferably be oriented horizontally so that daylight harvested by skylight 542 and emitted into the space below is intercepted and redirected to the adjacent areas of the ceiling for an indirect illumination of the space interior. As further shown in FIG. 21, some rays, particularly those propagating along vertical directions, may be allowed to exit from the opening of skylight without redirection thus providing direct illumination as well. Accordingly, FIG. 21 is illustrative of using sheets 2 to form direct/indirect lighting fixtures and luminaires for skylights and other types of downlights.

Figure 22:
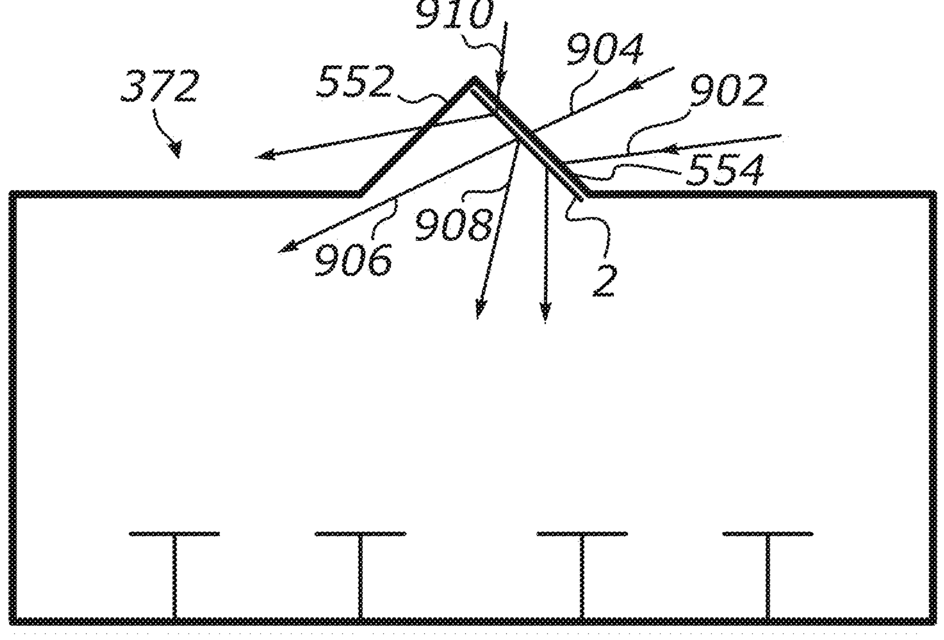
FIG. 22 is a schematic view and raytracing diagram showing a prismatic skylight having a light directing sheet attached to its sloped light-harvesting surface, according to at least one embodiment of the present invention.

FIG. 22 shows an embodiment of a prismatic skylight 552 having sheet 2 attached to a sloped face 554 of its prism-shaped dome. Sheet 2 is preferably attached an inner surface of face 554 to protect it from the environment. Sheet 2 can be applied to such surface by means of lamination or using any other suitable method. Although a small air gap can be provided between sheet 2 and face 554 in some cases, it may be preferred for most cases that there is a close physical and optical contact between sheet 2 and face 554.

In operation, a ray 902 exemplifying low-angle sunlight impinges onto face 554 and passes through sheet 2 while experiencing redirection downward by a relatively high bend angle due to the interaction with TIR channels 6 (not shown). Such operation can be advantageous, for example, for enhanced harvesting of low-elevation sunlight, such as that occurring in early morning or evening hours or during winter in the Northern hemisphere. By bending the light ray 902 from an oblique propagation to a near vertical propagation direction, skylight 552 can ensure that such ray will be more efficiently transmitted into the interior of a room 372. The vertical or near-vertical propagation can be particularly advantageous in the case when skylight 552 includes a well or a shaft that can scatter or absorb some light at each reflection. In such a case, the vertical or near-vertical light propagation minimizes the number of reflections and can thus minimize the transmission losses.

A light ray 904 exemplifying sunlight incident from intermediate solar elevations is partially transmitted and partially redirected by sheet 2 into a downward direction, as illustrated by ray segments 906 and 908, respectively. Accordingly, in late-morning or afternoon hours or during spring or fall seasons, skylight 552 could redistribute the harvested direct sunlight into a broad angular range while still providing relatively high light transmittance.

A light ray 910 exemplifying a direct solar beam at around noon in summer time is deflected by sheet 2 by a relatively high angle and can thus be either scattered or even rejected. Accordingly, such operation could be advantageous for sunny climates with hot summers where such rejecting or filtering of the excess sunlight (and thus the associated heat) at high solar elevations could improve the occupants' comfort and reduce the space cooling load.

It is generally preferred that the slope angle of face 554 with respect to a horizontal plane is between 10° and 50° and more preferably between about 20° and 45°. According to one embodiment, the slope angle of face 554 is approximately 45°. According to one embodiment, such slope angle is approximately 35° or at least in a 30°-40° angular range. According to one embodiment, face 554 is approximately facing a south direction. According to one embodiment, face 554 is facing an east direction. According to one embodiment, face 554 is facing west direction.

Figure 23:
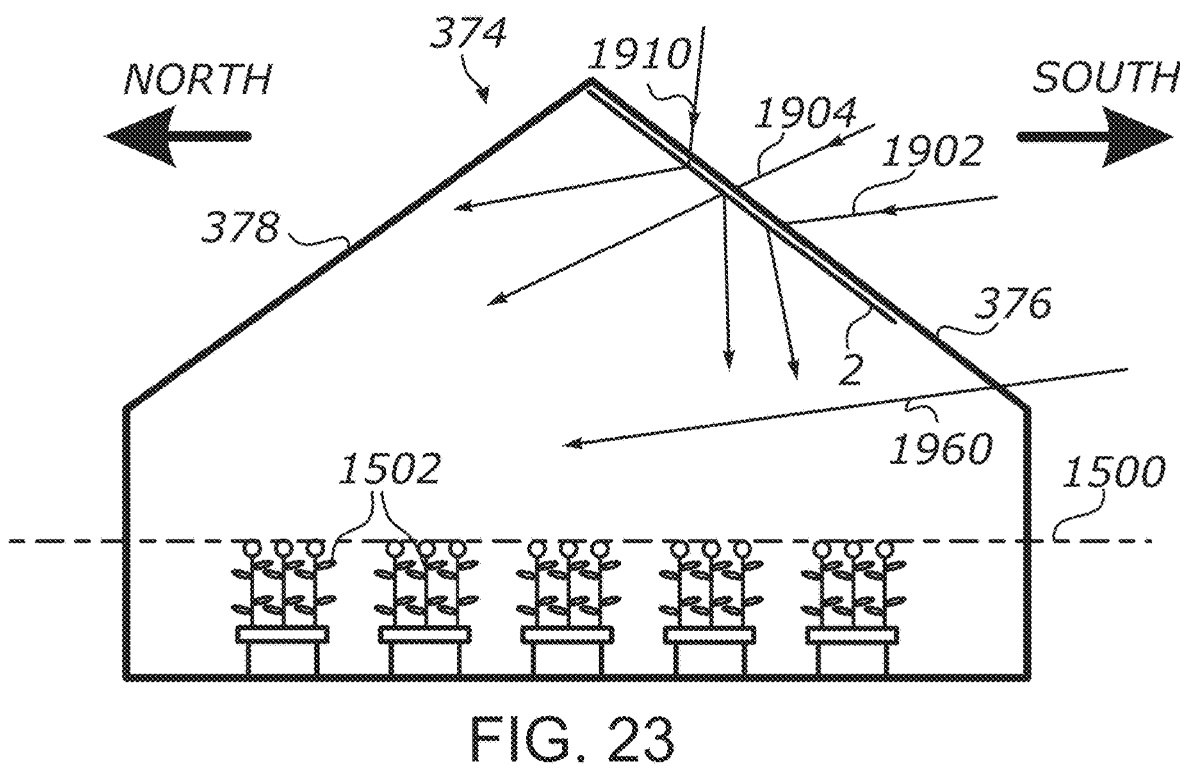
FIG. 23 is a schematic view and raytracing diagram showing a greenhouse having a light directing sheet attached to a roof surface, according to at least one embodiment of the present invention.

FIG. 23 shows an embodiment of a greenhouse structure 374 that has a generally transparent roof with a first sloped face 376 facing south and a second sloped face 378 facing north. Such greenhouse structure exemplifies a conventional greenhouse used in horticulture and particularly exemplifies a gable roof greenhouse structure with east-west orientation of its longitudinal axis.

Greenhouses are passive solar structures intended to trap heat from the sun while also admitting natural daylight to the crops using light-transmitting glazing. Many plants require significantly more light for efficient growth than it is normally available in existing greenhouse structures and require supplemental lighting or enhanced daylighting. On the other hand, in year-around greenhouses located in climates with hot summers, a problem exists of reducing the excess light and heat penetration into the greenhouses in summer time. Accordingly, capturing more sunlight with the existing greenhouse structures when such sunlight is scarce and/or rejecting the excess heat at other times could have a direct positive effect on energy saving and crop yield. By employing the light redirecting structure of sheet 2, harvesting of low-elevation sunlight and filtering of high-elevation sunlight can be accomplished thorough a relatively simple retrofit in which sheet 2 is attached to a surface of the existing glazing or otherwise incorporated into such glazing.

Referring to FIG. 23, face 376 of the greenhouse glazing has light directing sheet 2 attached to a portion of its inner surface. Similarly to the prismatic-type skylight structure 552 of FIG. 22, the greenhouse structure 374 is configured to harvest low-elevation sunlight as illustrated by the paths of light rays 1902 and 1904 and reject or scatter high elevation sunlight as illustrated by a light ray 1910.

A light ray 1960 exemplifies low-elevation sunlight incident into greenhouse 374 through side walls or a lower portion of face 376. The structure of sheet 2 should preferably be designed to result in redirecting the low-elevation sunlight towards a canopy line 1500 of plants 1502 so that light rays that would otherwise miss the canopy line (e.g., rays 1902 and 1904) could be directed to plants 1502 and could also superimpose with other incident rays (e.g., ray 1960) thus effectively increasing the amount of light available to the plants. In addition to this, the structure of sheet 2 can be designed to redirect high-elevation sunlight away from the canopy line 1500.

Sheet 2 can be positioned parallel or at an angle to face 376 by means of hanging or stretching using suitable frame members (not shown) Alternatively, sheet 2 can be laminated onto the inside surface of face 376. Sheet 2 may also be sized to cover only a top portion of face 376 or the entire surface of face 376. According to one embodiment, sheet 2 covers at least a third of the surface of face 376 and the covered surface includes at least a top portion of the surface of face 376.

In the illustrated east-west orientation of the longitudinal axis and respectively north-south orientation of opposing faces 378 and 376 of greenhouse structure 374, such greenhouse can be configured to capture additional sunlight for plants 1502 in winter time (when such sunlight is particularly at premium). It can be further configured to reduce heat intake in the summer by providing enhanced light filtering and a partial shade due to redirecting a portion of incident light away from plants 1502 and out of the greenhouse structure. In an alternative configuration, a northern portion of the greenhouse structure 374 may be provided with a mirrored film to minimize light spillage at low solar elevations or capture additional direct sunlight in winter time. For example, a portion of face 378 can be covered with such a mirrored film.

Figure 24:
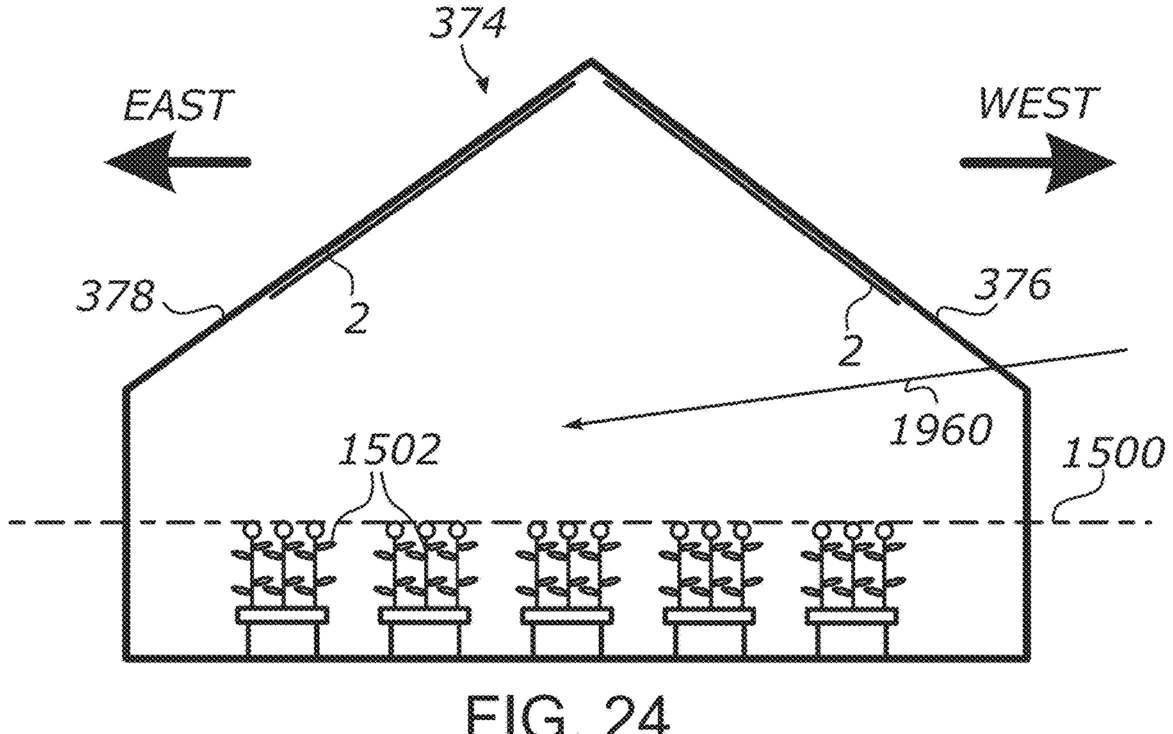
FIG. 24 is a schematic view and raytracing diagram showing a greenhouse in an alternative configuration and orientation, according to at least one embodiment of the present invention.

In a north-south orientation, such greenhouse structure 374 can be configured to provide enhanced illumination of plants 1502 in early morning or late evening hours while rejecting or filtering the excess light and heat around the noon time. This is illustrated in FIG. 24 in which a second sheet 2 is attached to an opposing face 378 of greenhouse structure 374. Face 378 is facing east and is configured to capture additional daylight in morning hours while face 376 is facing west and is configured to capture additional daylight in evening hours.

It is noted that, although light directing sheet 2 may be conventionally rectangular or square and may be made in forms of a large-format sheet or a roll, it may be cut to any size or shape using any suitable cutting technique to fit a particular application. Sheet 2 may also be bent to any suitable shape or wrapped around an object or a volume. In at least one embodiment, sheet 2 may be formed into a closed cylindrical, conical, or pyramidal shape. Alternatively, multiple sheets 2 may be connected together to form such shapes.

FIG. 25 shows an embodiment of a lighting diffuser lens 750 which can be attached to a light-emitting opening of a skylight or an electrical downlight and which can be used for direct/indirect lighting according to the principles illustrated in FIG. 21. Diffuser lens 750 includes four rectangular light directing sheets 2 connected at their edges that are perpendicular to the linear channels 6. The resulting structure forms a hollow cylindrical shape with a rectangular cross-section and two opposing openings. As illustrated by exemplary light rays 192 and 194, light can be input into diffuser lens 750 through any of the two openings. In operation, upon the passage through the respective sheets 2, rays 192 and 194 are intercepted by embedded channels 6 and redirected at a bend angle being twice the angle of incidence. It will be appreciated that, when diffuser lens 750 is attached to a directional light source, it can communicate a very broad angular distribution to the emitted light, well beyond the angular range of the light source, which may be advantageously used for providing indirect illumination using such sources.

FIG. 26 shows diffuser lens 750 configured in the form of a truncated pyramid. FIG. 27 and FIG. 28 show diffuser lens 750 configured in the forms of a cylinder and a truncated cone, respectively. One or more portions of sheets 2 may be left free from channels 6 for decorative or various other functional purposes.

Figure 29:
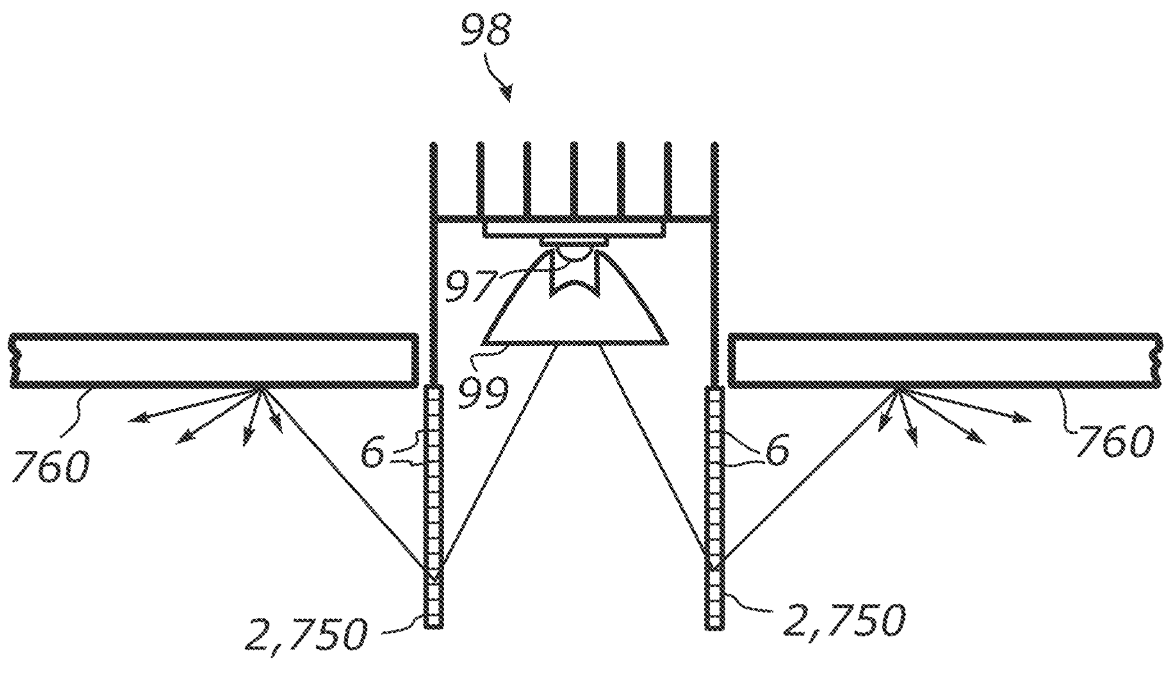
FIG. 29 is a schematic cross section view and raytracing of a downlight module configured for direct/indirect lighting, according to at least one embodiment of the present invention.

FIG. 29 shows an embodiment of a recessed downlight module 98 employing diffuser lens 750 in either one of the configurations of FIG. 25 and FIG. 27. Such downlight module 98 includes a light source 97 which can be one or more light emitting diodes (LED), compact fluorescent lamp or any other type of light source. Module 98 may further include a collimating or otherwise beam-shaping lens 99 configured to direct light downwards within a prescribed angular cone.

In operation, downlight module 98 emits a cone of light in a downward direction. At least a portion of such light is intercepted by one or more sheets 2 of diffuser lens 750 using embedded TIR reflectors of channels 6 and is redirected to a ceiling 760. Ceiling 760 further scatters the redirected light into different downward directions. Since diffuser lens 750 blocks at least a substantial part of light rays from the direct propagation from downlight module 98 while redirecting the respective rays to the ceiling for indirect illumination, the apparent brightness of the source and the associated glare may be considerably reduced without appreciable reduction of the overall light output. When the reflectivity of ceiling 760 is not sufficient for high efficiency reflection, the ceiling area surrounding downlight module 98 may be covered with a bright light diffusing material to reduce energy losses. In one embodiment, sheet 2 of diffuser lens 750 may be made from an optically transparent material and provided with smooth outer surfaces. In one embodiment, such sheet 2 may be provided with light diffusing features such as surface texture or a light diffusing material to further mask the light source or improve light distribution pattern.

Figure 30:
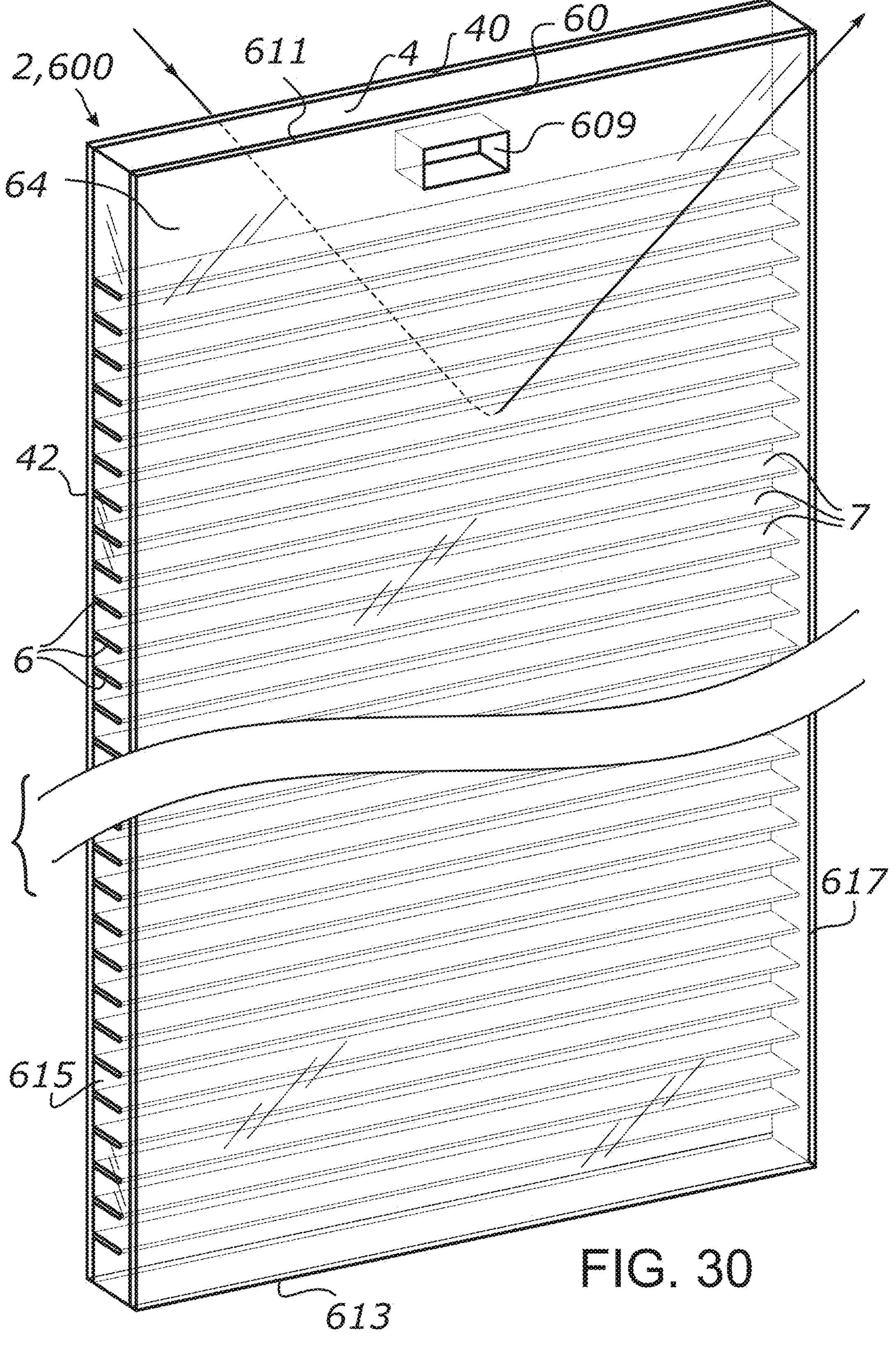
FIG. 30 is a schematic perspective view of a slat or blade of window blinds, showing a plurality of channels configured for redirecting light by a total internal reflection, according to at least one embodiment of the present invention.

FIG. 30 depicts an embodiment of the light directing sheeting of the present invention which is exemplified by a slat 600 of vertical blinds or curtain. Slat 600 is formed by a strip of a flexible, optically clear material which preferably has a thickness of less than 3 mm. In one embodiment, slat 600 has the layered structure of sheet 2 shown in FIG. 1.

Slat 600 is defined by opposing broad area surfaces 42 and 64, opposing terminal edges 611 and 613, and opposing side edges 615 and 617. Slat 600 has a plurality of embedded TIR reflectors formed by a parallel array of channels 6. In an exemplary non-limiting case, the TIR reflectors are formed in a strip of 0.08 inch (around 2 mm) optically clear plasticized PVC sheet material which is sandwiched between two other identically shaped strips of optically clear, rigid plastic material. Clear plasticized PVC strips are commercially available, for example, from Tap Plastics in the form of clear vinyl strips having a width of 8 inch and sold by the foot. Similarly to conventional vertical blind slats, slat 600 may have a through notch 609 which can be used for attaching the slat to a headrail or other-type horizontal structures.

Referring further to FIG. 30, channels 6 are formed in one of the surfaces of the PVC-P core strip while the other surface of the strip may be made generally uninterrupted and smooth. Channels 6 are formed perpendicularly to the longitudinal axis of the strip and perpendicularly to the strip surface so that wall 7 of each slit is facing up and the respective opposing wall 8 is facing down. Channels 6 may extend all the way across slat 600 from its side edge 615 to the opposing side edge 617. Each of the walls 7 and 8 may be configured for specular TIR functionality. The surfaces of the slits can be made either optically smooth or may have a relatively low roughness so that they can reflect light by means of TIR primarily in the specular regime. If the surface of walls 7 and 8 has some residual roughness and at least some light is reflected in a diffuse regime, it is preferred that such light is reflected within a narrow angular range from the specularly reflected beam.

One of the broad-area surfaces 40 and 64 may be configured for light input and the one can be configured for light output, respectively. In FIG. 30, the operation of slat 600 is illustrated where surface 42 is operating in a light input mode and surface 64 is operating in a light output mode. At least some light rays entering into slat 600 from non-zero sun elevations are intercepted by the TIR surfaces of walls 7 and redirected into the building interior by reflecting primarily in a specular regime. Accordingly, the daylight is injected into the building interior at an angle which favors illumination of the upper portions of the room, such as ceiling and tops of the walls. In turn, the diffuse reflections from the ceiling and the walls may further redistribute the daylight through the interior thus resulting in improved lighting uniformity.

Figure 31:
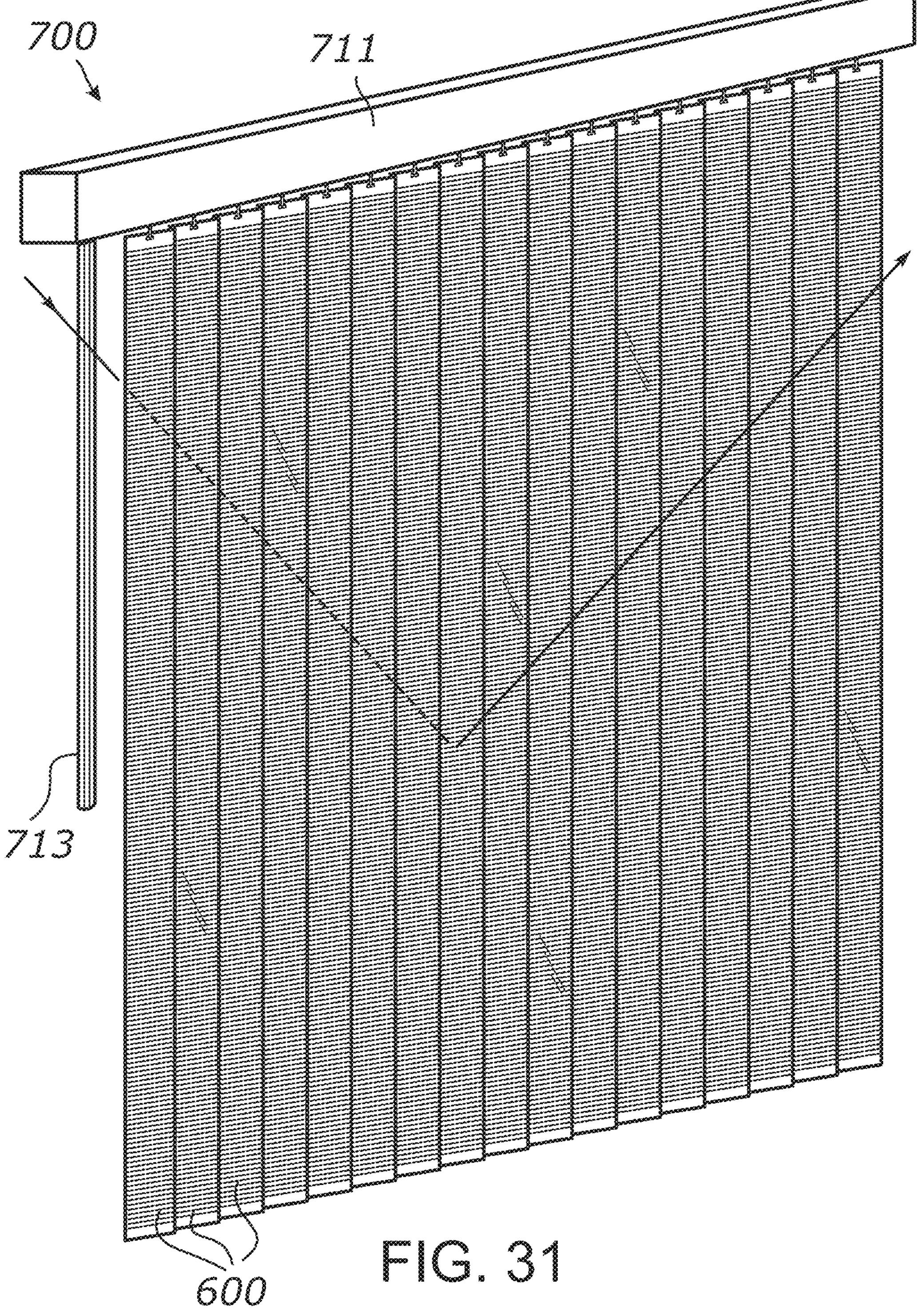
FIG. 31 is a schematic perspective view of vertical window blinds, showing a plurality of light deflecting slats, according to at least one embodiment of the present invention.

FIG. 31 shows an exemplary arrangement of an array of slats 600 in a vertical blinds structure 700. Each slat 600 is attached to a headbox 711 in a suspended position. Headbox 711 may be conventionally fixed atop a window frame or a door frame in a daylit building facade and may include a sliding headrail for deploying and retracting the blinds. Headbox 711 may further include a rotating drum by means of which slats 600 may be opened and closed. A wand 713 may be provided to effectuate the manual control of the blinds. Alternatively, a pull cord or any other means for manual or electrical control of the blinds may be used.

It will be appreciated that, when slats 600 are in a suspended position, each internal TIR surface formed by channels 6 in such slats will be generally parallel to the horizontal plane in any allowed slat orientation. Thus, in operation, when the blinds structure 700 is fully deployed and slats 600 are closed, daylight can enter into the room while being advantageously redirected by horizontal channels 6 towards the ceiling and can thus be redistributed through the interior more efficiently. When slats 600 are fully retracted or open, little or no direct sunlight will be intercepted and redirected by the slats. Accordingly, the daylighting operation of the vertical blinds structure 700 and the distribution of daylight in the building interior may be controlled by simple operations such as deploying, retracting, opening or closing of the blinds.

According to one embodiment, a strip of light directing material having the structure of sheet 2 may be incorporated into horizontal venetian blinds structure. In this case, one or more slats of the horizontal blinds may be formed by a strip-shaped sheet 2 where, unlike the vertical blinds slat of FIG. 30, each channel 6 can extend parallel to the longitudinal dimension of the strip so that the configuration of the slat will be similar to that of FIG. 5. Such horizontal slat may have notches formed at least the ends of the respective strip for passing a support cord through them.

Figure 32:
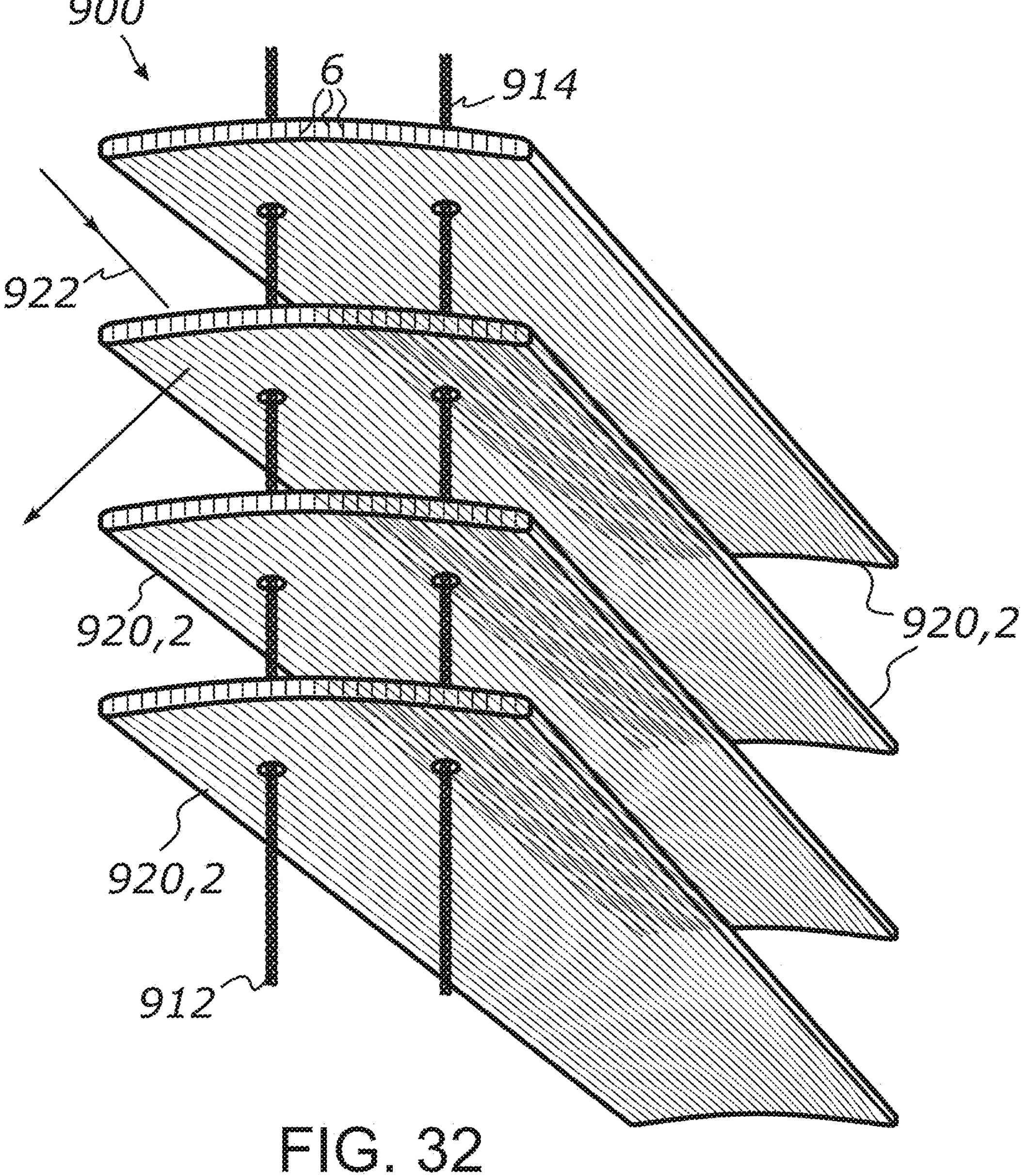
FIG. 32 is a schematic fragmentary perspective view of horizontal window blinds employing light directing sheeting, showing a plurality of adjustable light deflecting slats, according to at least one embodiment of the present invention.

An embodiment of a horizontal window blinds structure 900 is illustrated in FIG. 32 showing a partial view of four slats 920 adjustably operable by cords 912 and 914. Each of the slats 920 has a slightly curved shape for structural rigidity and incorporates a light redirecting structure of sheet 2. Depending on the orientation of slats 920, blinds structure 900 may be configured to either reject the direct sunlight or redirect it into the building interior at a prescribed angle.

Figure 33:
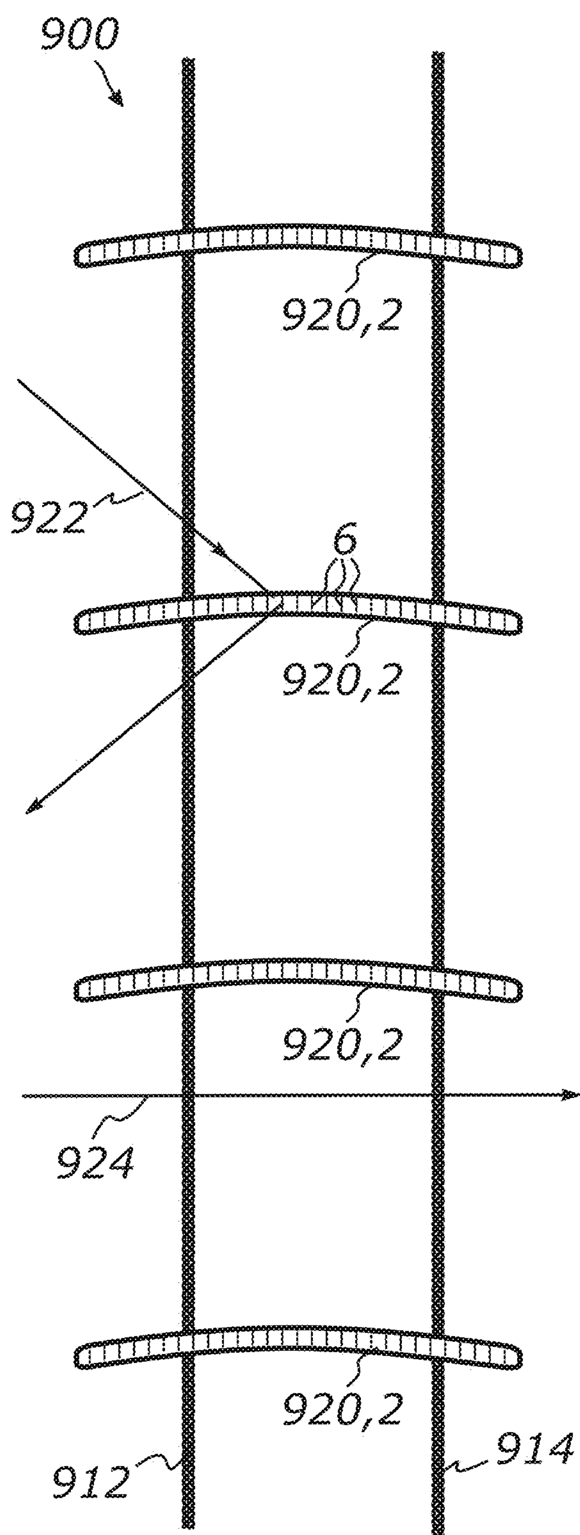
FIG. 33 is a schematic fragmentary cross section view of horizontal window blinds employing light directing sheeting, showing a plurality of adjustable light deflecting slats in a fully open position, according to at least one embodiment of the present invention.

As illustrated in FIG. 33, when slats 920 are in a fully open position, a light ray 922 exemplifying a beam of direct sunlight strikes one of the slats 920 and is redirected back towards the exterior of a building using channels 6 embedded into sheet 2. Accordingly, such operation of blinds structure 900 may be useful for rejecting at least a portion of the solar beam from entering the building interior and thus reducing the heat gain and glare associated with direct sunlight. It is noted that, unlike conventional window blinds which require to be closed for block the sunlight penetration (thus also blocking the view), blinds structure 900 may achieve similar sunlight rejection results while essentially preserving the view. The view preservation is illustrated by the unimpeded path of a ray 924 exemplifying light incident into the building interior from various outdoor objects.

Figure 34:
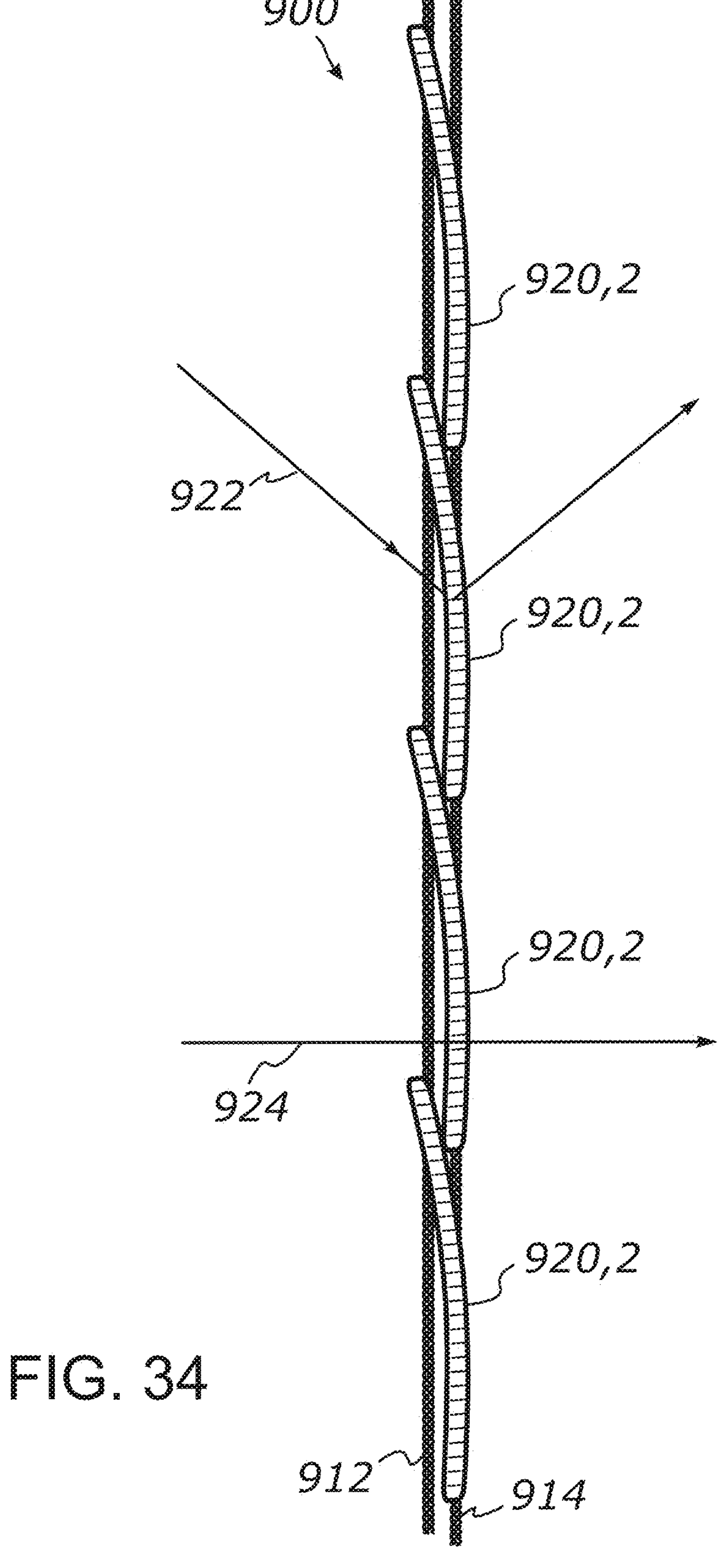
FIG. 34 is a schematic fragmentary cross section view of horizontal window blinds employing light directing sheeting, showing a plurality of adjustable light deflecting slats in a fully closed position, according to at least one embodiment of the present invention.

When slats 920 are in a fully closed position (FIG. 34), the direct sunlight is redirected to the ceiling (as shown by the path of ray 922) while the view may still be at least partially preserved (ray 924), depending on the transparency of the material of slats 920. In one embodiment, various light diffusing features, such as surface texturing or the like, may be purposefully employed in slats 920 to increase the angular spread of the admitted light at the expense of the slat transparency.

Figure 35:
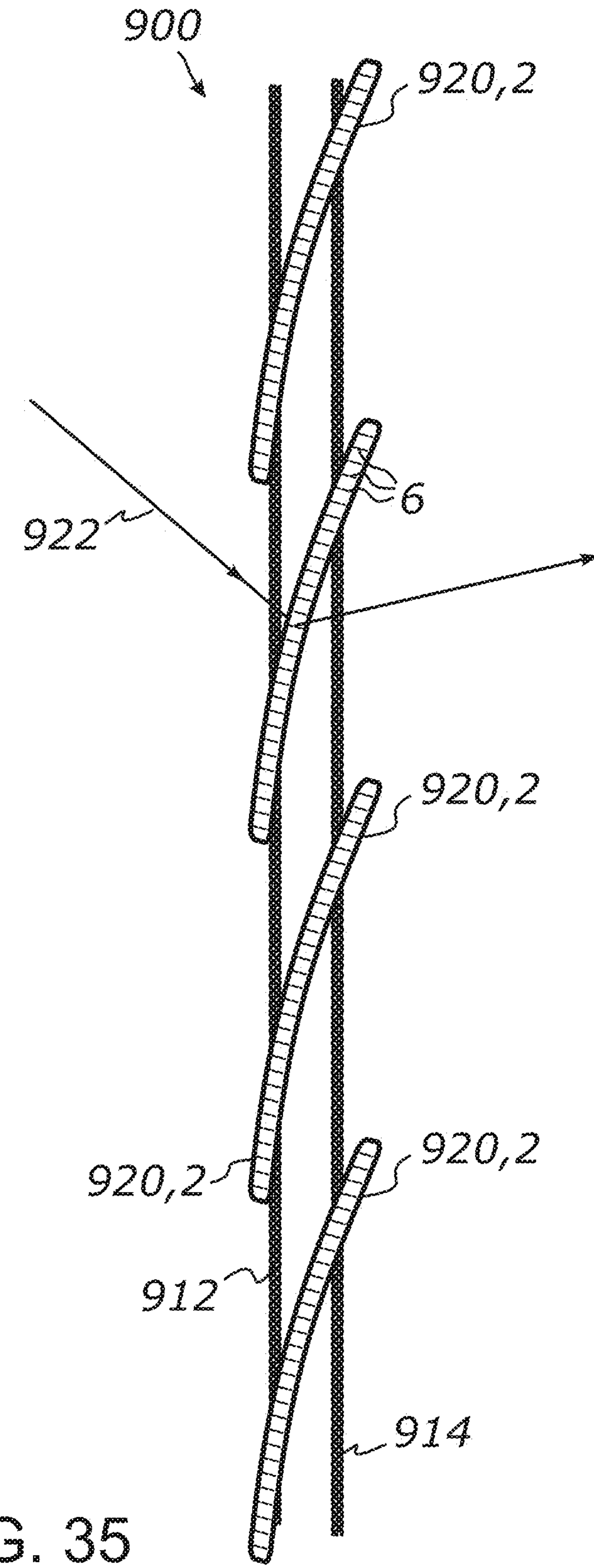
FIG. 35 is a schematic fragmentary cross section view of horizontal window blinds employing light directing sheeting, showing a light redirecting sheet positioned at an angle with respect to a horizontal plane, according to at least one embodiment of the present invention.

Slats 920 may be adjusted to any intermediate angular orientation between the fully open and fully closed position in which case the amount of rejected and/or admitted light can be controlled for almost any solar elevation. It is noted that, similarly to the conventional venetian blinds, blinds structure 900 may be configured so that slats 920 can be rotated almost 360 angular degrees and either concave or convex surfaces of the slats may be exposed to the incident sunlight. It is further noted that, by adjusting the angular position of slats 920, the angular direction of the admitted daylight with respect to a horizontal plane may be varied in a broad range. Such operation is illustrated in FIG. 35 in which ray 922 is redirected at a considerably shallower angle with respect to a horizontal plane compared to the incident direction. This can be useful, for example, for illuminating deep portions of the building interior by steering such redirected light farther away from the window.

Figure 36:
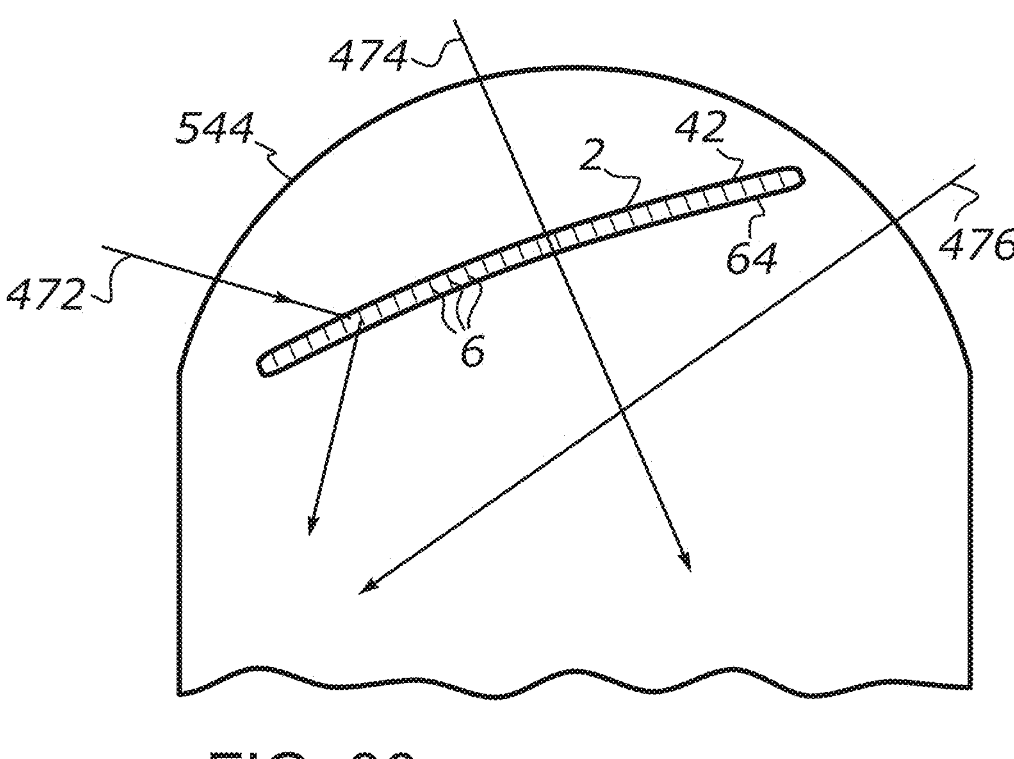
FIG. 36 is a schematic cross section view and raytracing of a skylight dome portion, showing a light redirecting sheet positioned at an angle with respect to a horizontal plane, according to at least one embodiment of the present invention.

FIG. 36 shows an embodiment of a skylight 544 having a top portion covered with a clear dome and having sheet 2 positioned within such dome. Light directing sheet 2 forms a light redirecting insert that can be configured to enhance light harvesting and light delivery efficiency of the skylight. Skylight 544 may exemplify a tubular skylight, although the same operation of sheet 2 in FIG. 37 may be applied without limitations to other types of skylights.

Light directing sheet 2 of skylight 544 may have a rectangular configuration which can be planar or bent to a slightly curved shape. Sheet 2 is positioned at an angle with respect to a horizontal plane which is preferably below 45°, and more preferably is within a 5°-35° angular range. Such sheet 2 may be mounted in a fixed position at a preselected slope angle which is optimized for specific geographical latitude and oriented with its light-receiving surface 42 facing south. It may also be rotatably mounted to provide with single- or dual-axis solar tracking. In one embodiment, light directing sheet 2 can be rotated around a horizontal axis. Alternatively, or in addition to that, sheet 2 can be rotated around a vertical axis.

In operation, a low-elevation light ray 472 striking sheet 2 is redirected downwards along a vertical direction. A high-elevation ray 474 passes through sheet 2 without being redirected. An opposite low-elevation ray 476 enters skylight 544 with its light path unimpeded by sheet 2. Accordingly, the light redirecting insert formed by sheet 2 intercepts and redirects at least a portion of sunlight that is incident onto the light receiving aperture of skylight 544 from low-elevation angles. It will be appreciated that, for a tubular skylight, redirecting low-angle light towards the vertical will typically increase the light output on the exit side due to fewer reflections from the mirrored walls of the skylight's light-guiding tube.

Figure 37:
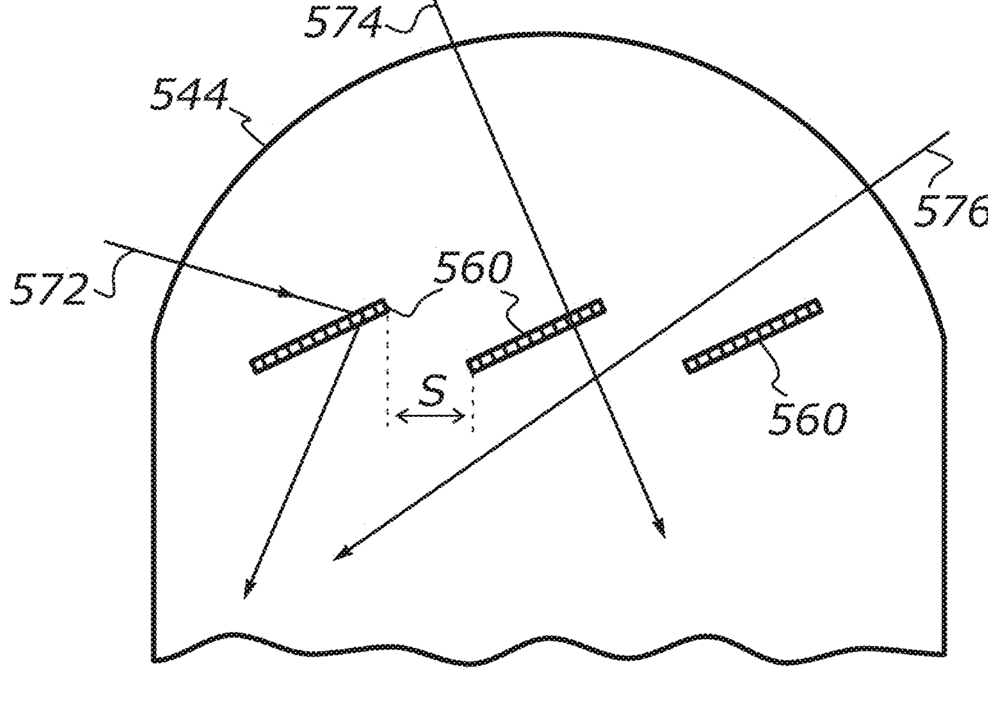
FIG. 37 is a schematic cross section view and raytracing of a skylight dome portion, showing a plurality of light redirecting slats or louvers, according to at least one embodiment of the present invention.

Strips of light redirecting sheet 2 may be used to form different configurations of slats, louvers or vanes which can be incorporated into a broad variety of daylighting systems and configured to improve sunlight harvesting efficiency. FIG. 37 shows one embodiment of skylight 544 in which vanes 560 are positioned within the skylight dome in a sloped orientation with respect to a light receiving aperture of the skylight. Each vane 560 is formed by a strip of light redirecting sheet 2 or incorporates such sheet as one of its layers.

Each of the vanes 560 is positioned at a predefined angle (slope angle) with respect to a horizontal plane. Such slope angle may be the same for each vane 560 or it may be different for each vane. According to one embodiment, the slope angle should preferably be between 0° and 45°, and more preferably between 5° and 30°.

In one embodiment, vanes 560 may be oriented horizontally and faced the south in northern hemisphere or the north in the southern hemisphere to maximize daylight capture in winter or in summer, respectively. Alternatively, vanes 560 may be faced towards the east or west to maximize daylight harvesting in the morning or evening hours, respectively.

Referring to FIG. 37, a light ray 572 exemplifying direct sunlight incident onto the light receiving aperture of skylight 544 from low solar elevations strikes one of the vanes 560 and is redirected downwards. It will be appreciated that such operation will particularly be advantageous for tubular skylights or skylights having a relatively deep light-channeling tube, shaft or well which rely upon multiple reflections from their walls. Since the redirected ray 572 makes much lower angle with respect to a vertical axis compared to the initial propagation direction, it will undergo fewer reflections from such walls and therefore can be delivered to the building interior with fewer losses, thus improving the overall light output from the skylight. Considering that the number of reflections for low-elevation rays in a tubular skylight can be substantial and that 5% to 25% of light energy may be lost at each reflection, redirecting such rays toward a vertical direction may improve the skylight performance rather dramatically.

It is noted that, unlike specularly reflective vanes sometimes utilized in skylights, vanes 560 can be made substantially transmissive for the normal incidence rays (see. e.g., the path of a ray 574 in FIG. 37). Accordingly, such light redirecting component of a skylight will not block light as the sun moves across the sky and the incidence angle changes. At the same time, as illustrated by a ray 576, a low-elevation solar beam incident from the opposing direction may freely pass through the spaces between vanes 560. A sufficient width S of each space between vanes 560 may be provided to minimize the interception of light by vanes 560 when the incidence angle is not optimal. On the other hand, spacing S may be kept below a certain value to maximize the interception and redirection of light coming from low elevation angles.

Vanes 560 may be made stationary and permanently oriented towards a predetermined direction. Alternatively, vanes 560 can be made rotatably movable around one or more axes. In one embodiment, each vane 560 is made rotatable around a horizontal axis. In one embodiment, a group of vanes 560 can be rotated around a vertical axis configuration. In such configuration, the entire light-redirecting insert can be mounted on a vertical shaft or placed on a turntable-type structure. Accordingly, vanes 560 may be configured for one- or two-axis solar tracking to maximize sunlight capture daily and/or seasonally.

Figure 38:
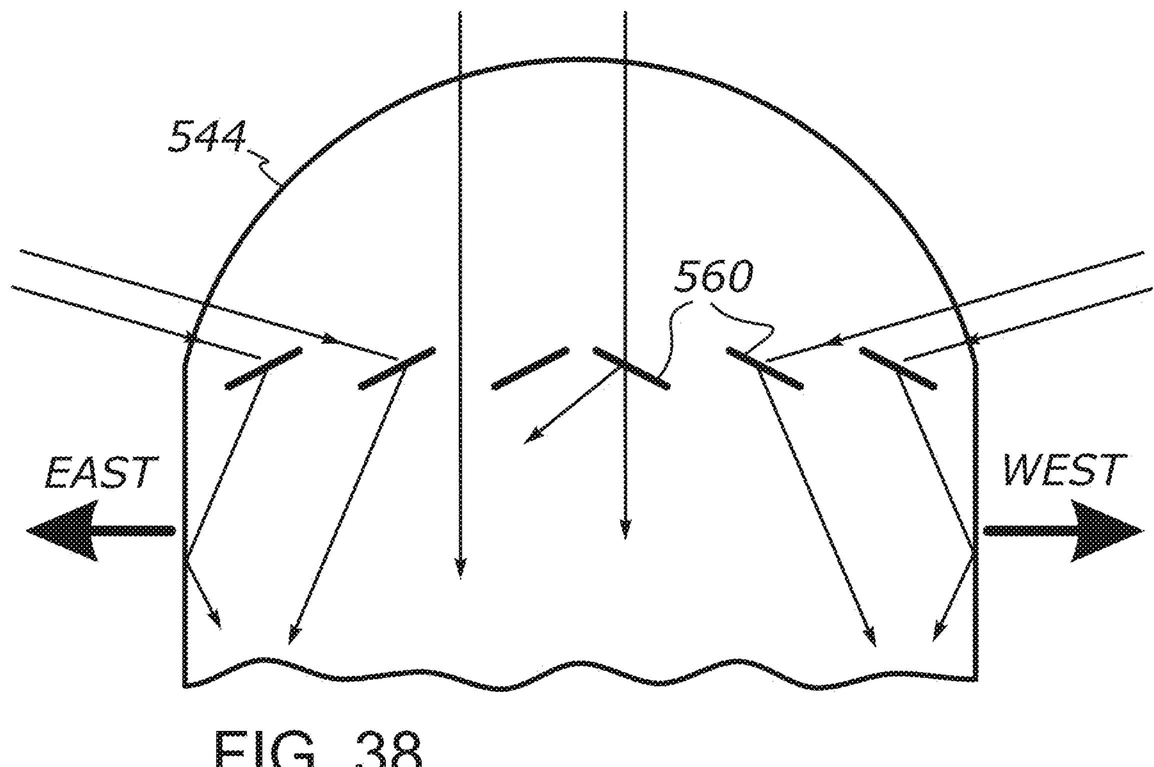
FIG. 38 is a schematic cross section view and raytracing of a skylight dome portion, showing a plurality of light redirecting slats or louvers arranged in two symmetrically disposed arrays, according to at least one embodiment of the present invention.

Vanes 560 may be arranged into two symmetrically disposed arrays, for example, as shown in FIG. 38. Such configuration may be adapted for an east-west orientation. In this case, each of the arrays may be configured to maximize the interception of low-elevation sunlight in the morning and evening hours, respectively.

The spacing areas between vanes 560 and the dimensions and parameters of the vanes may be designed so that that the skylight could provide a nearly constant light output during the day. This can be achieved, for example, by capturing more sunlight in early morning and late evening hours and by rejecting a portion of sunlight when the sun is near its zenith, according to the principles similar to those discussed in reference to FIG. 22 and FIG. 23.

When the ability of a skylight to intercept low-angle light rays from all-directions is desired, light directing sheet 2 or multiple pieces of such sheet may be formed into a three-dimensional shape providing a multi-directional or omni-directional operation.

Figure 39:
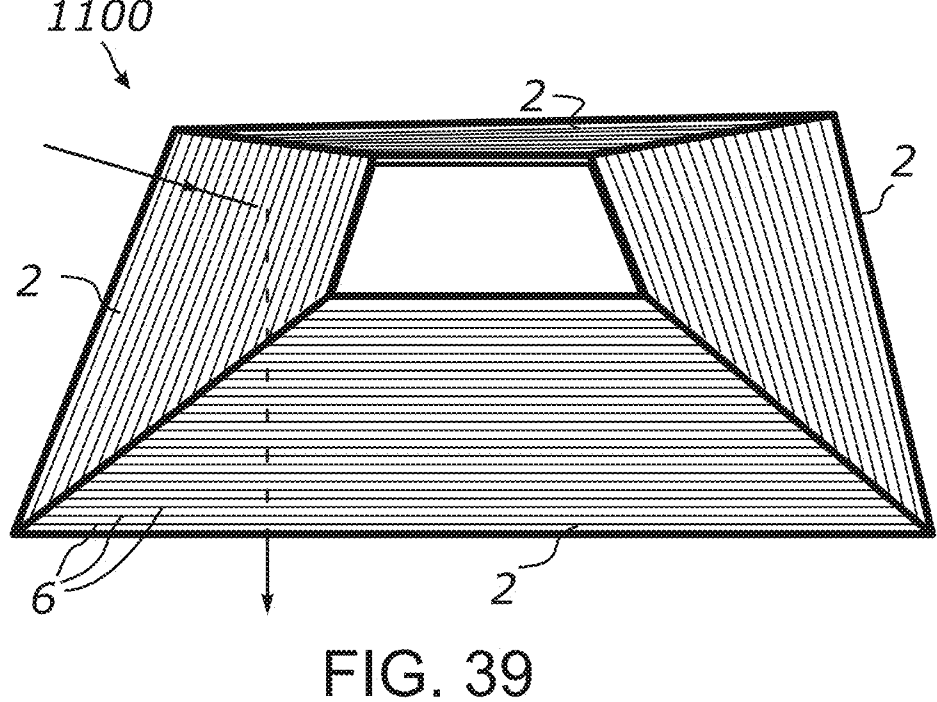
FIG. 39 is a schematic perspective view and raytracing of a light redirecting skylight insert shaped in the form of a truncated pyramid, according to at least one embodiment of the present invention.

A multi-directional structure employing light-directing sheeting of the present invention is illustrated in FIG. 39 which shows an embodiment of a light redirecting skylight insert 1100 which is designed to be positioned within a skylight dome for capturing low-angle sunlight and directing it downwards. Skylight insert 1100 comprises light directing sheet 2 formed into a truncated pyramid with a square or rectangular base. The dihedral angles of each face of such pyramid with respect to the pyramid base should preferably be less than 45° and, more preferably, between 20° and 35°. Such insert may be positioned within a light receiving aperture of a skylight and configured to improve light harvesting for at least the low-elevation solar rays. The dihedral angles of the pyramid faces, the dimensions of the central opening and the height of the truncated pyramid may be varied depending on the intended geographical location of the skylight and/or specific preferences as to the light redirecting operation of insert 1100.

The pyramidal shape of skylight insert 1100 may be formed directly from a single sheet 2 pre-cut into an appropriate two-dimensional template. Alternatively, such structure may be formed from an optically transmissive sheet or rigid film material in which case individual sheets 2 may be laminated onto the respective faces of the structure. Furthermore, an appropriate skylight dome may be formed into such pyramidal shape and such sheets 2 may be laminated directly onto the inside surfaces of the shape.

Figure 40:
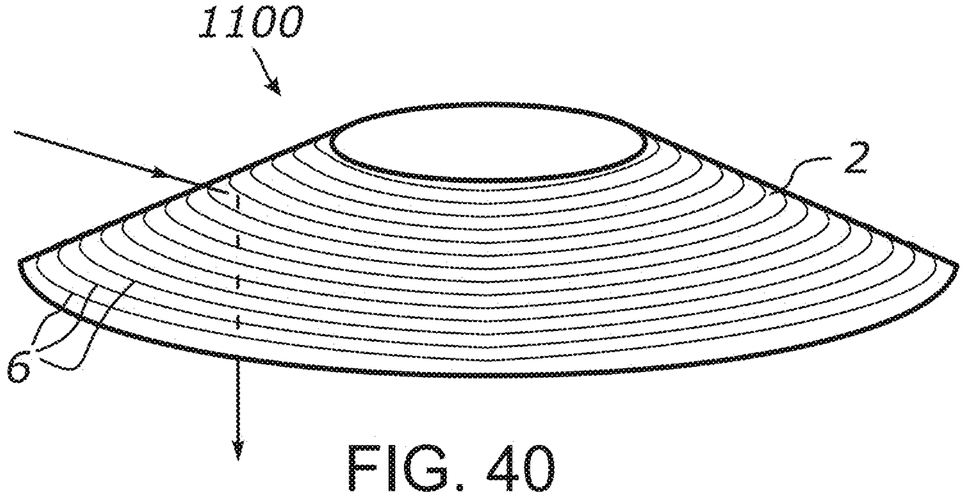
FIG. 40 is a schematic perspective view and raytracing of a light redirecting skylight insert having a truncated conical shape, according to at least one embodiment of the present invention.

FIG. 40 shows an alternative configuration of insert 1100 which is formed into a truncated conical shape with a round base. In this configuration, insert 110 can be configured to provide omni-directional operation. In further alternatives, insert 1100 may be formed into other shapes such as, for example, pentagonal, hexagonal or octagonal truncated pyramids.

Figure 41:
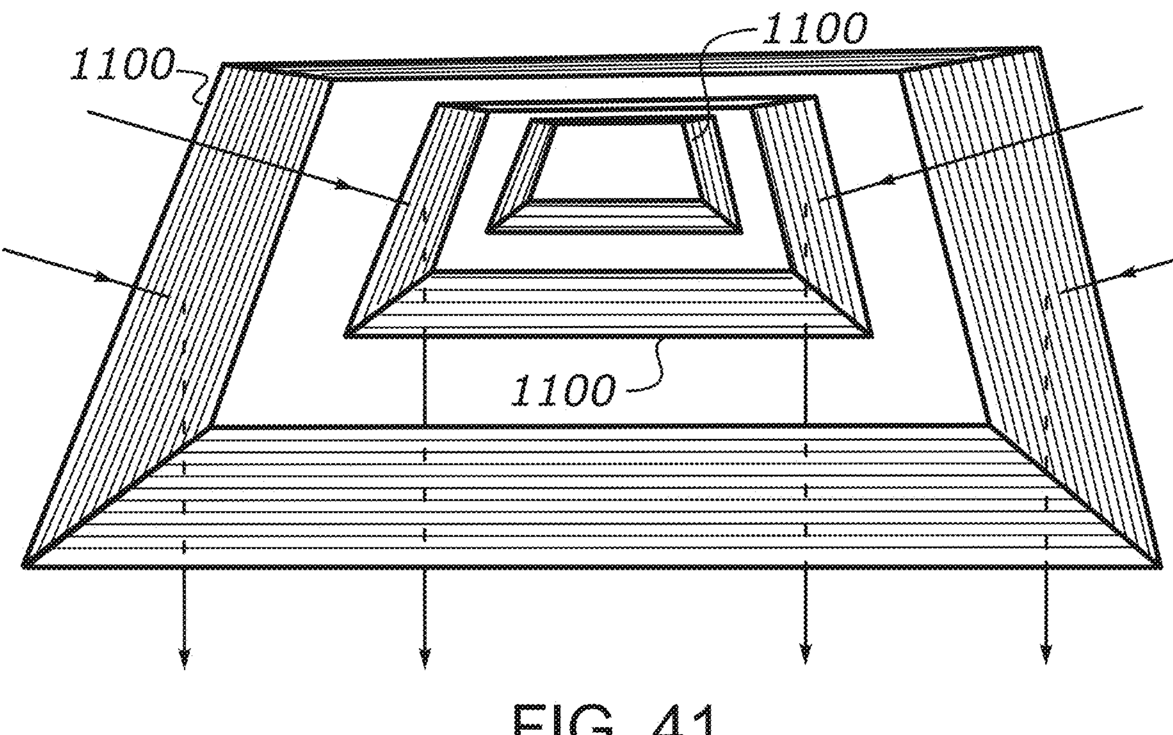
FIG. 41 is a schematic perspective view and raytracing of an array of nested light redirecting structures each having a truncated pyramidal shape, according to at least one embodiment of the present invention.
Figure 42:
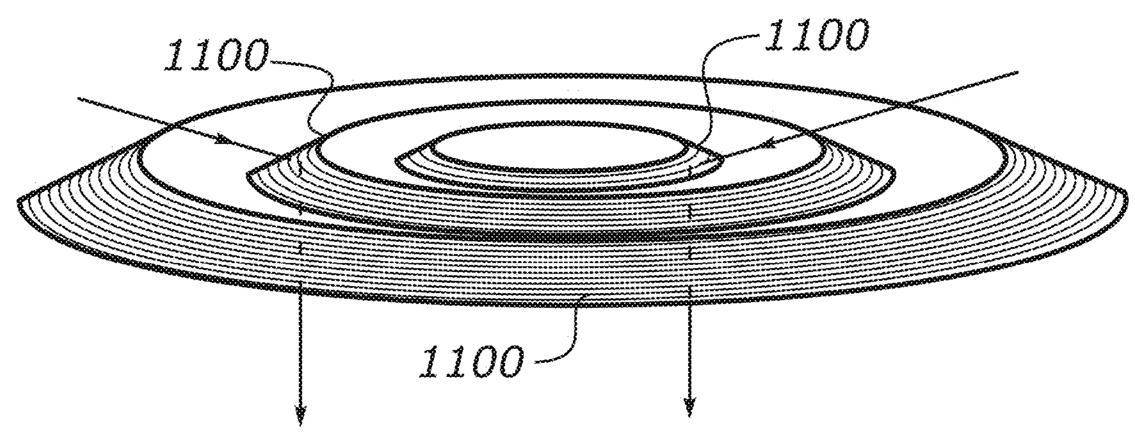
FIG. 42 is a schematic perspective view and raytracing of an array of nested light redirecting structures each having a truncated conical shape, according to at least one embodiment of the present invention.

Such inserts 1100 may also be made in different sizes and arranged in a nested configuration. FIG. 41 shows an array of three nested pyramidal inserts 1100. FIG. 42 shows an array of three nested conical inserts 1100. It may be appreciated that each of such nested light redirecting inserts 1100 may have a cross sections similar to those of FIG. 39 or FIG. 40 and can provide multi-directional or omni-directional operation with a relatively high coverage of the entrance aperture of the respective skylight.

It is noted that sheet 2 may be formed in any other suitable three-dimensional shapes which are not limited to basic geometrical shapes. For this purpose, sheet 2 can be cut into appropriate two-dimensional templates that can be bent or otherwise formed into self-supporting 3D structures.

Figure 43:
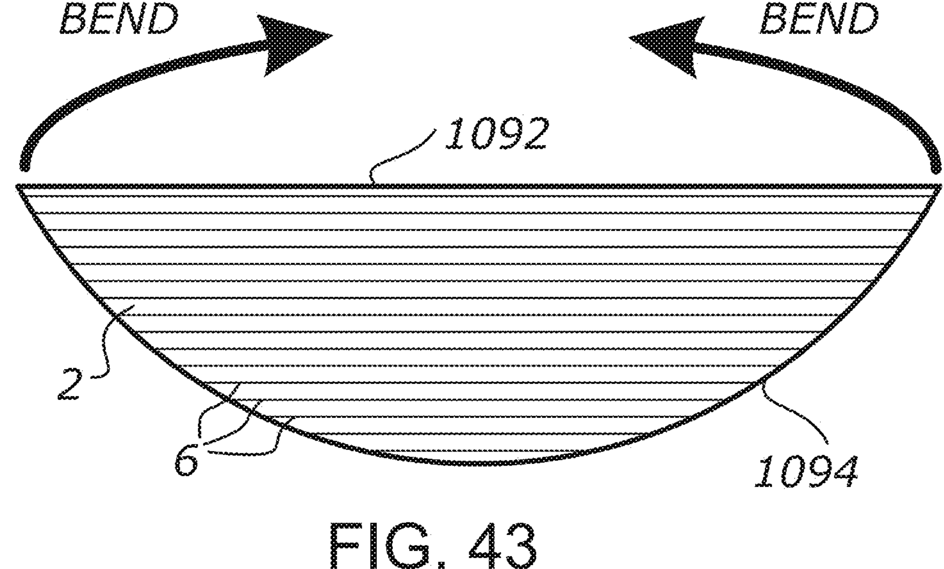
FIG. 43 is a schematic top view of a light redirecting sheet having a straight edge and a curved edge, according to at least one embodiment of the present invention.

FIG. 43 shows a two-dimensional template cut from sheet 2 in which one edge 1092 is substantially straight and another edge 1094 is curved creating two intersection points on the template. Channels 6 are shown extending generally parallel to edge 1092.

Figure 44:
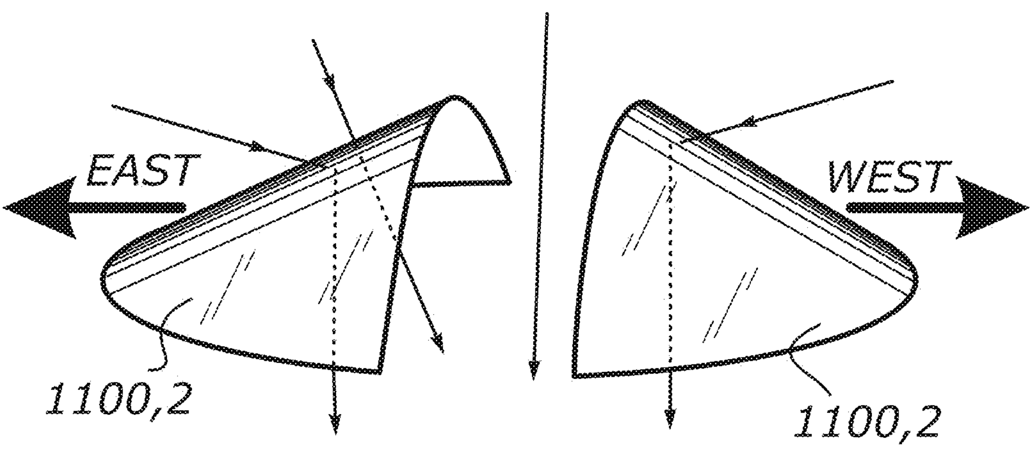
FIG. 44 is a schematic perspective view and raytracing of light redirecting structures for use in a skylight, showing a curved three-dimensional shape for each of the structure, according to at least one embodiment of the present invention.

FIG. 44 shows two symmetrically disposed inserts 1100 each formed from a template of FIG. 43 by bending such template along lines indicated in FIG. 43. Such inserts may accordingly be positioned within a light receiving aperture of a skylight in a symmetrical arrangement and may be oriented such that one inserts faces east and the other insert faces west. A space may be provided between such inserts 1100. Such spacing can be utilized, for example, to admit a portion of the incident sunlight without intercepting and redirecting.

Figure 45:
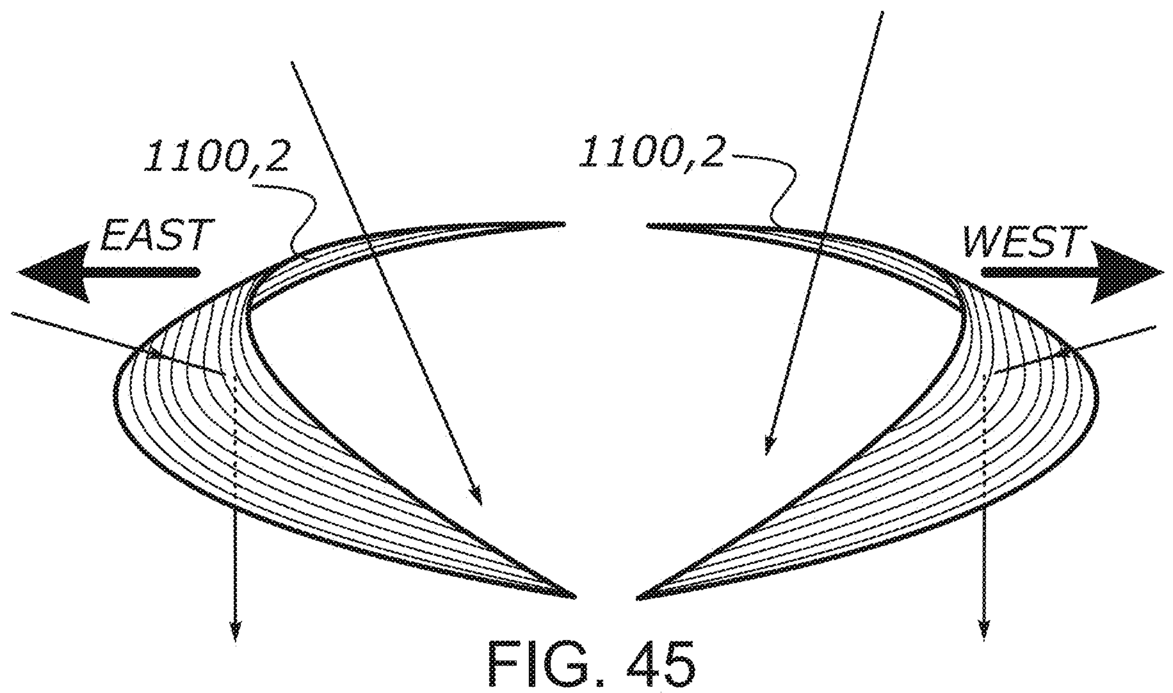
FIG. 45 is a schematic perspective view and raytracing of light redirecting structures for use in a skylight, showing an alternative curved three-dimensional shape for each of the structure, according to at least one embodiment of the present invention.

FIG. 45 shows a further variation of inserts 1100 which may be formed from a template in which edges 1092 and 1094 are both curved and have different prevailing radii of curvature.

Further details of the structure and operation of light directing sheeting of the invention and the method for making the same, as shown in the drawing figures, as well as their possible variations will be apparent from the foregoing description of preferred embodiments. Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An illumination system, comprising:

a lighting module comprising a plurality of LEDs;

a flexible optically transmissive sheet disposed in an energy receiving relationship with respect to the lighting module, the flexible optically transmissive sheet having a laminated structure with a generally rectangular shape and a thickness between 200 micrometers and 1 millimeter, the laminated structure comprising:
a first layer of an optically transmissive material,
a second layer of an optically transmissive material,
a first regular array of linear channels formed in the first layer and extending parallel to one another between two edges of the flexible optically transmissive sheet, and
a second regular array of linear channels formed in the second layer and extending at an angle with respect to the first regular array of linear channels between two edges of the flexible optically transmissive sheet; and
a broad-area reflective surface configured to reflectively scatter light,
wherein each of the linear channels in the first and second regular arrays defines a pair of side walls configured to reflect light using total internal reflection.

2. An illumination system as recited in claim 1, wherein the angle is approximately 90 degrees.

3. An illumination system as recited in claim 1, wherein the laminated structure further comprises a surface having a light diffusing texture.

4. An illumination system as recited in claim 1, further comprising a light diffusing film.

5. An illumination system as recited in claim 1, further comprising a collimating lens positioned on a light path between the lighting module and the flexible optically transmissive sheet.

6. An illumination system as recited in claim 1, further comprising a beam shaping lens positioned on a light path between the lighting module and the flexible optically transmissive sheet.

7. An illumination system as recited in claim 1, wherein at least some of the linear channels of the first regular array are separated from one another by surface portions of the first layer which are generally parallel to the first layer, and wherein at least some of the surface portions are disposed in contact with the second layer.

8. An illumination system as recited in claim 1, wherein each of the linear channels of the first regular array is formed in a surface of the first layer which is facing the second layer, wherein the first regular array of linear channels defines a parallel array of linear structures protruding away from the first layer, and wherein at least some of the linear structures are bonded to the second layer using an optically transmissive adhesive material.

9. An illumination system as recited in claim 1, comprising a surface having a microlens pattern.

10. An illumination system as recited in claim 1, wherein at least one dimension of the laminated structure is greater than 1 meter.

11. An illumination system as recited in claim 1, wherein a largest dimension of the laminated structure is at least 0.5 meters.

12. An illumination system as recited in claim 1, wherein a largest dimension of the laminated structure is at least 0.2 meters.

13. An illumination system as recited in claim 1, wherein the flexible optically transmissive sheet is retained in a curved shape.

14. An illumination system as recited in claim 1, wherein the first regular array of linear channels is configured with variable spacing.

15. An illumination system as recited in claim 1, comprising a material configured to alter color of transmitted light.

16. An illumination system as recited in claim 1, comprising a layer configured to filter specific wavelengths of light.

17. An illumination system as recited in claim 1, comprising a sheet of glass disposed in energy receiving relationship with respect to the flexible optically transmissive sheet.

18. An illumination system, comprising:
a light source comprising a plurality of LEDs;
a first layer of an optically transmissive material;
a second layer of an optically transmissive material superimposed on and bonded to the first layer using an optically transmissive adhesive;
a first linear array of parallel channels formed in the first layer;
a second linear array of parallel channels formed in the second layer;
an optical sheet comprising a two-dimensional pattern of light diffusing surface microstructures; and
a broad-area reflective surface configured to reflectively scatter light,
wherein the second linear array of parallel channels extends at an angle with respect to the first linear array of parallel channels,
wherein the first linear array of parallel channels defines a plurality of linear prismatic surface structures protruding away from the first layer and longitudinally extending along straight parallel lines from a first edge of the first layer to a different second edge of the first layer,
wherein each of the plurality of linear prismatic surface structures has a first wall and a second wall contiguous with the first wall and disposed at a right angle with respect to the first wall,
wherein the first wall is configured to reflect light using total internal reflection, and
wherein the first layer and the second layer form a flexible laminated sheet-form structure having a generally rectangular shape and a thickness between 200 micrometers and 1 millimeter.

19. An illumination system, comprising:
a light source comprising a plurality of LEDs;
a first layer of an optically transmissive material;
a second layer of an optically transmissive material superimposed on and bonded to the first layer using an optically transmissive adhesive;
a first linear array of parallel channels formed in the first layer and longitudinally extending along straight parallel lines from a first edge of the first layer to a different second edge of the first layer;
a second linear array of parallel channels formed in the second layer and longitudinally extending along straight parallel lines at an angle with respect to the parallel channels of the first linear array;
an optical sheet comprising a two-dimensional pattern of light diffusing surface microstructures; and
a broad-area reflective surface configured to reflectively scatter light,
wherein at least some of the parallel channels formed in the first layer are separated from one another by surface portions which are generally parallel to a plane of the first layer,
wherein each of the parallel channels of the first linear array has a surface which is disposed at an angle with respect to a plane of the first layer and is configured to reflect light using total internal reflection, and wherein the first layer and the second layer form a flexible laminated sheet-form structure having a generally rectangular shape and a thickness between 200 micrometers and 1 millimeter.

20. An illumination system as recited in claim 18, wherein the angle is approximately 90 degrees.

21. An illumination system as recited in claim 18, wherein the first linear array of parallel channels is configured with variable spacing.

22. An illumination system as recited in claim 18, wherein a largest dimension of the flexible laminated sheet-form structure is at least 0.5 meters.

23. An illumination system as recited in claim 18, wherein at least some of the parallel channels of the first linear array are separated from one another by surface portions of the first layer which are generally parallel to a plane of the first layer, and wherein at least some of the surface portions are disposed in contact with the second layer.

24. An illumination system as recited in claim 18, wherein a largest dimension of the flexible laminated sheet-form structure is at least 0.5 meters, and wherein the flexible laminated sheet-form structure is retained in a curved shape.

25. An illumination system as recited in claim 18, further comprising a beam shaping lens positioned on a light path between the light source and the flexible laminated sheet-form structure.

26. An illumination system as recited in claim 18, further comprising a sheet of glass disposed in energy receiving relationship with respect to the flexible laminated sheet-form structure.

27. An illumination system as recited in claim 18, further comprising a material configured to alter color of transmitted light.

28. An illumination system as recited in claim 18, further comprising a layer configured to filter specific wavelengths of light.

29. An illumination system as recited in claim 18, further comprising a surface having a lens pattern.

30. An illumination system as recited in claim 18, further comprising a sheet of glass disposed in energy receiving relationship with respect to the flexible laminated sheet-form structure, wherein a largest dimension of the flexible laminated sheet-form structure is at least 0.5 meters, and wherein the flexible laminated sheet-form structure is retained in a curved shape.

31. An illumination system as recited in claim 18, wherein the first linear array of parallel channels is configured with variable spacing, wherein at least some of the parallel channels of the first linear array are separated from one another by surface portions of the first layer which are generally parallel to a plane of the first layer, and wherein at least some of the surface portions are disposed in contact with the second layer.

32. An illumination system as recited in claim 19, wherein the angle is approximately 90 degrees.

33. An illumination system as recited in claim 19, wherein the first linear array of parallel channels is configured with variable spacing, and wherein at least some of the surface portions are disposed in contact with and bonded to the second layer using the optically transmissive adhesive.

34. An illumination system as recited in claim 19, further comprising a sheet of glass disposed in energy receiving relationship with respect to the flexible laminated sheet-form structure, wherein a largest dimension of the flexible laminated sheet-form structure is at least 0.5 meters.

35. An illumination system as recited in claim 19, wherein at least some of the surface portions are disposed in contact with and bonded to the second layer using the optically transmissive adhesive.

36. An illumination system as recited in claim 19, further comprising a sheet of glass disposed in energy receiving relationship with respect to the flexible laminated sheet-form structure, wherein a largest dimension of the flexible laminated sheet-form structure is at least 0.5 meters, and wherein the flexible laminated sheet-form structure is retained in a curved shape.

37. An illumination system as recited in claim 19, further comprising a beam shaping lens positioned on a light path between the light source and the flexible laminated sheet-form structure.

38. An illumination system as recited in claim 19, further comprising a surface having a lens pattern.

39. An illumination system as recited in claim 19, further comprising a material configured to alter color of transmitted light.

* * * * *